(12) United States Patent
Wedding

(10) Patent No.: US 8,232,725 B1
(45) Date of Patent: Jul. 31, 2012

(54) PLASMA-TUBE GAS DISCHARGE DEVICE

(75) Inventor: Carol Ann Wedding, Toledo, OH (US)

(73) Assignee: Imaging Systems Technology, Toledo, OH (US)

( * ) Notice: Subject to any disclaimer, the term of this patent is extended or adjusted under 35 U.S.C. 154(b) by 52 days.

(21) Appl. No.: 12/709,462

(22) Filed: Feb. 20, 2010

Related U.S. Application Data

(60) Continuation-in-part of application No. 11/514,855, filed on Sep. 5, 2006, now Pat. No. 7,679,286, which is a continuation-in-part of application No. 10/441,104, filed on May 20, 2003, now Pat. No. 7,157,854, which is a continuation-in-part of application No. 12/172,646, filed on Jul. 14, 2008, now Pat. No. 7,833,076, which is a division of application No. 11/107,964, filed on Apr. 18, 2005, now Pat. No. 7,405,516, which is a continuation-in-part of application No. 11/116,241, filed on Apr. 28, 2005, now abandoned.

(60) Provisional application No. 60/381,823, filed on May 21, 2002, provisional application No. 60/564,942, filed on Apr. 26, 2004, provisional application No. 60/566,932, filed on May 3, 2004.

(51) Int. Cl.
*H01J 17/49* (2012.01)
(52) U.S. Cl. ......................................... 313/582; 313/486
(58) Field of Classification Search .......... 313/582–587, 313/486–487
See application file for complete search history.

(56) References Cited

U.S. PATENT DOCUMENTS

| | | | |
|---|---|---|---|
| 3,050,654 A | 8/1962 | Toulon | |
| 3,602,754 A | 8/1971 | Pfaender et al. | |
| 3,654,680 A | 4/1972 | Bode et al. | |
| 3,927,342 A | 12/1975 | Bode et al. | |
| 3,969,718 A | 7/1976 | Strom | |
| 3,990,068 A | 11/1976 | Mayer et al. | |
| 4,027,188 A | 5/1977 | Bergman | |
| 4,038,577 A | 7/1977 | Bode et al. | |
| 6,545,422 B1 * | 4/2003 | George et al. | 315/169.3 |
| 6,570,335 B1 | 5/2003 | George et al. | |
| 6,612,889 B1 | 9/2003 | Green et al. | |
| 6,614,179 B1 * | 9/2003 | Shimizu et al. | 313/512 |
| 6,620,012 B1 | 9/2003 | Johnson et al. | |
| 6,633,117 B2 | 10/2003 | Shinoda et al. | |
| 6,646,388 B2 | 11/2003 | George et al. | |
| 6,650,055 B2 | 11/2003 | Ishimoto et al. | |
| 6,677,704 B2 | 1/2004 | Ishimoto et al. | |
| 6,762,566 B1 | 7/2004 | George et al. | |
| 6,764,367 B2 | 7/2004 | Green et al. | |
| 6,791,264 B2 | 9/2004 | Green et al. | |
| 6,794,812 B2 | 9/2004 | Yamada et al. | |
| 6,796,867 B2 | 9/2004 | George et al. | |
| 6,801,001 B2 | 10/2004 | Drobot et al. | |
| 6,822,626 B2 | 11/2004 | George et al. | |
| 6,836,063 B2 | 12/2004 | Ishimoto et al. | |
| 6,836,064 B2 | 12/2004 | Yamada et al. | |

(Continued)

*Primary Examiner* — Joseph L Williams
(74) *Attorney, Agent, or Firm* — Donald K. Wedding

(57) ABSTRACT

A gas discharge device with one or more gas filled Plasma-tubes on or within a rigid, flexible, or semi-flexible substrate with each Plasma-tube being electrically connected to one or more electrical conductors such as electrodes. In one embodiment, each Plasma-tube is made of one or more luminescent substances with the exterior of each tube containing one or more luminescent substances. The Plasma-tubes may be used alone or in combination with Plasma-shells.

18 Claims, 21 Drawing Sheets

U.S. PATENT DOCUMENTS

| | | |
|---|---|---|
| 6,841,929 B2 | 1/2005 | Ishimoto et al. |
| 6,857,923 B2 | 2/2005 | Yamada et al. |
| 6,864,631 B1 * | 3/2005 | Wedding .................. 313/587 |
| 6,893,677 B2 | 5/2005 | Yamada et al. |
| 6,902,456 B2 | 6/2005 | George et al. |
| 6,914,382 B2 | 7/2005 | Ishimoto et al. |
| 6,930,442 B2 | 8/2005 | Awamoto et al. |
| 6,932,664 B2 | 8/2005 | Yamada et al. |
| 6,935,913 B2 | 8/2005 | Wyeth et al. |
| 6,969,292 B2 | 11/2005 | Tokai et al. |
| 6,975,068 B2 | 12/2005 | Green et al. |
| 7,005,793 B2 | 2/2006 | George et al. |
| 7,025,648 B2 | 4/2006 | Green et al. |
| 7,049,748 B2 | 5/2006 | Tokai et al. |
| 7,083,681 B2 | 8/2006 | Yamada et al. |
| 7,122,961 B1 | 10/2006 | Wedding |
| 7,125,305 B2 | 10/2006 | Green et al. |
| 7,137,857 B2 | 11/2006 | George et al. |
| 7,140,941 B2 | 11/2006 | Green et al. |
| 7,157,854 B1 | 1/2007 | Wedding |
| 7,176,628 B1 | 2/2007 | Wedding |
| 7,288,014 B1 | 10/2007 | George et al. |
| 7,679,286 B1 | 3/2010 | Wedding |
| 7,719,471 B1 | 5/2010 | Pavliscak et al. |
| 7,772,774 B1 | 8/2010 | Pavliscak et al. |
| 7,791,037 B1 | 9/2010 | Wedding et al. |
| 2001/0028216 A1 | 10/2001 | Tokai et al. |
| 2002/0030437 A1 | 3/2002 | Shimizu et al. |
| 2003/0025440 A1 | 2/2003 | Ishimoto et al. |
| 2003/0052592 A1 | 3/2003 | Shinoda et al. |
| 2003/0094891 A1 | 5/2003 | Green et al. |
| 2003/0122485 A1 | 7/2003 | Tokai et al. |
| 2003/0164684 A1 | 9/2003 | Green et al. |
| 2003/0182967 A1 | 10/2003 | Tokai et al. |
| 2003/0184212 A1 | 10/2003 | Ishimoto et al. |
| 2003/0214243 A1 | 11/2003 | Drobot et al. |
| 2004/0033319 A1 | 2/2004 | Yamada et al. |
| 2004/0051450 A1 | 3/2004 | George et al. |
| 2004/0063373 A1 | 4/2004 | Johnson et al. |
| 2004/0175854 A1 | 9/2004 | George et al. |
| 2005/0095944 A1 | 5/2005 | George et al. |
| 2006/0097620 A1 | 5/2006 | George et al. |
| 2007/0015431 A1 | 1/2007 | Green et al. |

* cited by examiner

| Electrical Map | | Data Electrodes | | | | | | | | | | |
|---|---|---|---|---|---|---|---|---|---|---|---|---|
| | | I1 | I2 | I3 | I4 | I5 | I6 | I7 | I8 | I9 | | |
| | | m1 | m2 | m3 | m4 | m5 | m6 | m7 | m8 | m9 | | |
| Address Electrodes (Scan electrodes) | n1 | n1,l1 | n1,l2 | n1,l3 | n1,l4 | n1,l5 | n1,l6 | n1,l7 | n1,l8 | n1,l9 | R1 | Rows |
| | n2 | n2,l1 | n2,l2 | n2,l3 | n2,l4 | n2,l5 | n2,l6 | n2,l7 | n2,l8 | n2,l9 | R2 | |
| | n3 | n3,l1 | n3,l2 | n3,l3 | n3,l4 | n3,l5 | n3,l6 | n3,l7 | n3,l8 | n3,l9 | R3 | |
| | n4 | n4,l1 | n4,l2 | n4,l3 | n4,l4 | n4,l5 | n4,l6 | n4,l7 | n4,l8 | n4,l9 | R4 | |
| | n5 | n5,m1 | n5,m2 | n5,m3 | n5,m4 | n5,m5 | n5,m6 | n5,m7 | n5,m8 | n5,m9 | R5 | |
| | n6 | n6,m1 | n6,m2 | n6,m3 | n6,m4 | n6,m5 | n6,m6 | n6,m7 | n6,m8 | n6,m9 | R6 | |
| | n7 | n7,m1 | n7,m2 | n7,m3 | n7,m4 | n7,m5 | n7,m6 | n7,m7 | n7,m8 | n7,m9 | R7 | |
| | n8 | n8,m1 | n8,m2 | n8,m3 | n8,m4 | n8,m5 | n8,m6 | n8,m7 | n8,m8 | n8,m9 | R8 | |
| | | C1 | C2 | C3 | C4 | C5 | C6 | C7 | C8 | C9 | | |
| | | | | | | Column | | | | | Physical Map | |

| Scan | Physical Map | | | | | | | | |
|---|---|---|---|---|---|---|---|---|---|
| 1 | R1,C1 | R1,C2 | R1,C3 | R1,C4 | R1,C5 | R1,C6 | R1,C7 | R1,C8 | R1,C9 |
| | R5,C1 | R5,C2 | R5,C3 | R5,C4 | R5,C5 | R5,C6 | R5,C7 | R5,C8 | R5,C9 |
| 2 | R2,C1 | R2,C2 | R2,C3 | R2,C4 | R2,C5 | R2,C6 | R2,C7 | R2,C8 | R2,C9 |
| | R6,C1 | R6,C2 | R6,C3 | R6,C4 | R6,C5 | R6,C6 | R6,C7 | R6,C8 | R6,C9 |

FIG. 6A

| Electrical Map | | Data Electrodes | | | | | | | | | | |
|---|---|---|---|---|---|---|---|---|---|---|---|---|
| | | m1 | m2 | m3 | m4 | m5 | m6 | m7 | m8 | m9 | | |
| Address Electrodes (Scan electrodes) | n1 | n1,m1 | n3,m2 | n1,m3 | n3,m4 | n1,m5 | n3,m6 | n1,m7 | n3,m8 | n1,m9 | R1 | Rows |
| | n2 | n2,m1 | n4,m2 | n2,m3 | n4,m4 | n2,m5 | n4,m6 | n2,m7 | n4,m8 | n2,m9 | R2 | |
| | n3 | n3,m1 | n1,m2 | n3,m3 | n1,m4 | n3,m5 | n1,m6 | n3,m7 | n1,m8 | n3,m9 | R3 | |
| | n4 | n4,m1 | n2,m2 | n4,m3 | n2,m4 | n4,m5 | n2,m6 | n4,m7 | n2,m8 | n4,m9 | R4 | |
| | n5 | n5,m1 | n7,m2 | n5,m3 | n7,m4 | n5,m5 | n7,m6 | n5,m7 | n7,m8 | n5,m9 | R5 | |
| | n6 | n6,m1 | n8,m2 | n6,m3 | n8,m4 | n6,m5 | n8,m6 | n6,m7 | n8,m8 | n6,m9 | R6 | |
| | n7 | n7,m1 | n5,m2 | n7,m3 | n5,m4 | n7,m5 | n5,m6 | n7,m7 | n5,m8 | n7,m9 | R7 | |
| | n8 | n8,m1 | n6,m2 | n8,m3 | n6,m4 | n8,m5 | n6,m6 | n8,m7 | n6,m8 | n8,m9 | R8 | |
| | | C1 | C2 | C3 | C4 | C5 | C6 | C7 | C8 | C9 | | |
| | | | | | | Column | | | | | Physical Map | |

| Scan | Physical Map | | | | | | | | |
|---|---|---|---|---|---|---|---|---|---|
| 1 | R1,C1 | R3,C2 | R1,C3 | R3,C4 | R1,C5 | R3,C6 | R1,C7 | R3,C8 | R1,C9 |
| 2 | R2,C1 | R4,C2 | R2,C3 | R4,C4 | R2,C5 | R4,C6 | R2,C7 | R4,C8 | R2,C9 |
| 3 | R3,C1 | R1,C2 | R3,C3 | R1,C4 | R3,C5 | R1,C6 | R3,C7 | R1,C8 | R3,C9 |
| 4 | R4,C1 | R2,C2 | R4,C3 | R2,C4 | R4,C5 | R2,C6 | R4,C7 | R2,C8 | R4,C9 |

FIG. 6B

| Electrical Map | Data Electrodes | | | | | | | | | | |
|---|---|---|---|---|---|---|---|---|---|---|---|
| | m1 | m2 | m3 | m4 | m5 | m6 | m7 | m8 | m9 | | |
| Address Electrodes (Scan electrodes) n1 | n1,m1 | n4,m2 | n3,m3 | n2,m4 | n1,m5 | n4,m6 | n3,m7 | n2,m8 | n1,m9 | R1 | Row |
| n2 | n2,m1 | n1,m2 | n4,m3 | n3,m4 | n2,m5 | n1,m6 | n4,m7 | n3,m8 | n2,m9 | R2 | |
| n3 | n3,m1 | n2,m2 | n1,m3 | n4,m4 | n3,m5 | n2,m6 | n1,m7 | n4,m8 | n3,m9 | R3 | |
| n4 | n4,m1 | n3,m2 | n2,m3 | n1,m4 | n4,m5 | n3,m6 | n2,m7 | n1,m8 | n4,m9 | R4 | |
| n5 | n5,m1 | n8,m2 | n7,m3 | n6,m4 | n5,m5 | n8,m6 | n7,m7 | n6,m8 | n5,m9 | R5 | |
| n6 | n6,m1 | n5,m2 | n8,m3 | n7,m4 | n6,m5 | n5,m6 | n8,m7 | n7,m8 | n6,m9 | R6 | |
| n7 | n7,m1 | n6,m2 | n5,m3 | n8,m4 | n7,m5 | n6,m6 | n5,m7 | n8,m8 | n7,m9 | R7 | |
| n8 | n8,m1 | n7,m2 | n6,m3 | n5,m4 | n8,m5 | n7,m6 | n6,m7 | n5,m8 | n8,m9 | R8 | |
| | C1 | C2 | C3 | C4 | C5 | C6 | C7 | C8 | C9 | | |
| | Column | | | | | | | | | Physical Map | |

| Scan | Physical Map | | | | | | | | |
|---|---|---|---|---|---|---|---|---|---|
| 1 | R1,C1 | R2,C2 | R3,C3 | R4,C4 | R1,C5 | R2,C6 | R3,C7 | R4,C8 | R1,C9 |
| 2 | R2,C1 | R3,C2 | R4,C3 | R1,C4 | R2,C5 | R3,C6 | R4,C7 | R1,C8 | R2,C9 |
| 3 | R3,C1 | R4,C2 | R1,C3 | R2,C4 | R3,C5 | R4,C6 | R1,C7 | R2,C8 | R3,C9 |
| 4 | R4,C1 | R1,C2 | R2,C3 | R3,C4 | R4,C5 | R1,C6 | R2,C7 | R3,C8 | R4,C9 |

FIG. 6C

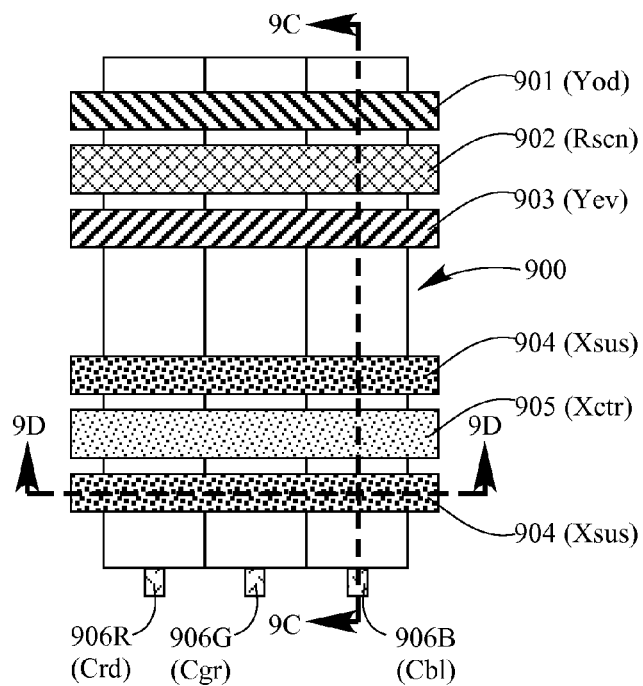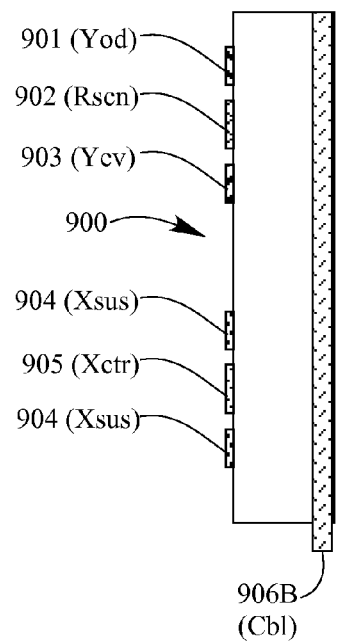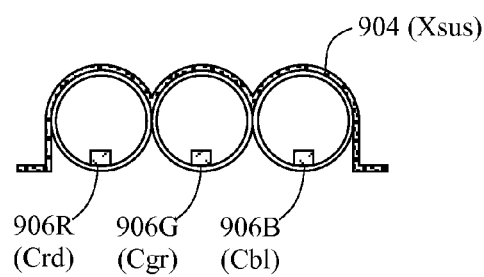
FIG. 9B
FIG. 9C
FIG. 9D

PLASMA-TUBE GAS DISCHARGE DEVICE

RELATED APPLICATIONS

This application is a continuation-in-part under 35 U.S.C. 120 of U.S. patent application Ser. No. 11/514,855, filed Sep. 5, 2006, to issue as U.S. Pat. No. 7,679,286, which is a continuation-in-part under 35 U.S.C. 120 of U.S. patent application Ser. No. 10/441,104, filed May 20, 2003, now U.S. Pat. No. 7,157,854, which claims priority under 35 U.S.C. 119(e) of Provisional Patent Application Ser. No. 60/381,823, filed May 21, 2002.

This application is also a continuation-in-part under 35 U.S.C. 120 of U.S. patent application Ser. No. 12/172,646, filed Jul. 14, 2008 now U.S. Pat. No. 7,833,076, which is a division under 35 U.S.C. 120 of U.S. patent application Ser. No. 11/107,964, filed Apr. 18, 2005, now U.S. Pat. No. 7,405,516, with a claim of priority under 35 U.S.C. 119(e) of Provisional Application Ser. No. 60/564,942, filed Apr. 26, 2004.

This application is also a continuation-in-part under 35 U.S.C. 120 of U.S. patent application Ser. No. 11/116,241, filed Apr. 28, 2005 now abandoned with a claim of priority under 35 U.S.C. 119(e) of Provisional Application Ser. No. 60/566,932, filed May 3, 2004.

FIELD OF THE INVENTION

This invention relates to a gas discharge device constructed out of one or more gas-filled Plasma-tubes with an organic luminescent substance located in close proximity to each Plasma-tube, the organic substance being excited by photons from a gas discharge within the Plasma-tube. The gas discharge device comprises one or more Plasma-tubes on or within a rigid, flexible, or semi-flexible substrate with each Plasma-tube being electrically connected to one or more electrical conductors such as electrodes. In some embodiments, the Plasma-tube is operated without electrodes. The Plasma-tubes are used alone or in combination with one or more Plasma-shells such as a Plasma-disc, Plasma-dome, and Plasma-sphere.

The invention is described and illustrated herein with reference to a plasma display panel (PDP). Other gas discharge devices are contemplated including radiation detection as disclosed in U.S. Pat. No. 7,375,342 (Wedding) and antenna as disclosed in U.S. Pat. No. 7,474,273 (Pavliscak et al.), both incorporated herein by reference.

BACKGROUND OF INVENTION

PDP Structures and Operation

In a gas discharge plasma display panel (PDP), a single addressable picture element is a cell, sometimes referred to as a pixel. In a multi-color PDP, two or more cells or pixels may be addressed as sub-cells or sub-pixels to form a single cell or pixel. As used herein cell or pixel also means sub-cell or sub-pixel. The cell or pixel element is defined by one or more electrodes positioned in such a way so as to provide a voltage potential across a gap containing an ionizable gas. When sufficient voltage is applied across the gap, the gas ionizes to produce light. In an AC gas discharge device, each electrode at a cell site is insulated from contact with the gas, typically with a dielectric. In a DC gas discharge device, one or more electrodes are in contact with the gas. The electrodes are generally grouped in a matrix configuration to allow for selective addressing of each cell or pixel.

To form a display image, several types of voltage pulses may be applied across a plasma display cell gap. These pulses include a write pulse, which is the voltage potential sufficient to ionize the gas at the pixel site. A write pulse is selectively applied across selected cell sites to cause a gas discharge at the cell. The ionized gas will produce visible light, UV light and/or IR light which excites a phosphor to glow. Sustain pulses are a series of pulses that produce a voltage potential across pixels to maintain gas discharge of cells previously addressed with a write pulse. An erase pulse is used to selectively extinguish ionized pixels.

The voltage at which a pixel will ionize, sustain, and erase depends on a number of factors including the distance between the electrodes, the composition of the ionizing gas, and the pressure of the ionizing gas. Also of importance is the dielectric composition and thickness. To maintain uniform electrical characteristics throughout the display it is desired that the various physical parameters adhere to required tolerances. Maintaining the required tolerance depends on cell geometry, fabrication methods, and the materials used. The prior art discloses a variety of plasma display structures, a variety of methods of construction, and a variety of materials.

Examples of open cell gas discharge (plasma) devices include both monochrome (single color) AC plasma displays and multi-color (two or more colors) AC plasma displays. Also monochrome and multi-color DC plasma displays are contemplated. Examples of monochrome AC gas discharge (plasma) displays are well known in the prior art and include those disclosed in U.S. Pat. Nos. 3,559,190 (Bitzer et al.), 3,499,167 (Baker et al.), 3,860,846 (Mayer), 3,964,050 (Mayer), 4,080,597 (Mayer), 3,646,384 (Lay), and 4,126,807 (Wedding), all incorporated herein by reference. Examples of multi-color AC plasma displays are well known in the prior art and include those disclosed in U.S. Pat. Nos. 4,233,623 (Pavliscak), 4,320,418 (Pavliscak), 4,827,186 (Knauer et al.), 5,661,500 (Shinoda et al.), 5,674,553 (Shinoda et al.), 5,107,182 (Sano et al.), 5,182,489 (Sano), 5,075,597 (Salavin et al.), 5,742,122 (Amemiya et al.), 5,640,068 (Amemiya et al.), 5,736,815 (Amemiya), 5,541,479 (Nagakubi), 5,745,086 (Weber), and 5,793,158 (Wedding), all incorporated herein by reference.

This invention may be practiced in a DC gas discharge (plasma) display which is well known in the prior art, for example as disclosed in U.S. Pat. Nos. 3,886,390 (Maloney et al.), 3,886,404 (Kurahashi et al.), 4,035,689 (Ogle et al.), and 4,532,505 (Holz et al.), all incorporated herein by reference.

This invention is described herein with reference to an AC plasma display. The PDP industry has used two different AC plasma display panel (PDP) structures, the two-electrode columnar discharge structure and the three-electrode surface discharge structure. Columnar discharge is also called co-planar discharge.

Columnar PDP

The two-electrode columnar or co-planar discharge plasma display structure is disclosed in U.S. Pat. Nos. 3,499,167 (Baker et al.) and 3,559,190 (Bitzer et al.). The two-electrode columnar discharge structure is also referred to as opposing electrode discharge, twin substrate discharge, or co-planar discharge. In the two-electrode columnar discharge AC plasma display structure, the sustaining voltage is applied between an electrode on a rear or bottom substrate and an opposite electrode on the front or top viewing substrate. The gas discharge takes place between the two opposing electrodes in between the top viewing substrate and the bottom substrate.

The columnar discharge PDP structure has been widely used in monochrome AC plasma displays that emit orange or red light from a neon gas discharge. Phosphors may be used in a monochrome structure to obtain a color other than neon orange.

In a multi-color columnar discharge PDP structure as disclosed in U.S. Pat. No. 5,793,158 (Wedding), phosphor stripes or layers are deposited along the barrier walls and/or on the bottom substrate adjacent to and extending in the same direction as the bottom electrode. The discharge between the two opposite electrodes generates electrons and ions that bombard and deteriorate the phosphor thereby shortening the life of the phosphor and the PDP.

In a two electrode columnar discharge PDP as disclosed by Wedding ('158), each light emitting pixel is defined by a gas discharge between a bottom or rear electrode x and a top or front opposite electrode y, each cross-over of the two opposing arrays of bottom electrodes x and top electrodes y defining a pixel or cell.

Surface Discharge PDP

The three-electrode multi-color surface discharge AC plasma display panel structure is widely disclosed in the prior art including U.S. Pat. Nos. 5,661,500 (Shinoda et al.), 5,674,553, (Shinoda et al.), 5,745,086 (Weber), and 5,736,815 (Amemiya), all incorporated herein by reference.

In a surface discharge PDP, each light emitting pixel or cell is defined by the gas discharge between two electrodes on the top substrate. In a multi-color RGB display, the pixels or cells may be called sub-pixels or sub-cells. Photons from the discharge of an ionizable gas at each pixel or sub-pixel excite a photoluminescent phosphor that emits red, blue, or green light.

In a three-electrode surface discharge AC plasma display, a sustaining voltage is applied between a pair of adjacent parallel electrodes that are on the front or top viewing substrate. These parallel electrodes are called the bulk sustain electrode and the row scan electrode. The row scan electrode is also called a row sustain electrode because of its dual functions of address and sustain. The opposing electrode on the rear or bottom substrate is a column data electrode and is used to periodically address a row scan electrode on the top substrate. The sustaining voltage is applied to the bulk sustain and row scan electrodes on the top substrate. The gas discharge takes place between the row scan and bulk sustain electrodes on the top viewing substrate.

In a three-electrode surface discharge AC plasma display panel, the sustaining voltage and resulting gas discharge occurs between the electrode pairs on the top or front viewing substrate above and remote from the phosphor on the bottom substrate. This separation of the discharge from the phosphor minimizes electron bombardment and deterioration of the phosphor deposited on the walls of the barriers or in the grooves (or channels) on the bottom substrate adjacent to and/or over the third (data) electrode. Because the phosphor is spaced from the discharge between the two electrodes on the top substrate, the phosphor is subject to less electron bombardment than in a columnar discharge PDP.

Single Substrate PDP

There may be used a PDP structure having a so-called single substrate or monolithic plasma display panel structure having one substrate with or without a top or front viewing envelope. Single-substrate or monolithic plasma display panel structures are well known in the prior art and are disclosed by U.S. Pat. Nos. 3,646,384 (Lay), 3,652,891 (Janning), 3,666,981 (Lay), 3,811,061 (Nakayama et al.), 3,860,846 (Mayer), 3,885,195 (Amano), 3,935,494 (Dick et al.), 3,964,050 (Mayer), 4,106,009 (Dick), 4,164,678 (Biazzo et al.), and 4,638,218 (Shinoda), all incorporated herein by reference.

RELATED PRIOR ART

Elongated PDP Tubes

The following prior art references relate to the manufacture and/or use of elongated tubes in a PDP and are incorporated herein by reference. U.S. Pat. No. 3,602,754 (Pfaender et al.) discloses a multiple discharge gas display panel in which filamentary or capillary size glass tubes are assembled to form a gas discharge panel. U.S. Pat. Nos. 3,654,680 (Bode et al.), 3,927,342 (Bode et al.) and 4,038,577 (Bode et al.) disclose a gas discharge display in which filamentary or capillary size gas tubes are assembled to form a gas discharge panel. U.S. Pat. No. 3,969,718 (Strom) discloses a plasma display system utilizing tubes arranged in a side by side, parallel fashion. U.S. Pat. No. 3,990,068 (Mayer et al.) discloses a capillary tube plasma display with a plurality of capillary tubes arranged parallel in a close pattern. U.S. Pat. No. 4,027,188 (Bergman) discloses a tubular plasma display consisting of parallel glass capillary tubes sealed in a plenum and attached to a rigid substrate. U.S. Pat. No. 5,984,747 (Bhagavatula et al.) discloses rib structures for containing plasma in electronic displays which are formed by drawing glass performs into fiber-like rib components. The rib components are then assembled to form rib/channel structures suitable for flat panel displays. U.S. Pat. No. 6,255,777 (Kim et al.) and U.S. Patent Application Publication 2002/0017863 (Kim et al.) disclose a capillary electrode discharge PDP device and a method of fabrication.

U.S. Pat. Nos. 6,633,117 (Shinoda et al.), 6,650,055 (Ishimoto et al.), and 6,677,704 (Ishimoto et al.), disclose a PDP with elongated display tubes, all incorporated herein by reference. European Patent 1,288,993 (Ishimoto et al.) also discloses a PDP with elongated display tubes and is incorporated herein by reference. U.S. Patent Application Publication Nos. 2004/0033319 (Yamada et al.), 2003/0214223 (Ishimoto et al.), 2003/0214224 (Awamoto et al.), 2003/0214225 (Yamada et al.), 2003/0184212 (Ishimoto et al.), 2003/0182967 (Tokai et al.), 2003/0180456 (Yamada et al.), 2003/0122485 (Tokai et al.), 2003/0052592 (Shinoda et al.), 2003/0049990 (Yamada et al.), 2003/0048077 (Ishimoto et al.), 2003/0048068 (Yamada et al.), 2003/0042839 (Ishimoto et al.), 2003/0025451 (Yamada et al.), 2003/0025440 (Ishimoto et al.), and 2001/0028216 (Tokai et al.), disclose PDP structures with elongated display tubes and are incorporated by reference.

U.S. Pat. Nos. 7,122,961 (Wedding), 7,157,854 (Wedding), and 7,176,628 (Wedding) disclose and describe elongated Plasma-tubes and are incorporated herein by reference.

RELATED PRIOR ART

Spheres, Beads, Ampoules, Capsules

The construction of a PDP out of gas-filled hollow microspheres is known in the prior art. Such microspheres are referred to as spheres, beads, ampoules, capsules, bubbles, shells, and so forth. The following prior art relates to the use of microspheres in a PDP and are incorporated herein by reference.

U.S. Pat. No. 2,644,113 (Etzkorn) discloses ampoules or hollow glass beads containing luminescent gases that emit a colored light. In one embodiment, the ampoules are used to radiate ultraviolet light onto a phosphor external to the ampoule itself. U.S. Pat. No. 3,848,248 (MacIntyre) discloses the embedding of gas-filled beads in a transparent dielectric. The beads are filled with a gas using a capillary. The external shell of the beads may contain phosphor. U.S. Pat. No. 3,998,618 (Kreick et al.) discloses the manufacture of gas-filled beads by the cutting of tubing. The tubing is cut into ampoules and heated to form shells. The gas is a rare gas mixture, 95% neon, and 5% argon at a pressure of 300 TOM U.S. Pat. No. 4,035,690 (Roeber) discloses a plasma panel display with a plasma forming gas encapsulated in clear glass shells. Roeber used commercially available glass shells containing gases such as air, $SO_2$ or $CO_2$ at pressures of 0.2 to 0.3 atmosphere. Roeber discloses the removal of these residual gases by heating the glass shells at an elevated temperature to drive out the gases through the heated walls of the glass shell. Roeber obtains different colors from the glass shells by filling each shell with a gas mixture which emits a color upon discharge and/or by using a glass shell made from colored glass. U.S. Pat. No. 4,963,792 (Parker) discloses a gas discharge chamber including a transparent dome portion. U.S. Pat. No. 5,326,298 (Hotomi) discloses a light emitter for giving plasma light emission. The light emitter comprises a resin including fine bubbles in which a gas is trapped. The gas is selected from rare gases, hydrocarbons, and nitrogen. Japanese Patent 11238469A (Yoshiaki), published Aug. 31, 1999, discloses a plasma display panel containing a gas capsule. The gas capsule is provided with a rupturable part which ruptures when it absorbs a laser beam.

U.S. Pat. No. 6,545,422 (George et al.) discloses a light-emitting panel with a plurality of sockets with spherical or other shape micro-components in a socket sandwiched between two substrates. The micro-component includes a shell filled with a plasma-forming gas or other material. The micro-components may also be tubes. The light-emitting panel may be a plasma display, electroluminescent display, or other display device.

The following U.S. Patents issued to George et al. and various joint inventors are incorporated herein by reference: U.S. Pat. Nos. 6,570,335 (George et al.), 6,612,889 (Green et al.), 6,620,012 (Johnson et al.), 6,646,388 (George et al.), 6,762,566 (George et al.), 6,764,367 (Green et al.), 6,791,264 (Green et al.), 6,796,867 (George et al.), 6,801,001 (Drobot et al.), 6,822,626 (George et al.), and U.S. Patent Application Publications filed by various joint inventors of George et al. U.S. Patent Application Publication Nos. 2003/0090213 (George et al.), 2003/0094891 (Green et al.), 2003/0164684 (Green et al.), 2003/0207643 (Wyeth et al.), 2004/0004445 (George et al.), 2004/0051450 (George et al.), 2004/0063373 (Johnson et al.), 2004/0106349 (Green et al.), and U.S. 2004/0166762 (Green et al.), incorporated herein by reference.

Plasma-Shell

A Plasma-sphere is a primarily hollow sphere with relatively uniform shell thickness. The shell is typically composed of a dielectric material. It is filled with an ionizable gas at a desired mixture and pressure. The gas is selected to produce visible, UV, and/or infrared discharge when a voltage is applied. The shell material may be selected to optimize dielectric properties and optical transmissivity. Additional beneficial materials may be applied to the inside or outer surface of the sphere including magnesium oxide for secondary electron emission. The secondary electron emission material and other materials including organic and/or inorganic luminescent substances may also be added directly to the shell material. Plasma-shells are disclosed in U.S. Patent Nos. 7,247,989 (Wedding), 7,456,571 (Wedding), and 7,604,523 (Wedding et al.), all incorporated herein by reference.

A Plasma-disc is similar to the Plasma-sphere in material composition and gas selection. It differs from the Plasma-sphere in that it is flattened on two opposing sides such as top and bottom. A Plasma-sphere or sphere may be flattened to form a Plasma-disc by applying heat and pressure simultaneously to the top and bottom of the sphere using two substantially flat and ridged members, either of which may be heated. Each of the other four sides may be flat or round. A Plasma-disc is disclosed in U.S. Pat. No. 7,638,943 (Wedding et al.), incorporated herein by reference.

A Plasma-dome is similar to a Plasma-sphere in material composition and ionizable gas selection. It differs in that one side is domed. A Plasma-sphere is flattened on one or more other sides to form a Plasma-dome, typically by applying heat and pressure simultaneously to the top and bottom of the Plasma-sphere or sphere using one substantially flat and ridged member and one substantially elastic member. In one embodiment, the substantially rigid member is heated. A Plasma-dome is disclosed in U.S. Pat. Nos. 7,535,175 (Strbik, I I I et al.), 7,622,866 (Wedding et al.), and 7,628,666 (Strbik, I I I et al.), all incorporated herein by reference.

SUMMARY OF INVENTION

This invention relates to a gas discharge device such as a PDP constructed out of one or more Plasma-tubes with an organic luminescent substance located in close proximity to each Plasma-tube, the organic substance being excited by photons from a gas discharge within the Plasma-tube. The device comprises one or more Plasma-tubes on or within a rigid, flexible, or semi-flexible substrate with each Plasma-tube being electrically connected to one or more electrical conductors such as electrodes. In one embodiment, insulating barriers are used to prevent contact between the electrodes. In some embodiments, the gas discharge device is not connected to an electrode. The Plasma-tube may be of any suitable geometric cross-section shape such as a circle, square, rectangle, triangle, and so forth, suitable for use in a gas discharge device such as a PDP. Combinations of Plasma-tubes may be used, each Plasma-tube being of different dimensions and/or different geometric shapes. Plasma-tubes may also be used in combination with Plasma-shells such as Plasma-spheres, Plasma-discs, and/or Plasma-domes.

BRIEF DESCRIPTION OF THE DRAWINGS

FIGS. 6A, 6B, 6C are tables mapping electrode connections to physical locations.

FIG. 9B illustrates the top view of the electrode structure of FIG. 9A.

FIG. 9C illustrates a section 9C-9C view of the structure of FIG. 9A.

FIG. 9D illustrates a section 9D-9D view of the structure of FIG. 9A.

DETAILED DESCRIPTION OF DRAWINGS

Figure 1A:
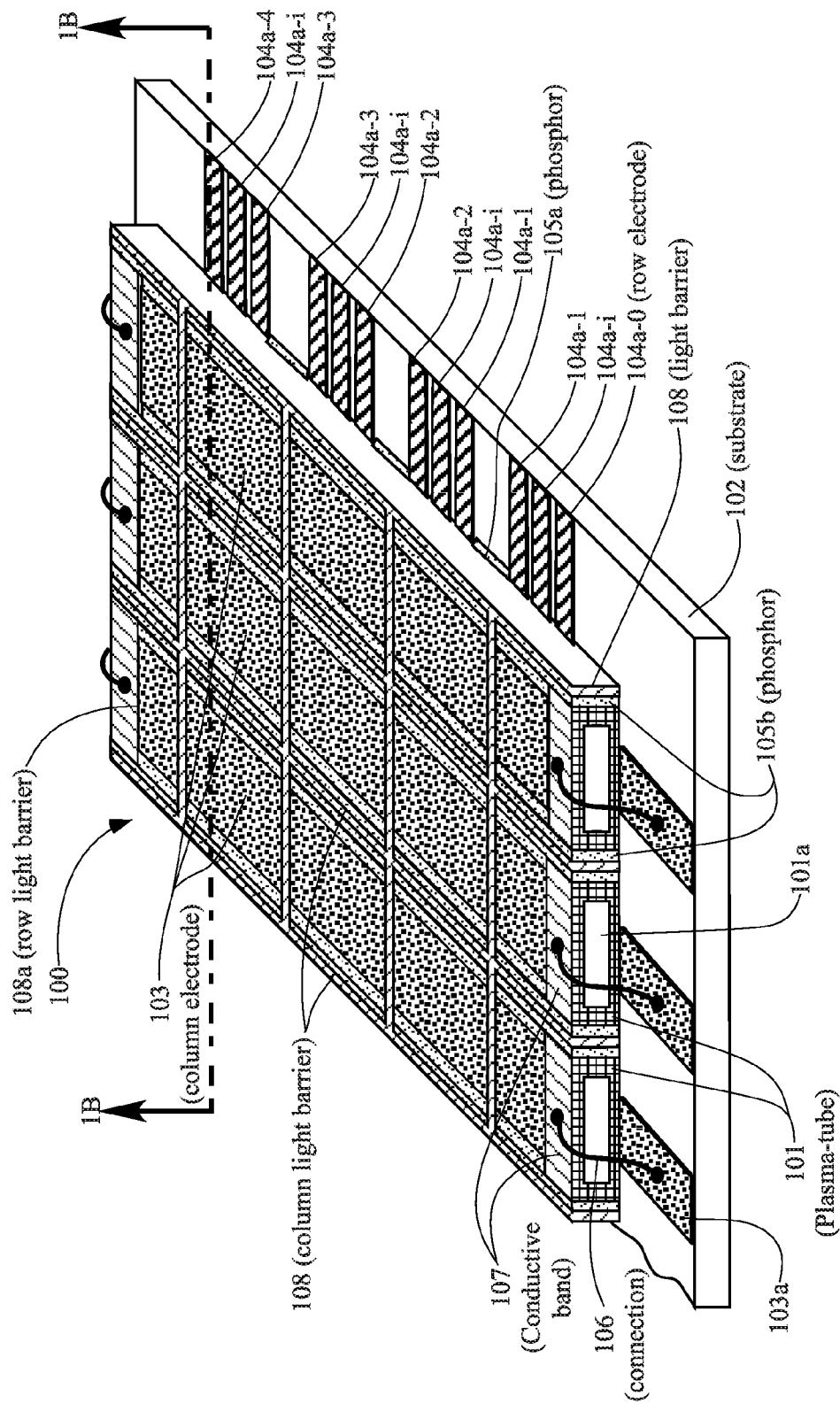
FIG. 1A is a prospective of a monolithic or single substrate positive column discharge AC plasma display with ionizable gas-filled elongated tubes.

In accordance with this invention, there is provided a gas discharge device such as a PDP comprising one or more Plasma-tubes arranged in an array or in other suitable configuration with an organic luminescent substance in close proximity to each Plasma-tube. As illustrated in the drawings, two or more conductors are electrically connected to a Plasma-tube located within or on a rigid, flexible, or semi-flexible substrate or other body. Each electrode is typically connected by means of an electrically conductive or insulating dielectric bonding substance applied to the substrate or to each Plasma-tube. In one embodiment, each electrical connection to each Plasma-tube is separated from each other electrical conductive bonding substance connection on the Plasma-tube by an insulating barrier so as to prevent the conductive substance forming one electrical connection from flowing and electrically shorting out another electrical connection.

The Plasma-tube may be of any suitable geometric shape and may be used in combination with a Plasma-shell such as a Plasma-sphere, Plasma-dome, or Plasma-disc. In one embodiment, the gas discharge device is comprised of one or more Plasma-tubes alone or in combination with one or more Plasma-shells. Although the invention is described and illustrated herein with Plasma-tubes having a square, rectangular, or circular cross-section, other Plasma-tube geometric shapes are contemplated and may be used. Organic luminescent material is positioned internally and/or externally in close proximity near or on each Plasma-tube. Inorganic material may be incorporated with or used in various combinations with the organic luminescent material. The Plasma-tube may also be made of a luminescent material.

FIG. 1A is a top view of a positive column discharge AC plasma discharge display 100 comprising multiple gas-filled hollow rectangular capillary tubes 101, assembled on a single substrate 102 to form the plasma display panel 100. This embodiment uses rectangular cross-section tubes 101 made from a material with a high UV transmission factor such as optical grade clear fused quartz. Such capillary tubes are commercially available in standard and custom sizes and shapes with internal dimensions of 100 micron or larger and wall thickness of 25 microns or larger. The capillary tubes 101 are evacuated and filled with an appropriate ionizing gas mixture and then sealed using a plug 101*a* as shown or sealed by any other suitable means including heat fusion. The exterior top surface of tube 101 contains a column electrode 103 which can be of a transparent material such as ITO. Connection to this electrode 103 is made through a physically robust conductive ring or band 107 at the end of each tube 101. The conductive band 107 is connected to electrode pad 103*a* by conductive strap 106. Other connective methods may also be used including conductive bonding. The two sides of the rectangular tube 101 adjacent to column electrode 103 contain phosphor 105*b*. The distance between these two sides is the rectangular tube width as viewed by the observer from the top or bottom of the display. In a circular tube, this would be the diameter. The phosphor may be added during tube manufacture or after positioning of the tube on the substrate 102. The substrate 102 contains row electrodes 104, electrode pads 103*a* and phosphor pads 105*a*. The flat surface of the tube 101 is arranged to make intimate contact with the flat surface of the row electrodes 104 and the phosphor 105*a*.

The row electrodes 104 comprise 104*b*-0 and 104*b*-1 with a passive or inactive isolation bar 104*b-i*, 104*a*-1 and 104*a*-2 with isolation bar 104*a-i*, 104*b*-2 and 104*b*-3 with isolation bar 104*b-i*, and 104*a*-3 and 104*a*-4 with isolation bar 104*a-i*. The positive column discharge takes place along the length of the tube between adjacent row electrodes such as 104*b*-1 and 104*a*-1, 104*a*-2 and 104*b*-2, 104*b*-3 and 104*a*-3. The isolation bars help contain the positive column discharge and prevent spreading of the discharge down the tube.

The discharge provides photons which excite phosphor 105*a* and 105*b* with the excited phosphor emitting visible light which can be viewed from the top through the transparent column electrodes 103 between column light barriers 108 and row light barriers 108*a*. The top column electrodes 103 may have a split, window, or ladder structure. Likewise, conductive bus bars (not shown) may be located along one or both edges of the transparent electrodes 103.

In one panel fabrication embodiment, tubes 101 of the desired length are bonded to a continuous web substrate 102, the substrate having a plurality of row electrodes 104 oriented perpendicular to the column electrodes 103. Pixels are defined by the intersections of electrodes 103 and 104, the relative relationship of which is not constrained to a precise position of the electrode 103 in its length-wise direction. The matching flat geometry of the rectangular tubes 101 and the substrate row electrodes 104 provides precise electrode 104 definition and orientation relative to each tube 101 without forming the electrodes 104 on the tubes 101. This arrangement accommodates high tolerance capillary tube alignment during manufacture and avoids critical registration of tube electrodes and substrate electrodes as required in the prior art.

Figure 1B:
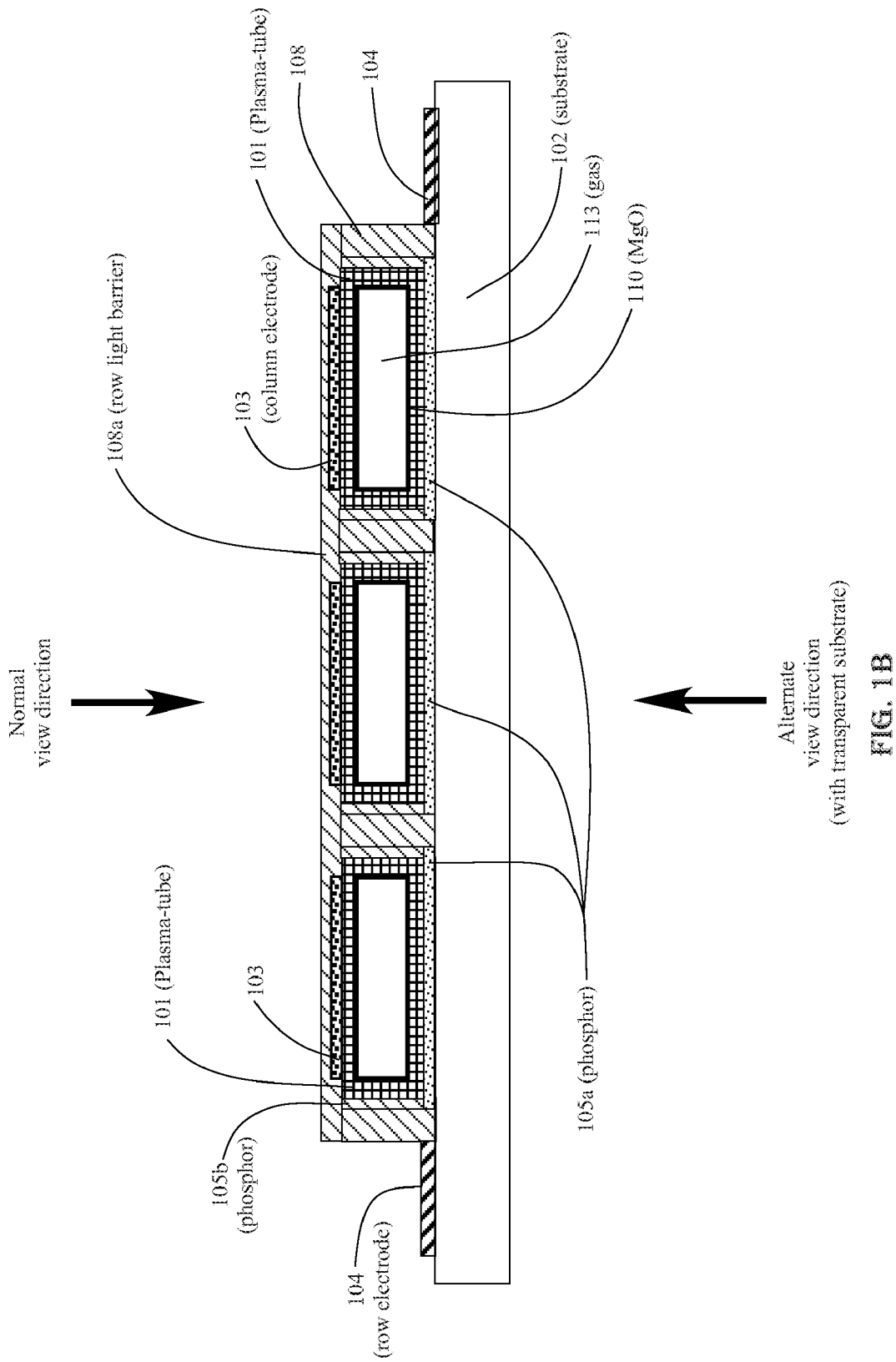
FIG. 1B is a section 1B-1B view of the single substrate and elongated tubes in FIG. 1A.

FIG. 1B shows a section of the tubes 101 assembled on substrate 102. To facilitate the discharge process, all or a portion of the inside of each capillary tube is coated with a thin layer of MgO 110 prior to gas processing and sealing. The optical grade clear fused quartz tube is highly transparent to UV light allowing the phosphor 105a and 105b to be placed on the outside of the tube while being excited by the UV transmission through each tube. The combined effect of 105b and 105a is a phosphor channel on the outside of the tube with UV light being generated inside the tube. Further a very thin layer of phosphor (not shown) may also be applied over the top column electrode 103 to enhance the appearance of the visible light generated by a sub-pixel. Placing phosphor outside the plasma discharge capillary serves to protect the phosphor from the gas discharge and direct ion and electron impingement thereby helping to prolong the life of the phosphor and the plasma display. Added light barriers 108 may be provided between each tube 101 to prevent light optical cross-talk between pixels. In one embodiment, ink jet deposition may be used to adhere phosphor either to the substrate or the tubes, before or after tube/substrate assembly. Ink jet deposition facilitates the continuous panel fabrication process by precise programmable application of phosphor to the tubes and substrate. For example, both the phosphor 105b and the opaque light barrier 108 can be built-up in place by applying successive layers of material by ink jet. This process is sometimes referred to as 3-D printing or stereolithography. The process provides a programmable flexibility in panel fabrication to accommodate different configurations and sizes of panels on an automated continuous substrate web production machine. Also, shown in FIG. 1B is the normal panel viewing direction from the top. However, the glass substrate 102 can also be used to permit viewing from the opposite side. When a glass substrate is used and viewed from the substrate side, the glass substrate forms a natural barrier to protect the more fragile capillary tubes from inadvertent physical damage when in use.

In one embodiment and best mode of this invention, the AC plasma display with elongated tubes as illustrated in FIGS. 1A and 1B is operated in the positive column region of the gas discharge. U.S. Pat. No. 6,184,848 (Weber) discloses the advantages of operation in the positive column region and is incorporated herein by reference.

Figure 2A:
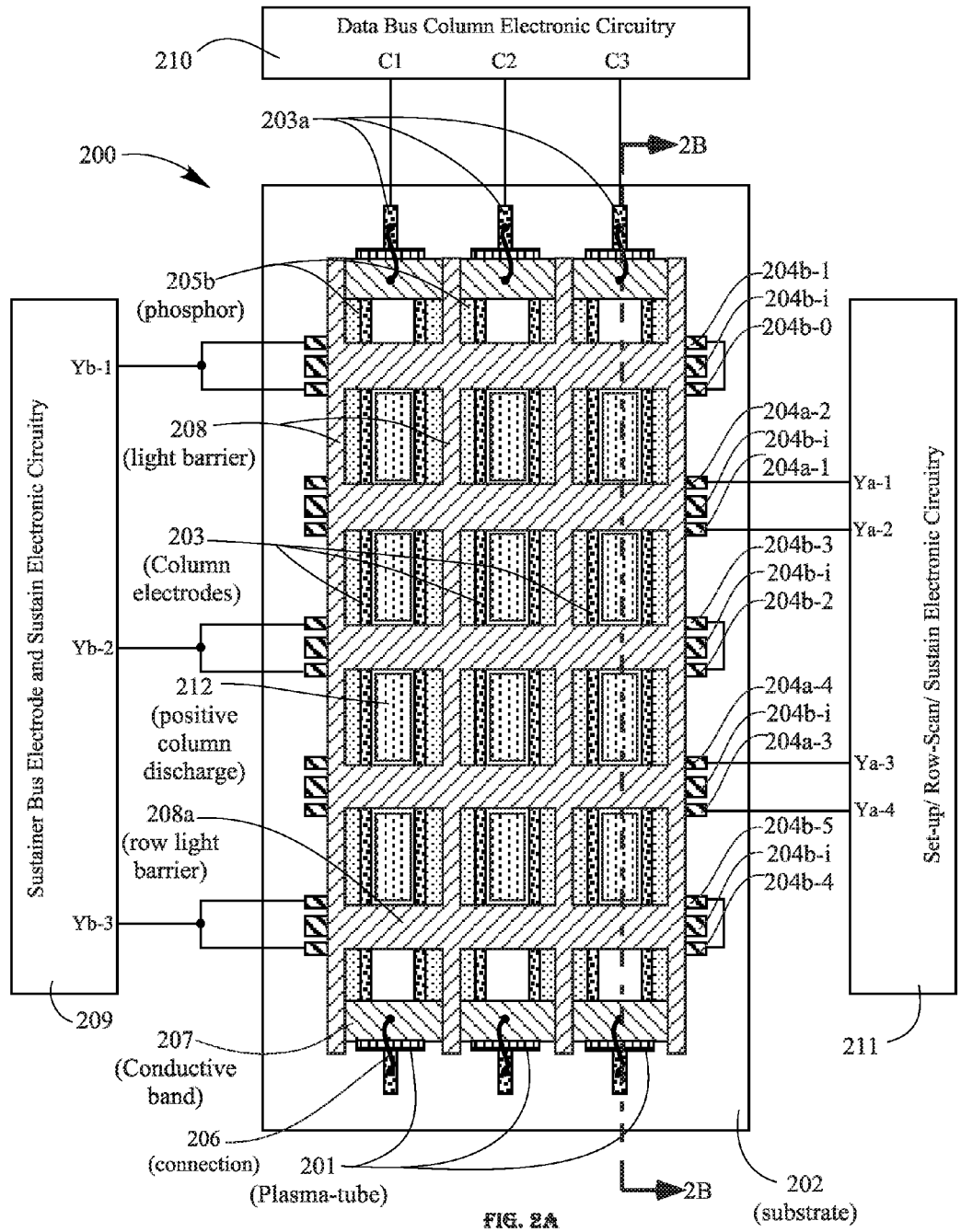
FIG. 2A is a top view of a single substrate positive column discharge AC plasma display with ionizable gas-filled elongated tubes and drive electronics with an inactive isolation bar.
Figure 2B:
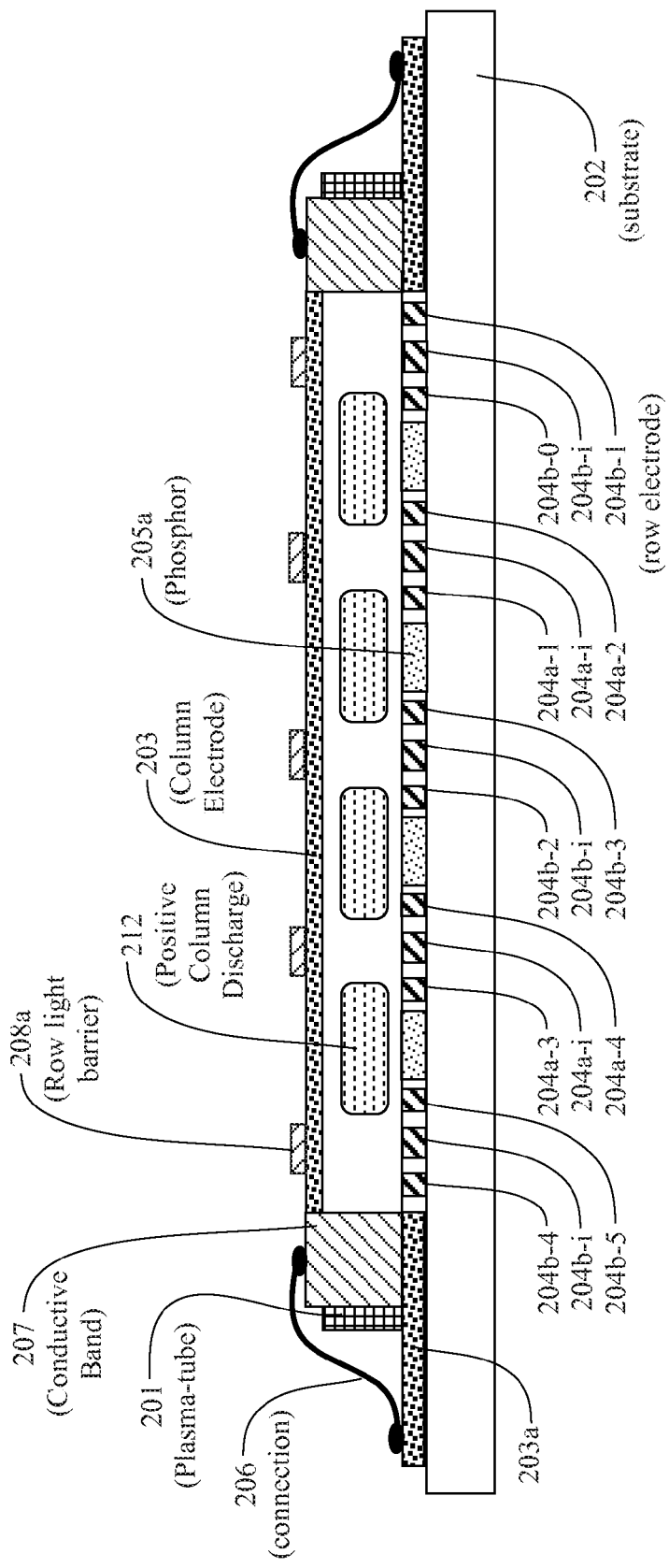
FIG. 2B is a section 2B-2B view of the single substrate and elongated tubes in FIG. 2A.

FIGS. 2A and 2B show a monolithic or single substrate positive column discharge AC plasma panel 200 with drive electronics 209, 210 and 211 arranged for positive column discharge UV illumination of phosphor 205a and 205b. This embodiment of capillary tube display panels overcomes isolation and barrier problems associated with prior art dual substrate glass sandwich display panels with positive column UV emission as disclosed in Weber ('848). Glass sandwich dual substrate displays require a precision network of barrier ribs between the glass panel sheets to laterally confine the long positive column discharge path. Barrier defects can adversely affect display panel manufacturing yield, display operation, and display appearance.

The tube configuration and structure of the present invention provides ideal lateral confinement of the positive column gas discharge without the disadvantages of the prior art. Positive column discharge can have a UV conversion efficiency of 80% or more as opposed to 30% percent or less for the prior art. Consequently, a positive column discharge can produce an 80% total efficiency as compared to only 30% efficiency for traditional negative glow discharge. The combination of high UV output positive column discharge, high UV emitting ionizable gas, and UV transmissive glass provides for a very high intensity UV illumination of each pixel and phosphor. High UV illumination of the phosphor translates to a bright visible light and a bright display panel. Capillary tubes 201 with column data electrodes 203 are arranged perpendicular to the electrodes 204a, 204b on single substrate 202. The intersections of electrodes 203 and 204 define display pixels. The substantial separation of electrodes 204a and 204b along the direction of electrodes 203 defines the positive column discharge area along the length and inside of the tube 201. Each electrode 203 is connected via conductive band 207 and conductive strap 206 to electrode pad 203a which is connected to data bus column electrode circuitry 210. Each pair of row electrodes 204a or 204b forms a loop inside of which there is an electrically conductive isolation bar 204a-i or 204b-i. Each pair of electrodes 204b is separated by isolation bar 204b-i and is connected to the sustain bus electronic circuitry 209. Each pair of electrodes 204a is separated by isolation bar 204a-i and is connected to a set-up scan sustain electronic circuitry 211. As described in Weber ('848), a plurality of loops 204b each of which comprise a pair of parallel electrodes is interleaved between pairs of single scan electrodes 204a. The isolation bars are optional and may be used to insure that there is no significant discharge activity in the inter pixel gap. Typically the isolation bars are conductive. When appropriate sustain signals are applied, pixel illumination selectively occurs between adjoining scan and sustain electrodes by virtue of positive column discharges. The discharges at an ON pixel "ping pong" between one discharge cell which exists at the intersection of a sustain electrode and an address electrode, and a second discharge cell which exists at a scan electrode and the address electrode. In this embodiment, the pixel pitch is on the order of 1320 microns with sustain electrode width of 100 microns and a sustain gap on the order of 700 microns. The present invention is ideal for the long discharge path required for positive column discharge. The tube configuration provides lateral confinement of the long discharge to eliminate pixel cross-talk. At the same time the present invention provides optimal sustain to address electrode spacing of about 110 microns to eliminate the need for excessive high drive voltage and excessively low gas pressure.

FIG. 2B illustrates the long 700 micron positive column discharge 212 between sustain electrodes 204a and 204b. The cavity formed on the substrate 202 by the height of the electrodes 204 and the space between them is filled with phosphor pad 205a. U.S. Pat. No. 6,184,848 (Weber) discloses this space as being 28 mils wide. A mil is defined as 0.001 inch. This phosphor pad 205a spans the underside pixel tube discharge area. The vertical tube side walls may also be coated with phosphor 205b. This arrangement efficiently captures the UV emissions of the positive column discharge 212 from three sides of a channel. High UV light output and phosphor placement provide high display visible light output. Light barriers 208 and 208a may be located between pixels to minimize light cross-talk.

Figure 3A:
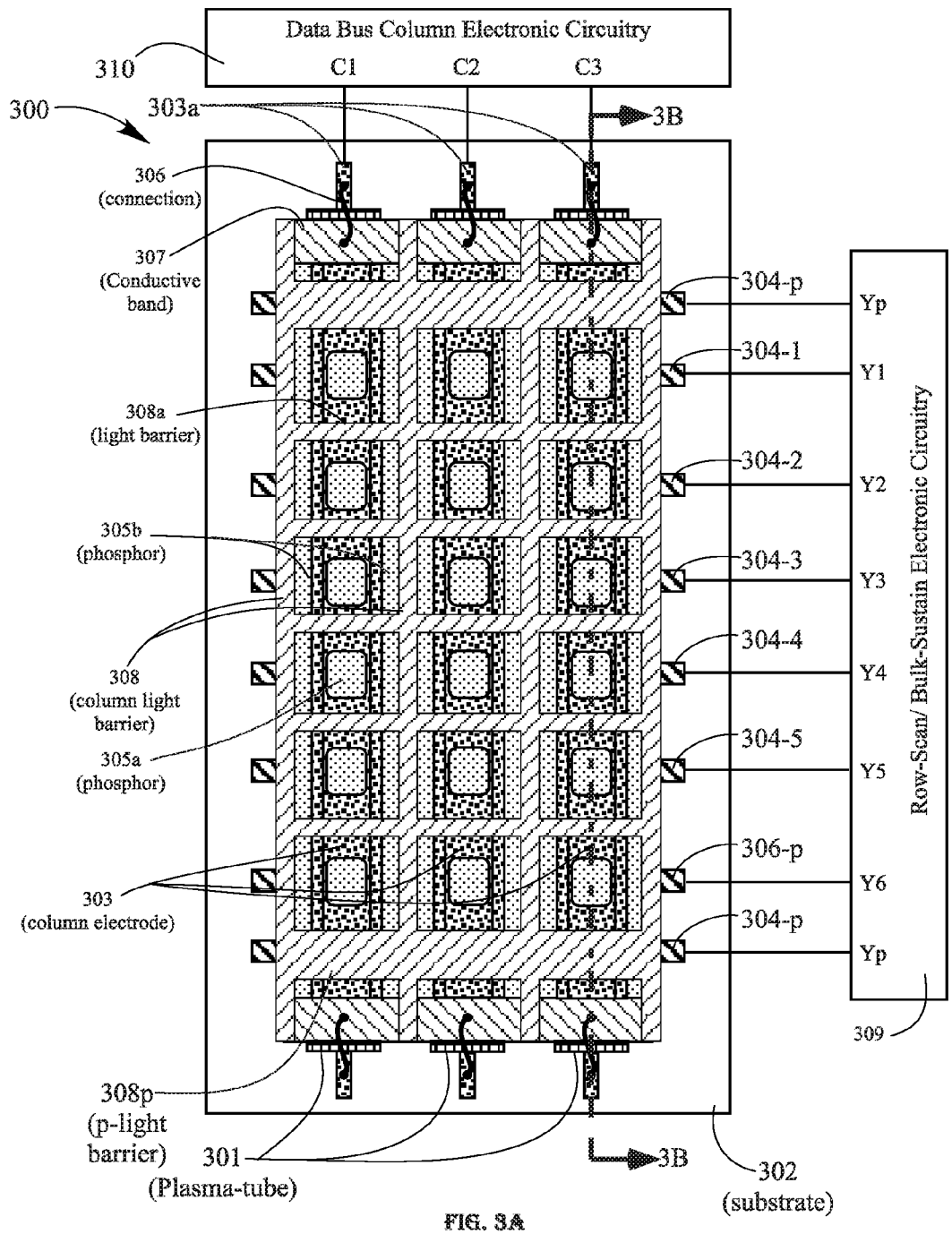
FIG. 3A is a top view of a single substrate columnar discharge AC plasma display with ionizable gas-filled elongated tubes and drive electronics.
Figure 3B:
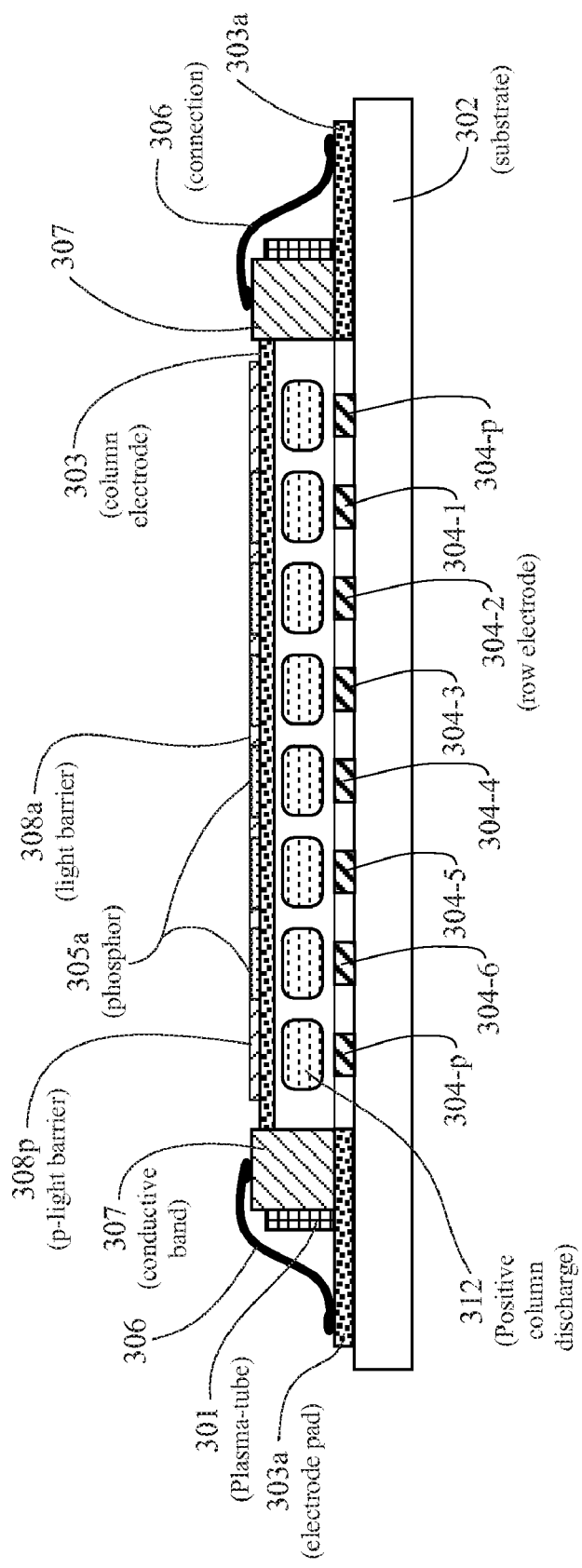
FIG. 3B is a section 3B-3B view of the single substrate and elongated tubes in FIG. 3A.

This invention may be utilized with a columnar discharge PDP. FIGS. 3A and 3B show a single substrate columnar discharge AC plasma display 300 with electronics 309 and 310 arranged for columnar plasma discharge. Each column electrode 303 is connected via conductive band 307 and conductive strap 306 to electrode pad 303a which is connected to data bus electronic circuitry 310. Electrodes 304 are connected to electronic circuitry 309. FIG. 3B shows plasma discharge 312 directly between electrodes 303 and 304. This discharge provides UV photons to the surrounding phosphor 305a and 305b. Also shown are single substrate 302, tube 301, pilot or conditioning electrodes 304-p, pilot light barriers 308p, and light barriers 308, 308a. Positive column discharge is not illustrated in FIGS. 3A and 3B, but may be used.

Figure 4A:
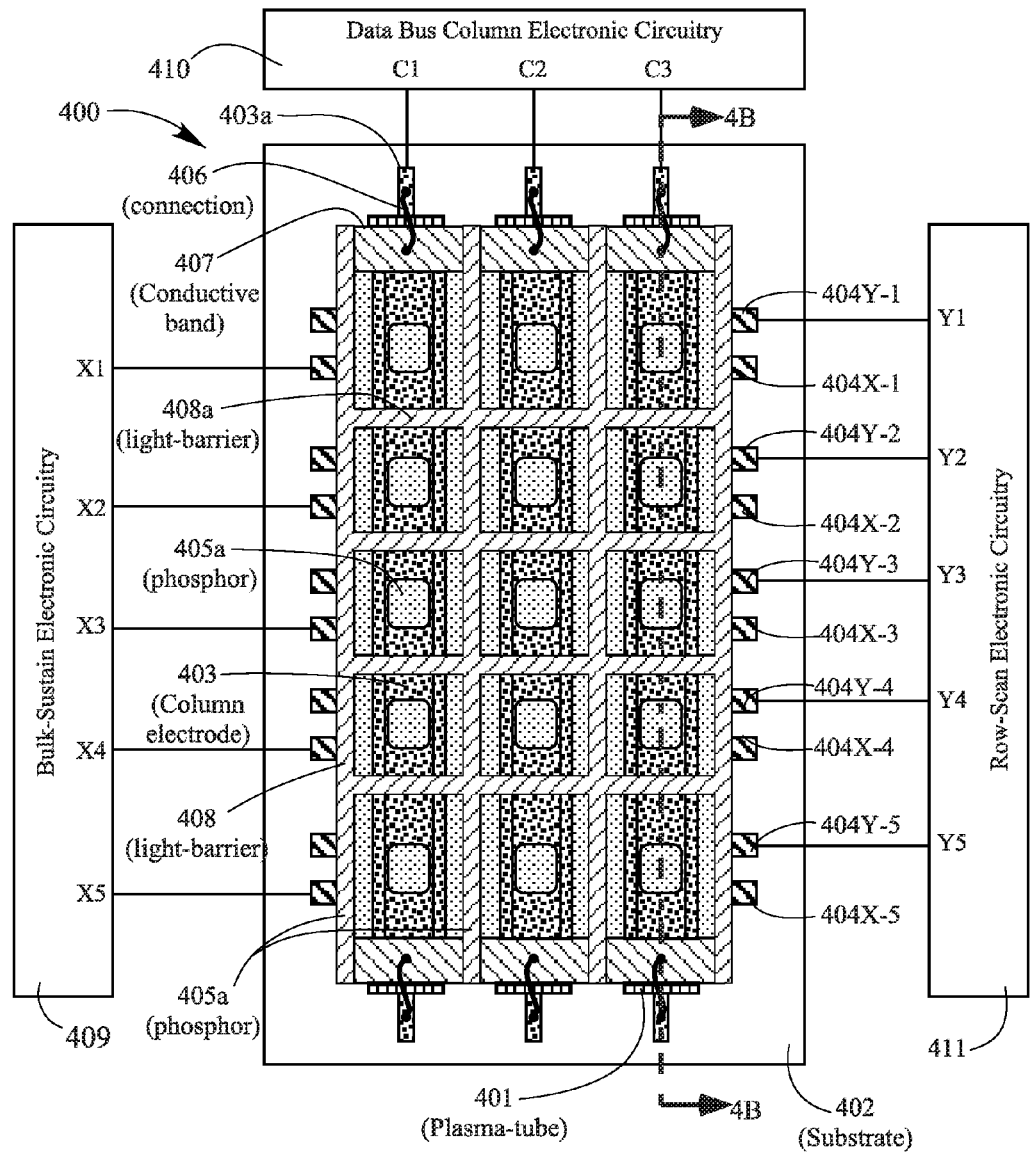
FIG. 4A is a top view of a single substrate surface discharge AC plasma display with ionizable gas-filled elongated tubes and drive electronics.
Figure 4B:
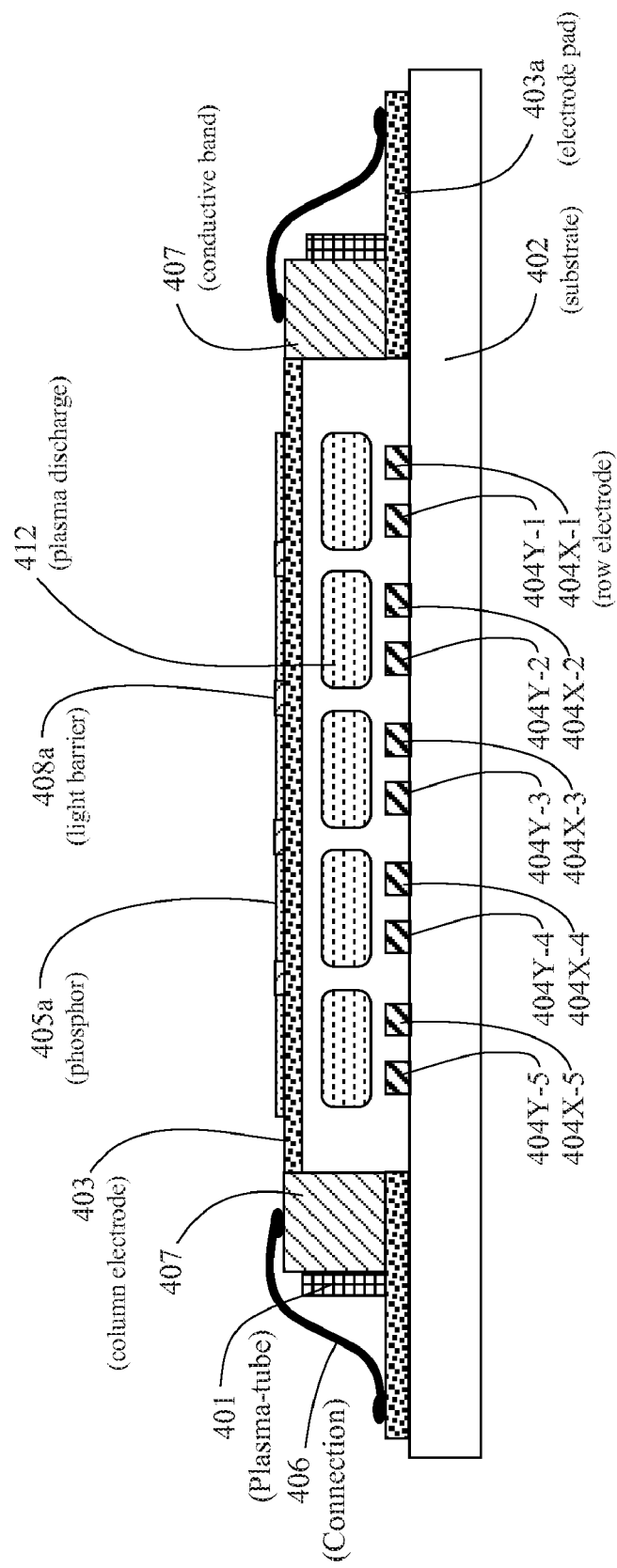
FIG. 4B is a section 4B-4B view of the single substrate and elongated tubes in FIG. 4A.

FIGS. 4A and 4B show a single substrate surface discharge AC plasma display panel 400 with electronics 409, 410, and 411 arranged for surface discharge. Each column data electrode 403 is connected via conductive band 407 and conductive strap 406 to electrode pad 403a which is connected to electronic circuitry 410. The electrodes 404X and 404Y are connected to row scan electronics 411 and sustain electronics 409 such that once a cell discharge is initiated by the data bus electrode 403, the discharge will be sustained between the 404X and 404Y electrodes. FIG. 4B shows the plasma discharge 412 directly between electrodes 403 and 404 which provides UV illumination of the surrounding phosphor 405a and 405b. Also shown are substrate 402, tube 401, and light barriers 408, 408a. Positive column discharge is not illustrated in FIGS. 4A and 4B, but may be used. This invention may be practiced with or without positive column discharge.

Figure 5:
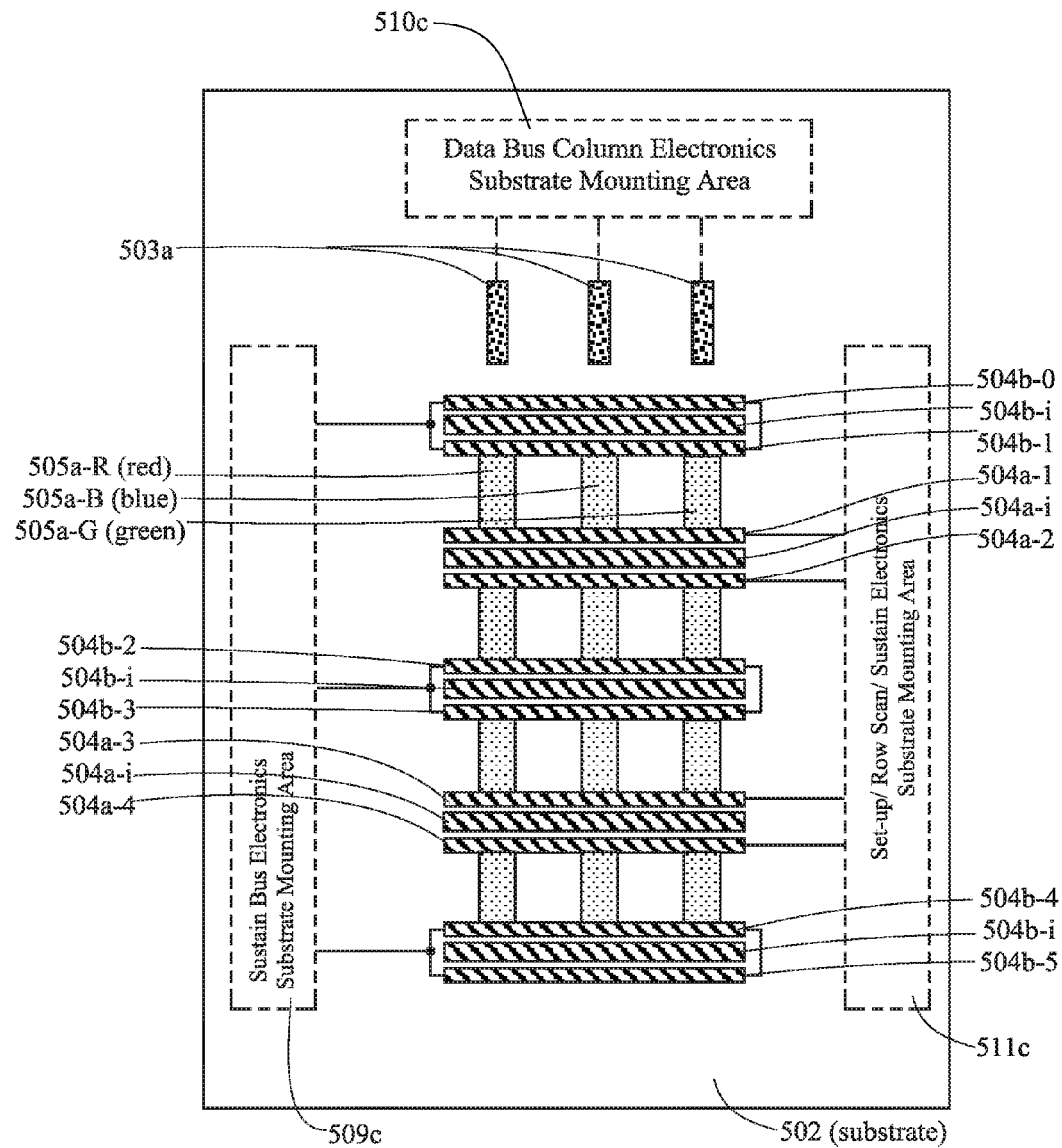
FIG. 5 is a top view of a single substrate positive column discharge AC plasma display substrate illustrating RGB phosphor locations before the tubes are positioned on the substrate.

FIG. 5 shows a single substrate 502 without tubes attached. The substrate 502 has set-up sustain electrodes 504a and loop sustain electrodes 504b as well as electrode pads 503a to facilitate connection to the capillary tube electrodes and drive electronics. Triads of red, blue, and green phosphor 505a-R, 505a-B, 505a-G may be applied by programmable inkjet printing. Inkjet printing may be used for the precision deposition of adhesives, dielectrics and other materials for automated continuous web manufacture of large display panels.

A standard plasma display is addressed one row at a time. The addressing of each row takes a finite amount of time. In order to maintain a flicker free image, the display must be updated at video rates. Therefore there is a practical limit as to how many rows a plasma display may have. In order to achieve more rows with a plasma display, often the column electrodes are split at the center of the display and the two halves are addressed from the top and from the bottom as two independent displays. This is referred to in the PDP industry as dual scan.

This can be achieved with a tube display by simply adding another electrode layer for additional column electrodes. FIG. 6A is a table that maps physical address of the display against the internal electrode configuration in the case where the number of data electrodes has been doubled. One set of data electrodes are represented as 11 through 19, and a second set of electrodes parallel to 11 through 19, but on a different plane are represented as m1 through m9. Each set of these data electrodes connects to a unique subset of tubes defined by a unique set of rows. For example, the Table in FIG. 6A shows 11 through 19 only connecting only to rows R1 through R4 and m1 through m9 connecting only to rows n5 though n8. This allows two rows to be addressed simultaneously. In one row scan time, two rows are addressed simultaneously. Although the concept was illustrated with two rows begin addressed simultaneously, the concept is expandable to more than two rows. By addressing two or more rows at a time, the display may be refreshed faster.

In a standard plasma display gray shades are achieved by time multiplexing. The brightness of a pixel is proportional to how many sustains pulses it experiences while in the ON state. One frame is composed of subfields with varying numbers of sustains. The subfields may be summed in various combinations to achieve the full compliment of unique gray levels (usually 256).

Two problems that occur with this technique are false contour and motion artifact. In general both of these artifacts occur because the human eye does not integrate the subfields properly. There are several ways to alleviate this problem including increasing the update speed as described above. Another way is to separate the pixels that are changing to allow the eye to integrate over an area. By physically separating the pixels that are being addressed changes will be less obvious to the observer. This may be done with a tube display by taking advantage of the ability to have electrodes on multiple layers.

FIG. 6B and FIG. 6C shows tables that maps the physical address of the display with the electrode address. In FIG. 6B the address electrodes attach in a zig-zag pattern. For example address electrode n4 alternates between Row 4 and Row 2. When n4 is selected to be scanned spheres at (R4,C1), (R2, C2), and (R4, C4) are addressed. The pixels are physically separated in a crosshatch pattern. FIG. 6C shows an alternative pattern in which the pixels are physically shifted in a diagonal pattern.

In one embodiment of this invention as illustrated in FIGS. 6A, 6B, 6C, one portion, or section of the display is addressed while another portion or section is sustained. This is referred to as Simultaneous Address and Sustain (SAS).

In accordance with the electrode connections of FIGS. 6A, 6B, and 6C, multiple layers of cells or pixels may be used to randomize the presentation of cells that are written simultaneously.

Present PDPs allow only a single layer of metallization so each writing event addresses a line of adjacent contiguous cells somewhere on the PDP. Multiple layers allow the crossstrap of the individual panel cells or pixels so that cells written in the writing event may not be in a single line but may be written on different lines at the same time. Consequently one may write different PDP sections at the same time and also write in such a way that no two adjacent cells are addressed at the same time anywhere on the panel. This randomizes any concentration of light flashes on the display and mitigates sources of complaint as to artifacts.

Figure 7:
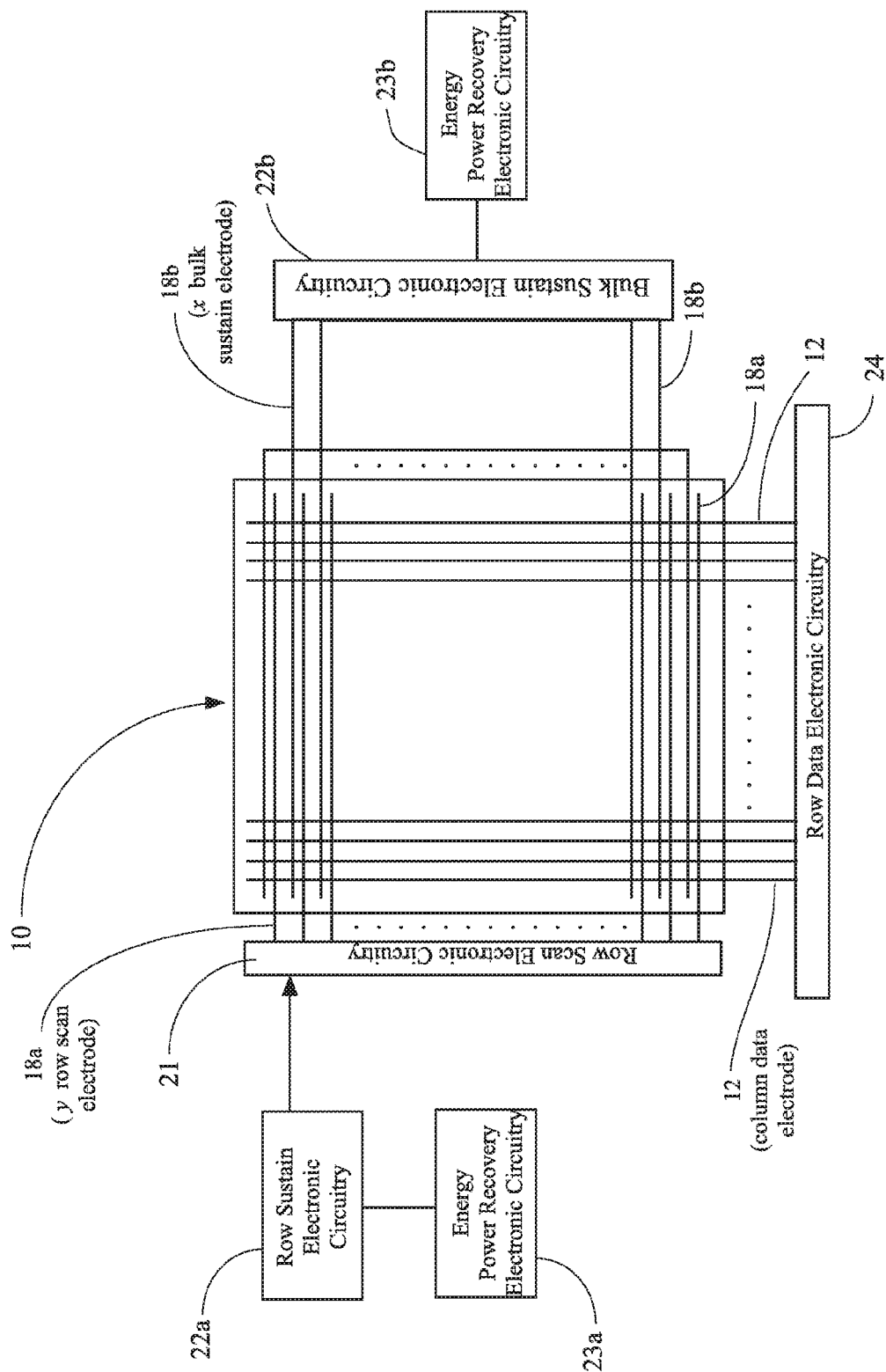
FIG. 7 shows a block diagram of electronics with energy power recovery for driving an AC gas discharge plasma display.

FIG. 7 is a block diagram of a surface discharge AC display panel 10 with electronic circuitry 21 for y row scan electrodes 18A, bulk sustain electronic circuitry 22B for x bulk sustain electrode 18B and column data electronic circuitry 24 for the column data electrodes 12. The panel 10 contains an array of elongated tubes (not shown) as disclosed herein. This may be a monolithic or single substrate surface discharge PDP or a dual substrate (coplanar) surface discharge PDP.

The Plasma-tubes may comprise flattened, round, or square tubes. The flattened tubes may be of any geometric shape and of any predetermined length, typically up to about 1400 micrometers.

The use of Plasma-tubes allows the PDP to be operated with positive column gas discharge, for example as disclosed by Rutherford and other prior art cited hereinafter and incorporated by reference. The discharge length inside the Plasmatube must be sufficient to accommodate the length of the positive column gas discharge for each pixel or sub-pixel, generally up to about 1400 micrometers.

The electronics architecture used in FIG. 7 is ADS as described in the Shinoda and other patents cited below including U.S. Pat. No. 5,661,500. In addition, other architectures as described herein and known in the prior art may be utilized. These architectures including Shinoda ADS may be used to address Plasma-tubes in a PDP.

Figure 8:
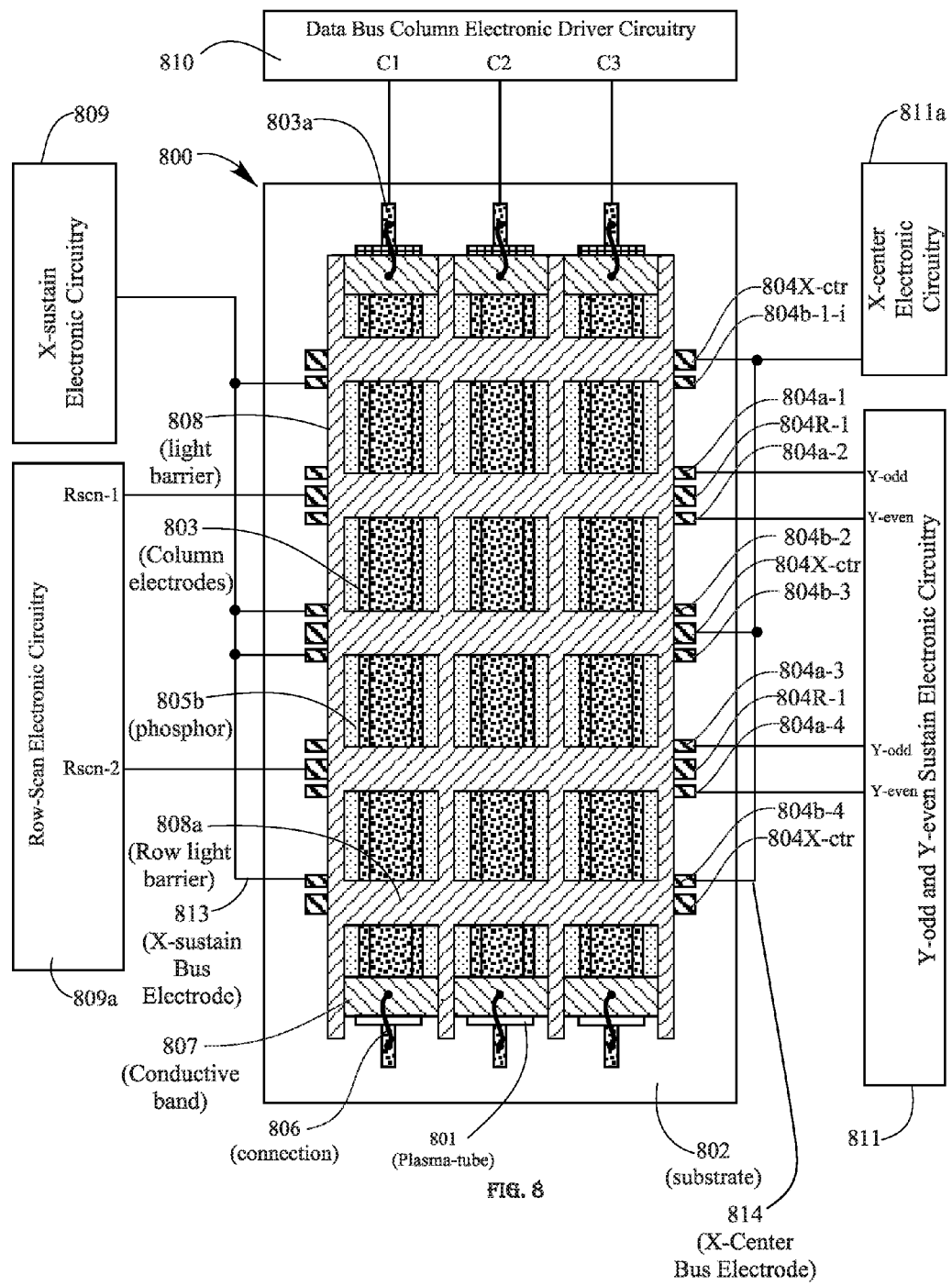
FIG. 8 is a top view of a single substrate positive column discharge AC plasma display with ionizable gas-filled elongated tubes and drive electronics using the isolation bar as an active electrode.

FIG. 8 shows an elongated capillary tube panel 800 arranged for positive column gas discharge UV illumination of phosphor including enhanced performance and reduced cost support electronic circuitry 809, 809a, 811, 811a, and 810.

As described in the Rutherford IDW 2002 paper referenced below, Y-odd and Y-even sustain row electrodes 804a-1 and 804a-2, etc. are connected to Y-odd and Y-even sustain electronic driver circuits 811 with wide row scan electrodes 804R-1, etc. arranged in the space between them and connected to row-scan electronic driver circuits 809*a*.

X-sustain row electrode pairs 804*b*-2 and 804*b*-3, etc. are connected to X-sustain bus electronic circuits 809, with wide X-center electrodes 804X-ctr arranged in the space between them and connected to X-center electronic driver circuit 811*a*.

A plurality of Y-odd and Y-even sustain row electrodes pairs 804*a*-1 and 804*a*-2, etc. are interleaved between a plurality of X-sustain row electrode pairs 804*b*-2 and 804*b*-3, etc.

Column electrodes 803 are connected via conductive bands 807 and conductive straps 806 to electrode pads 803*a* which are connected to data bus electronic circuitry 810.

Light barriers 808 may be provided between each tube to prevent light cross-talk between column sub-pixels. Light barriers 808*a* may be provided over tubes 801 and electrodes 803 to block light between row sub-pixels.

The two sides of each elongated rectangular tube 801 adjacent to electrode 803 are coated with phosphor 805*b*. Also shown are substrate 802 and tube 801.

In one embodiment, the inside of the Plasma-tube contains a secondary electron emitter. Secondary electron emitters lower the breakdown voltage of the gas and provide a more efficient discharge. Plasma displays traditionally use magnesium oxide for this purpose, although other materials may be used including other Group IIA oxides, rare earth oxides, lead oxides, aluminum oxides, and other materials including non-oxides. Mixtures of secondary electron emitters may be used. It may also be beneficial to add luminescent substances such as phosphor to the inside or outside of the tube.

In one embodiment and mode hereof, the Plasma-tube material is made of a metal or metalloid oxide and filled with an ionizable gas of 99.99% atoms of neon and 0.01% atoms of argon or xenon for use in a monochrome PDP. Examples of tube materials include glass, silica, aluminum oxides, zirconium oxides, and magnesium oxides.

In another embodiment, the Plasma-tube contains luminescent substances such as phosphors selected to provide different visible colors including red, blue, and green for use in a full color PDP. The metal or metalloid oxides are typically selected to be highly transmissive to photons produced by the gas discharge especially in the UV and/or IR range.

In one embodiment, the ionizable gas is selected from any of several known combinations that produce UV light including pure helium, helium with up to 1% atoms of neon, helium with up to 1% atoms of argon and up to 15% atoms nitrogen, and neon with up to 15% atoms of xenon or argon. For a color PDP, a red, blue, and/or green light-emitting luminescent substance is applied to the interior or exterior of the tube. The exterior application of the luminescent substance may comprise a slurry or tumbling process with appropriate curing, typically at low temperatures. Infrared curing can also be used. The luminescent substance may be applied by other methods or processes which include spraying, ink jet, dipping, and so forth. Thick film methods such as screen-printing may be used. Thin film methods such as sputtering and vapor phase deposition may be used. The luminescent substance may be applied externally before or after the Plasma-tube is attached to the PDP substrate. As discussed herein, the luminescent substance may be an organic substance alone or an organic substance in combination with an inorganic substance.

The internal or external surface of the Plasma-tube may be partially or completely coated with luminescent material. In one embodiment the external surface is completely coated with luminescent material. The Plasma-tube may be made of a luminescent substance. In one embodiment, the Plasma-tube is made of a luminescent substance and has the same or different luminescent substance on an external surface.

The bottom or rear of the Plasma-tube may be coated with a suitable light reflective material in order to reflect more light toward the top or front viewing direction of the Plasma-tube. The light reflective material may be applied by any suitable process such as spraying, ink jet, dipping, and so forth. Thick film methods such as screen-printing may be used. Thin film methods such as sputtering and vapor phase deposition may be used. The light reflective material may be applied over the luminescent material or the luminescent material may be applied over the light reflective material. In one embodiment, the electrodes are made of or coated with a light reflective material such that the electrodes also may function as a light reflector.

Figure 9A:
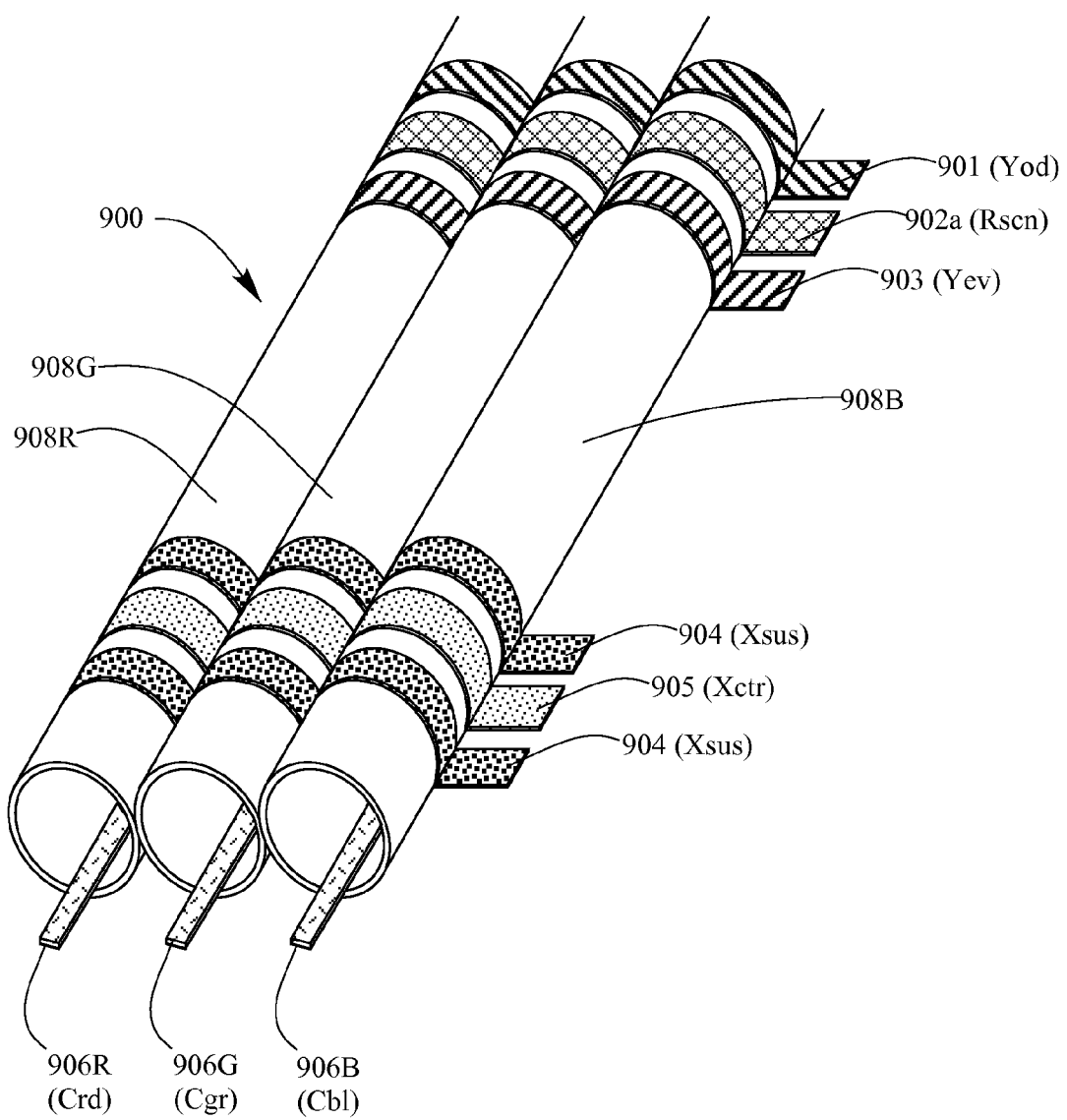
FIG. 9A illustrates the electrode structure for an AC plasma display structure with elongated tubes.

FIG. 9A shows a tubular PDP electrode structure 900. As shown there are three tubes 908R, 908G, 908B filled with ionizable gas to define RGB pixels or sub-pixels. The RGB sub-pixels may be defined by a luminescent material located inside or outside each designated tube 908R, 908G, 908B. Each tube may contain a color gas such as an excimer and/or made from a color material such as tinted glass. The display's row sustain electrodes, consisting of X sustain (Xsus) 904 and opposing Y odd (Yod) 901 or Y even (Yev) 903 sustain electrodes, have a separation between them. The separation is sufficient to allow positive column gas discharge sustaining, typically 800 microns or more. Row scan electrodes (Rscn) 902*a* are positioned between Yod 901 and Yev 903 sustain electrodes. The X Center electrodes (Xctr) 905 are in the space between the Xsus electrodes 904. During the setup or conditioning period plasma discharges produce unwanted light output at these electrodes. Also, during the addressing period unwanted light is produced at the Row Scan electrodes (Rscn) 902*a*. While the X Center electrodes (Xctr) 905 and Row Scan electrodes (Rscn) 902*a* mask out a substantial portion of this unwanted light, further improvement is made possible by the addition of horizontal black stripes (not shown) covering the area between the display's rows. The masking out of unwanted light and the use of black stripes provides a very high contrast ratio for the display. Column Data electrodes 906R, 906G, 906B are used in addressing each sub-pixel. Full color RGB is addressed by (Crd) 906R (red), (Cgr) 9006G (green), and (Cbl) 906B blue electrodes.

The Row Scan and Column Data electrodes are the display's addressing electrodes. In this design the wide Row Scan electrode has a greater area facing to the Column Data electrode, which reduces the discharge delay. The addressing electrodes are separate from and driven independently from sustain X and Y electrodes. Therefore this design is a true independent sustain/address type. All electrodes whose drive voltage pulses are in opposition make their electrode connections to opposite sides of the panel.

FIG. 9B is a top view of a tubular PDP electrode structure 900 showing Y odd electrode 901, Row scan electrode 902, Y even electrode 903, X sustain electrode 904, X center electrode 905, and Column Data electrodes 906R, 906G, 906B.

FIG. 9C is a section 9C-9C view of the tubular PDP electrode structure 900 seen in FIG. 9B. Shown are Y odd electrode 901, Row scan electrode 902, Y even electrode 903, X sustain electrode 904, X center electrode 905, and Column Data electrode 906B.

FIG. 9D is a section 9D-9D view of the tubular PDP electrode structure 900 seen in FIG. 9B. Shown are X sustain electrode 904 and Column Data electrodes 906R, 906G, 906B.

Figure 10:
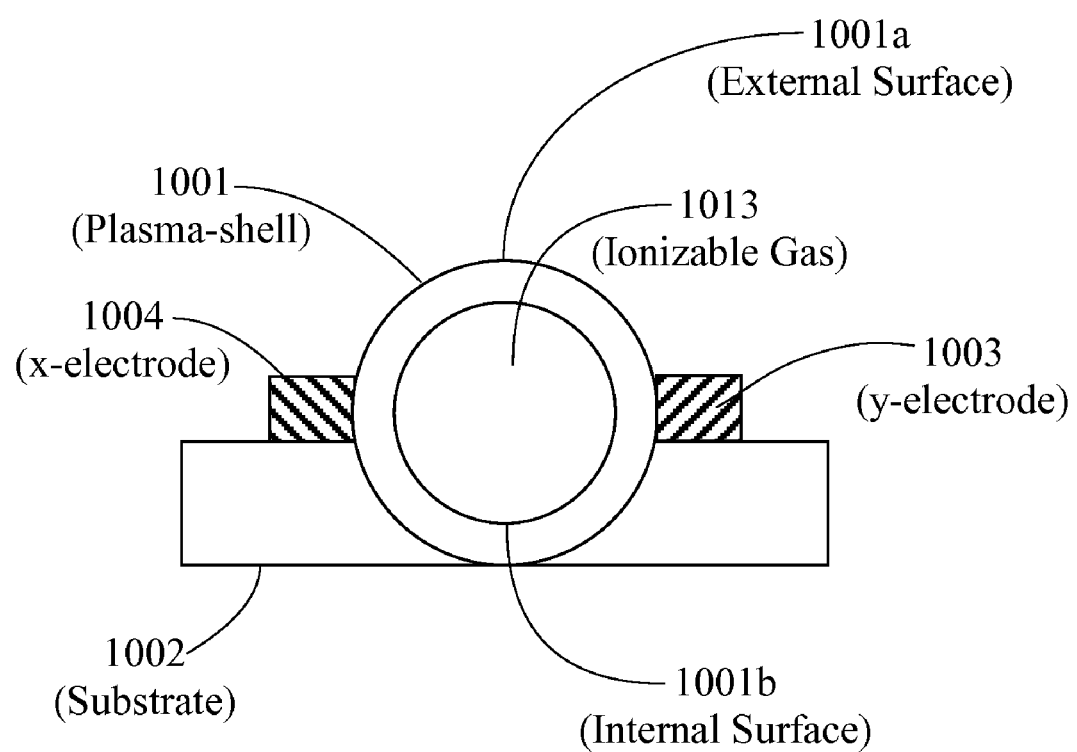
FIG. 10 shows a Plasma-shell mounted on a substrate as a PDP pixel element.

In one embodiment, the Plasma-tube gas discharge device also includes a Plasma-shell as a pixel element as shown in FIG. 10. In FIG. 10 the Plasma-shell 1001 is illustrated as a Plasma-sphere, but may be a Plasma-disc or Plasma-dome. For the assembly of multiple PDP cells or pixels, it is contemplated using Plasma-shells of one geometric shape or a combination of Plasma-shells having different geometric shapes. In FIG. 10, the Plasma-shell 1001 has an external surface 1001a and an internal surface 1001b and is positioned in a well or cavity on a PDP substrate 1002. The Plasma-shell 1001 is composed of a material typically selected to have the properties of transmissivity to light, while being sufficiently impermeable as to the confined ionizable gas 1013. The gas 1013 is selected so as to discharge and produce light in the visible, IR, or UV range when a voltage is applied to electrodes 1004 and 1003. In an embodiment where the discharge of the ionizable gas produces UV, a UV excitable phosphor (not shown) may be applied to the exterior and/or interior of the Plasma-shell 1001 or embedded within the shell to produce light. Besides luminescent substances, other materials may be applied to the interior and/or exterior of the shell to enhance contrast and/or to decrease operating voltage. One such material is a secondary electron emitter material such as magnesium oxide. Magnesium oxide is used in a gas discharge device to decrease operating voltages. Also light reflective materials may be used. The materials may be applied as coatings or impregnated into the shell.

Plasma-Disc

A Plasma-shell with two substantially flattened opposite sides, such as a flat top and flat bottom is called a Plasma-disc. A Plasma-disc may be formed by flattening a Plasma-sphere on one or more pairs of opposing sides such as top and bottom. The flat sides are typically used for mounting the Plasma-disc to a substrate and connecting the Plasma-disc to electrical contacts. The flattening of the Plasma-sphere to form a Plasma-disc is typically done while the sphere shell is at an ambient temperature or at elevated softening temperature below the melting temperature. The flat viewing surface in a Plasma-disc tends to increase the overall luminous efficiency of a PDP.

Figure 11A:
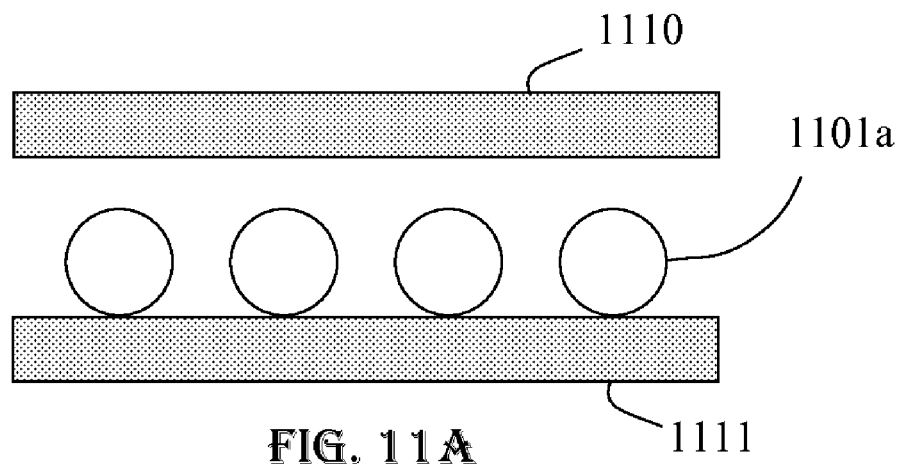
FIGS. 11A, 11B, and 11C show process steps for making Plasma-discs.
Figure 11B:
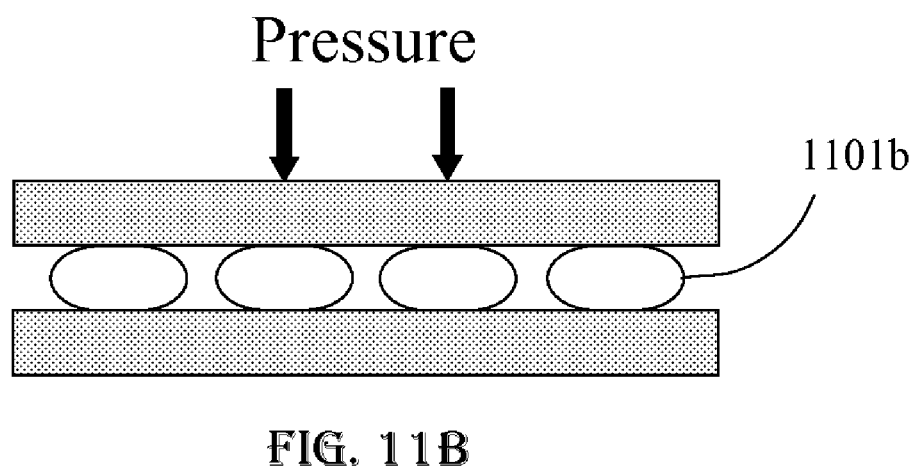
Figure 11C:
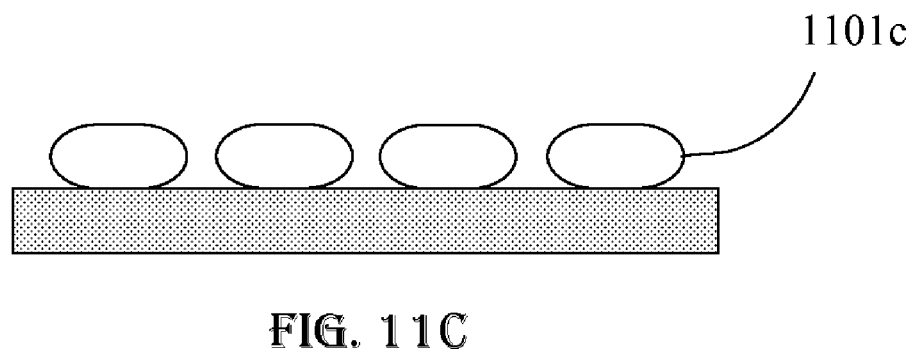

Plasma-discs may be produced while the Plasma-sphere is at an elevated temperature below its melting point. While the Plasma-sphere is at the elevated temperature, a sufficient pressure or force is applied to a member 1110 to flatten the spheres 1101a between members 1110 and 1111 into disc shapes with flat top and bottom as illustrated in FIGS. 11A, 11B, and 11C. FIG. 11A shows a Plasma-sphere. FIG. 11B shows uniform pressure applied via member 1110 to the Plasma-sphere to form a flattened Plasma-disc 1101b. Pressure can be applied to both members 1110 and 1111. Heat can be applied during the flattening process such as by heating members 1110 and 1111. FIG. 11C shows the resultant flat Plasma-disc 1101c. One or more luminescent substances can be applied to the Plasma-disc. Like a coin that can only land "heads" or "tails," a Plasma-disc with a flat top and flat bottom may be applied to a substrate in one of two flat positions. However, in some embodiments, the Plasma-disc may be positioned on edge on or within the surface of the substrate.

Plasma-dome

Figure 12A:
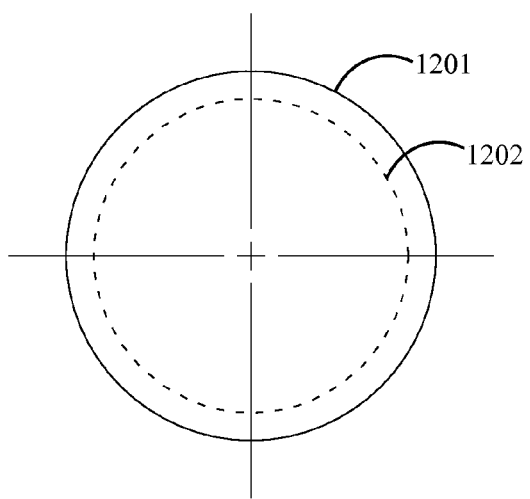
FIGS. 12A, 12B, and 12C show a Plasma-dome with one flat side.
Figure 12B:
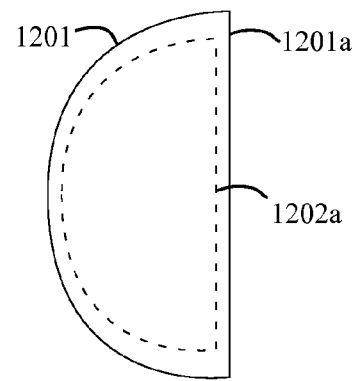
Figure 12C:
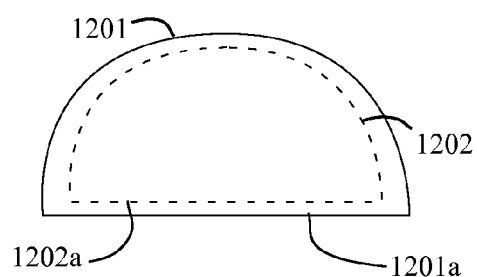

A Plasma-dome is shown in FIGS. 12A, 12B, and 12C. FIG. 12A is a top view of a Plasma-dome showing an outer shell wall 1201 and an inner shell wall 1202. FIG. 12B is a right side view of FIG. 12A showing a flattened outer wall 1201a and flattened inner wall 1202a. FIG. 12C is a bottom view of FIG. 12A.

Figure 13A:
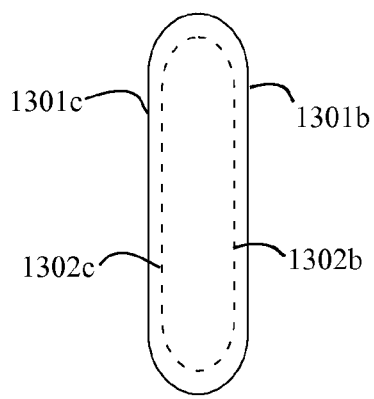
FIGS. 13A, 13B, and 13C show a Plasma-dome with multiple flat sides.
Figure 13B:
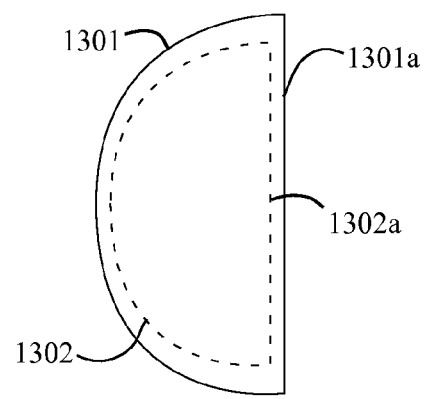
Figure 13C:
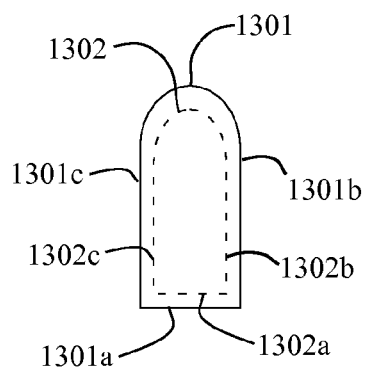

FIG. 13A is a top view of a Plasma-dome with flattened inner shell walls 1302b and 1302c and flattened outer shell walls 1301b and 1301c. FIG. 13B is a right side view of FIG. 13A showing flattened outer wall 1301a and flattened inner wall 1302a with a dome having outer wall 1301 and inner wall 1302. FIG. 13C is a bottom view of FIG. 13A. In forming a PDP, the dome portion may be positioned within the substrate with the flat side up in the viewing direction or with the dome portion up in the viewing direction.

Figure 14A:
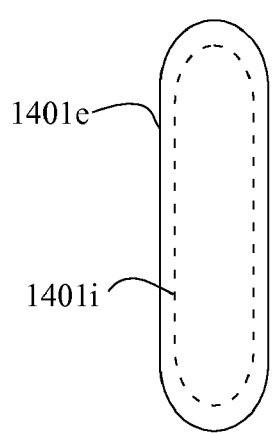
FIGS. 14A and 14B show a Plasma-disc.
Figure 14B:
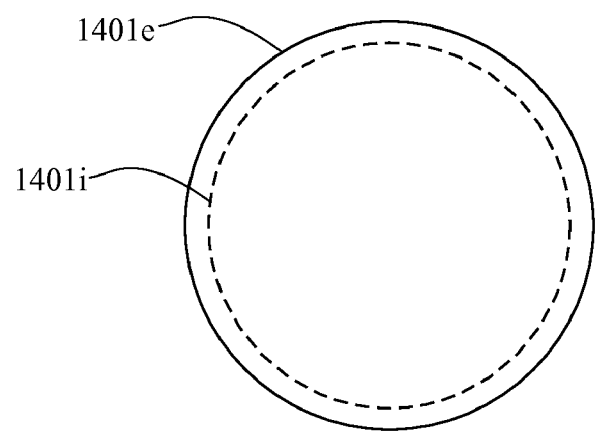

FIGS. 14A and 14B show a Plasma-disc with opposite flat sides and inner surface 1401i and exterior surface of 1401e. FIG. 14A is a view of all sides of FIG. 14B.

Figure 15:
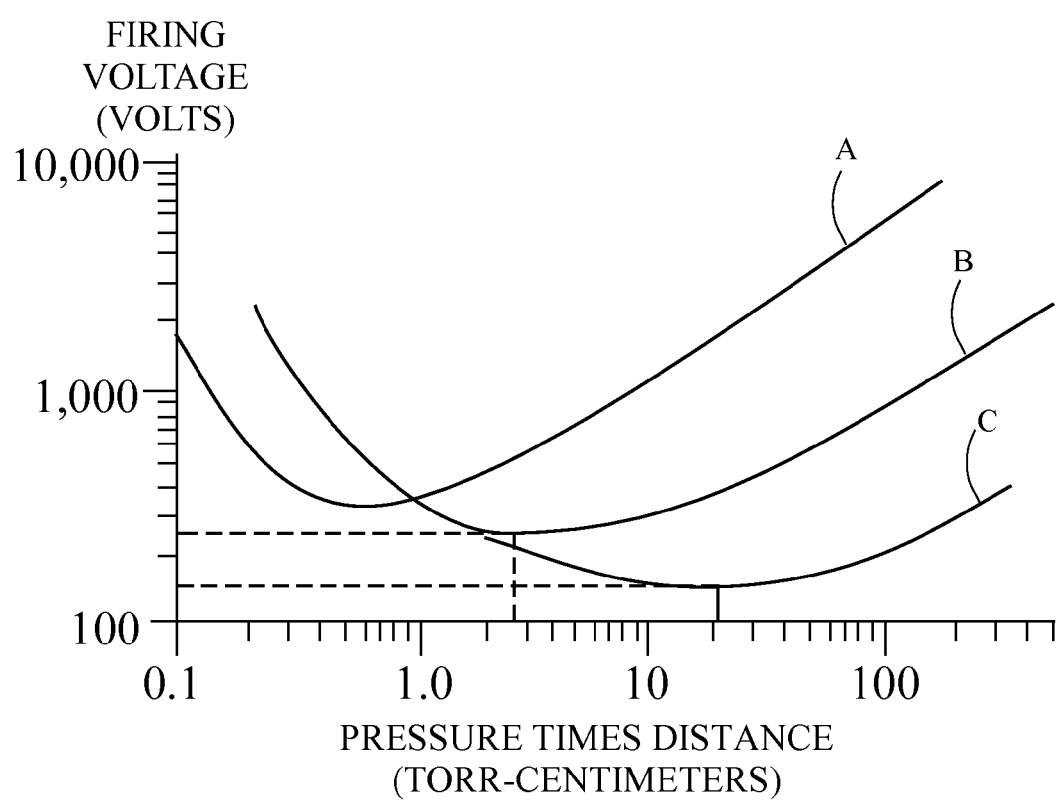
FIG. 15 shows Paschen curves for three hypothetical ionizable gases.

Each Plasma-tube or Plasma-shell is filled with an ionizable gas. Typically an ionizable gas has a unique curve associated with it called a Paschen curve as illustrated in FIG. 15. The Paschen curve is a graph of the breakdown voltage versus the product of pressure times discharge distance. It is shown in FIG. 15 as Torr-centimeters. As shown, each Paschen-curve typically has a saddle region in which the voltage is at minimum. Often it is desirable to select pressure and gas discharge distance in the saddle region to minimize the voltage. In the case of a Plasma-tube or Plasma-sphere, the discharge distance is the diameter or a chord of the tube or sphere determined by the positioning and spacing of the electrode. In the case of another geometric shape such as a Plasma-disc or Plasma-dome, it is the axis across the geometric body selected for gas discharge.

PDP Electronics

FIG. 7 is a block diagram of a plasma display panel (PDP) 10 with electronic circuitry 21 for y row scan electrodes 18A, bulk sustain electronic circuitry 22B for x bulk sustain electrode 18B and column data electronic circuitry 24 for the column data electrodes 12. The pixels or sub-pixels of the PDP comprise Plasma-tubes alone or in combination with Plasma-shells not shown in FIG. 7.

There is also shown row sustain electronic circuitry 22A with an energy power recovery electronic circuit 23A. There is also shown energy power recovery electronic circuitry 23B for the bulk sustain electronic circuitry 22B.

The electronics architecture used in FIG. 7 may be as described in U.S. Pat. No. 7,307,602 (Wedding et al.), incorporated herein by reference. In addition, other architectures may be utilized to address Plasma-tubes and Plasma-shells, including Plasma-spheres, Plasma-discs, or Plasma-domes.

ADS

A basic electronics architecture for addressing and sustaining a surface discharge AC plasma display is called Address Display Separately (ADS). The ADS architecture may be used for a monochrome or multi-color display. The ADS architecture is disclosed in a number of Fujitsu patents including U.S. Pat. Nos. 5,541,618 (Shinoda) and 5,724,054 (Shinoda), incorporated herein by reference. Also see U.S. Pat. Nos. 5,446,344 (Kanazawa) and 5,661,500 (Shinoda et al.), incorporated herein by reference. ADS has become a basic electronic architecture widely used in the AC plasma display industry for the manufacture of PDP displays including monitors and television.

The Shinoda ADS architecture has been widely used in the display industry. ADS is disclosed in U.S. Pat. No. 5,745,086 (Weber), incorporated herein by reference. See FIGS. 2, 3, 11 of Weber ('086). The ADS method of addressing and sustaining a surface discharge display as disclosed in U.S. Pat. Nos. 5,541,618 (Shinoda) and 5,724,054 (Shinoda), incorporated herein by reference, sustains the entire panel (all rows) after the addressing of the entire panel. The addressing and sustaining are done separately and are not done simultaneously. ADS may be used to address Plasma-tubes and Plasma-shells including Plasma-spheres, Plasma-discs, or Plasma-domes in a PDP.

ALIS

This invention may also use the so-called shared electrode or electronic ALIS drive system disclosed by Fujitsu in U.S. Pat. Nos. 6,489,939 (Asso et al.), 6,498,593 (Fujimoto et al.), 6,531,819 (Nakahara et al.), 6,559,814 (Kanazawa et al.), 6,577,062 (Itokawa et al.), 6,603,446 (Kanazawa et al.), 6,630,790 (Kanazawa et al.), 6,636,188 (Kanazawa et al.), 6,667,579 (Kanazawa et al.), 6,667,728 (Kanazawa et al.), 6,703,792 (Kawada et al.), and U.S. Patent Application Publication, 2004/0046509 (Sakita), all incorporated herein by reference. ALIS may be used to address Plasma-tubes and Plasma-shells including Plasma-spheres, Plasma-discs, and Plasma-domes in a PDP.

AWD

Another electronic architecture is called Address While Display (AWD). The AWD electronics architecture was first used during the 1970s and 1980s for addressing and sustaining monochrome PDP. In AWD architecture, the addressing (write and/or erase pulses) are interspersed with the sustain waveform and may include the incorporation of address pulses onto the sustain waveform. Such address pulses may be on top of the sustain and/or on a sustain notch or pedestal. See for example U.S. Pat. Nos. 3,801,861 (Petty et al.) and 3,803,449 (Schmersal), both incorporated herein by reference.

The AWD electronics architecture for addressing and sustaining monochrome PDP has also been adopted for addressing and sustaining multi-color PDP. For example, Samsung Display Devices Co., Ltd. has disclosed AWD and the superimpose of address pulses with the sustain pulse. Samsung specifically labels this as Address While Display (AWD). See "High-Luminance and High-Contrast HDTV PDP with Overlapping Driving Scheme", J. Ryeom et al., pages 743 to 746, *Proceedings of the Sixth International Display Workshops*, IDW 99, Dec. 1-3, 1999, Sendai, Japan and AWD as disclosed in U.S. Pat. No. 6,208,081 (Eo et al.), incorporated herein by reference.

LG Electronics Inc. has disclosed a variation of AWD with a Multiple Addressing in a Single Sustain (MASS) in U.S. Pat. No. 6,198,476 (Hong et al.), incorporated herein by reference. Also see U.S. Pat. No. 5,914,563 (Lee et al.), incorporated herein by reference. AWD may be used to address Plasma-tubes and Plasma-shells including Plasma-spheres, Plasma-discs, and Plasma-domes in a PDP.

An AC voltage refresh technique or architecture is disclosed by U.S. Pat. No. 3,958,151 (Yano et al.), incorporated herein by reference. In one embodiment, the Plasma-tubes are filled with pure neon and operated with the architecture of Yano ('151).

Energy Recovery

Energy recovery is used for the efficient operation of a PDP. Examples of energy recovery architecture and circuits are well known in the prior art. These include U.S. Pat. Nos. 4,772,884 (Weber et al.), 4,866,349 (Weber et al.), 5,081,400 (Weber et al.), 5,438,290 (Tanaka), 5,642,018 (Marcotte), 5,670,974 (Ohba et al.), 5,808,420 (Rilly et al.) and 5,828,353 (Kishi et al.), all incorporated herein by reference.

Slow Ramp Reset

Slow rise slopes or ramps may be used in the practice of this invention. The prior art discloses slow rise slopes or ramps for the addressing of AC plasma displays. The early patents include U.S. Pat. Nos. 4,063,131 (Miller), 4,087,805 (Miller), 4,087,807 (Miavecz), 4,611,203 (Criscimagna et al.), and 4,683,470 (Criscimagna et al.), all incorporated herein by reference.

Architecture for a slow ramp reset voltage is disclosed in U.S. Pat. No. 5,745,086 (Weber), incorporated herein by reference. Weber ('086) discloses positive or negative ramp voltages that exhibit a slope that is set to assure that current flow through each display pixel site remains in a positive resistance region of the gas discharge. The slow ramp architecture may be used in combination with ADS as disclosed in FIG. 11 of Weber ('086). PCT Patent Application WO 00/30065 (Hibino et al.) and U.S. Pat. No. 6,738,033 (Hibino et al.) also disclose architecture for a slow ramp reset voltage and are incorporated herein by reference.

Artifact Reduction

Artifact reduction techniques may be used in the practice of this invention. The PDP industry has used various techniques to reduce motion and visual artifacts in a PDP display, for example as disclosed in U.S. Pat. No. 7,456,808 (Wedding et al.), incorporated herein by reference. Pioneer of Tokyo, Japan has disclosed a technique called CLEAR for the reduction of false contour and related problems. See "Development of New Driving Method for AC-PDPs", Tokunaga et al., *Proceedings of the Sixth International Display Workshops*, IDW 99, pages 787-790, Dec. 1-3, 1999, Sendai, Japan. Also see European Patent Applications EP 1020838 A1 by Tokunaga et al. The CLEAR techniques disclosed in the above Pioneer IDW publication and Pioneer EP 1020838 A1, are incorporated herein by reference. The selected electronic architecture such as ADS may be combined with a CLEAR or other techniques for the reduction of motion and visual artifacts.

SAS

In one embodiment, it is contemplated using SAS electronic architecture to address a PDP panel constructed of Plasma-tubes. SAS architecture comprises addressing one display section of a surface discharge PDP while another section of the PDP is being simultaneously sustained. This architecture is called Simultaneous Address and Sustain (SAS).

SAS offers a unique electronic architecture which is different from prior art columnar discharge and surface discharge electronics architectures including ADS, AWD, and MASS. It offers important advantages as discussed below.

In the practice of SAS with a surface discharge PDP, addressing voltage waveforms are applied to a surface discharge PDP having an array of data electrodes on a bottom or rear substrate and an array of at least two electrodes on a top or front viewing substrate, one top electrode being a bulk sustain electrode x and the other top electrode being a row scan electrode y. The row scan electrode y may also be called a row sustain electrode because it performs the dual functions of both addressing and sustaining.

An important feature and advantage of SAS is that it allows selectively addressing of one section of a surface discharge PDP with selective write and/or selective erase voltages while another section of the panel is being simultaneously sustained. A section is defined as a predetermined number of bulk sustain electrodes x and row scan electrodes y. In a surface discharge PDP, a single row is comprised of one pair of parallel top electrodes x and y.

In one embodiment of SAS, there is provided the simultaneous addressing and sustaining of at least two sections $S_1$ and $S_2$ of a surface discharge PDP having a row scan, bulk sustain, and data electrodes, which comprises addressing one section $S_1$ of the PDP while a sustaining voltage is being simultaneously applied to at least one other section $S_2$ of the PDP.

In another embodiment, the simultaneous addressing and sustaining is interlaced whereby one pair of electrodes y and x are addressed without being sustained and an adjacent pair of electrodes y and x are simultaneously sustained without being addressed. This interlacing can be repeated throughout the display. In this embodiment, a section S is defined as one or more pairs of interlaced y and x electrodes.

In the practice of SAS, the row scan and bulk sustain electrodes of one section that is being sustained may have a reference voltage which is offset from the voltages applied to the data electrodes for the addressing of another section such that the addressing does not electrically interact with the row scan and bulk sustain electrodes of the section which is being sustained.

In a plasma display in which gray scale is realized through time multiplexing, a frame or a field of picture data is divided into subfields. Each subfield is typically composed of a reset period, an addressing period, and a number of sustains. The number of sustains in a subfield corresponds to a specific gray scale weight. Pixels that are selected to be ON in a given subfield will be illuminated proportionally to the number of sustains in the subfield. In the course of one frame, pixels may be selected to be ON or OFF for the various subfields. A gray scale image is realized by integrating in time the various ON and OFF pixels of each of the subfields.

Addressing is the selective application of data to individual pixels. It includes the writing or erasing of individual pixels.

Reset is a voltage pulse which forms wall charges to enhance the addressing of a pixel. It can be of various waveform shapes and voltage amplitudes including fast or slow rise time voltage ramps and exponential voltage pulses. A reset is typically used at the start of a frame before the addressing of a section. A reset may also be used before the addressing period of a subsequent subfield.

In accordance with another embodiment of the SAS architecture, there is applied a slow rise time or slow ramp reset voltage as disclosed in U.S. Pat. No. 5,745,086 (Weber) cited above and incorporated herein by reference. As used herein slow rise time or slow ramp voltage is a bulk address commonly called a reset pulse with a positive or negative slope so as to provide a uniform wall charge at all pixels in the PDP.

The slower the rise time of the reset ramp, the less visible the light or background glow from those off-pixels (not in the on-state) during the slow ramp bulk address.

Less background glow is particularly desirable for increasing the contrast ratio which is inversely proportional to the light-output from the off-pixels during the reset pulse. Those off-pixels which are not in the on-state will give a background glow during the reset. The slower the ramp, the less light output with a resulting higher contrast ratio. Typically the slow ramp reset voltages disclosed in the prior art have a slope of about 3.5 volts per microsecond with a range of about 2 to about 9 volts per microsecond. In the SAS architecture, it is possible to use slow ramp reset voltages below 2 volts per microsecond, for example about 1 to 1.5 volts per microsecond without decreasing the number of PDP rows, without decreasing the number of sustain pulses or without decreasing the number of subfields.

Positive Column Gas Discharge

In one embodiment, it is contemplated that the gas discharge device may be operating using positive column gas discharge. The use of Plasma-tubes, including Plasma-shells such as Plasma-spheres, Plasma-discs, and Plasma-domes allow the gas discharge device to be operated with positive column gas discharge, for example as disclosed by Weber, Rutherford, and other prior art cited hereinafter and incorporated by reference. The discharge length inside the Plasma-tube must be sufficient to accommodate the length of the positive column gas discharge, generally up to about 1400 micrometers. The Plasma-tubes may be of any geometric shape and of any predetermined length, typically at least about 1400 micrometers to accommodate positive column discharge. A Plasma-tube typically contains hundreds of gas discharge cells or pixels.

"PDP With Improved Drive Performance at Reduced Cost" by James Rutherford, Huntertown, Ind., *Proceedings of the Ninth International Display Workshops*, Hiroshima, Japan, pages 837 to 840, Dec. 4-6, 2002, discloses an electrode structure and electronics for a positive column plasma display.

Additional positive column gas discharge prior art incorporated by reference includes:
"Positive Column AC Plasma Display", Larry F. Weber, $23^{rd}$ International Display Research Conference (IDRC 03), Sep. 16-18, *Conference Proceedings*, pages 119-124, Phoenix, Ariz.
"Dielectric Properties and Efficiency of Positive Column AC PDP", Nagorny et al., $23^{rd}$ International Display Research Conference (IDRC 03), Sep. 16-18, 2003, *Conference Proceedings*, P-45, pages 300-303, Phoenix, Ariz.
"Simulations of AC PDP Positive Column and Cathode Fall Efficiencies", Drallos et al., $23^{rd}$ International Display Research Conference (IDRC 03), Sep. 16-18, 2003, *Conference Proceedings*, P-48, pages 304-306, Phoenix, Ariz.
U.S. Pat. No. 6,184,848 (Weber)
U.S. Pat. No. 6,376,995 (Kato et al.)
U.S. Pat. No. 6,528,952 (Kato et al.)
U.S. Pat. No. 6,693,389 (Marcotte et al.)
U.S. Pat. No. 6,768,478 (Wani et al.)
U.S. Patent Application Publication 2003/0102812 (Marcotte et al.)
U.S. Pat. No. 7,122,961 (Wedding)
U.S. Pat. No. 7,157,854 (Wedding)
U.S. Pat. No. 7,176,628 (Wedding)
U.S. Pat. No. 7,518,576 (Rutherford)

Radio Frequency

The Plasma-tubes may be operated with radio frequency (RF). The RF may especially be used to sustain the plasma discharge. RF may also be used to operate the Plasma-tubes with a positive column discharge. The use of RF in a PDP is disclosed in U.S. Pat. Nos. 6,271,810 (Yoo et al.), 6,340,866 (Yoo), 6,473,061 (Lim et al.), 6,476,562 (Yoo et al.), 6,483, 489 (Yoo et al.), 6,501,447 (Kang et al.), 6,605,897 (Yoo), 6,624,799 (Kang et al.), 6,661,394 (Choi), and 6,794,820 (Kang et al.), incorporated herein by reference.

Shell Materials

The Plasma-tube may be constructed of any suitable material including glass or plastic as disclosed in the prior art. In the practice of this invention, the Plasma-tube is made of any suitable inorganic compounds of metals and/or metalloids, including mixtures or combinations thereof.

Contemplated inorganic compounds include the oxides, carbides, nitrides, nitrates, silicates, silicides, sulfides, sulfates, aluminates, phosphates, borides, and/or borates.

The metals and/or metalloids are selected from magnesium, calcium, strontium, barium, yttrium, lanthanum, cerium, neodymium, gadolinium, terbium, erbium, thorium, titanium, zirconium, hafnium, vanadium, niobium, tantalum, chromium, molybdenum, tungsten, manganese, rhenium, iron, ruthenium, osmium, cobalt, rhodium, iridium, nickel, copper, silver, zinc, cadmium, boron, aluminum, gallium, indium, thallium, carbon, silicon, germanium, tin, lead, phosphorus, and bismuth.

Inorganic materials suitable for use are magnesium oxide (s), aluminum oxide(s), zirconium oxide(s), and silicon carbide(s) such as MgO, $Al_2O_3$, $ZrO_2$, $SiO_2$, and/or SiC.

In one embodiment, the shell of the Plasma-tube is composed wholly or in part of one or more borides of one or more members of Group IIIB of the Periodic Table and/or the rare earths including both the Lanthanide Series and the Actinide Series of the Periodic Table. Contemplated Group IIIB borides include scandium boride and yttrium boride. Contemplated rare earth borides of the Lanthanides and Actinides include lanthanum boride, cerium boride, praseodymium boride, neodymium boride, gadolinium boride, terbium boride, actinium boride, and thorium boride.

In another embodiment, the Plasma-tube shell is composed wholly or in part of one or more Group IIIB and/or rare earth hexaborides with the Group IIIB and/or rare earth element being one or more members selected from Sc, Y, La, Ce, Pr, Nd, Sm, Eu, Gd, Tb, Dy, Ho, Yb, Ac, Th, Pa, and U. Examples include lanthanum hexaboride, cerium hexaboride, and gadolinium hexaboride.

Rare earth borides, including rare earth hexaboride compounds, and methods of preparation are disclosed in U.S. Pat. Nos. 3,258,316 (Tepper et al.), 3,784,677 (Versteeg et al.), 4,030,963 (Gibson et al.), 4,260,525 (Olsen et al.), 4,999,176 (Iltis et al.), 5,238,527 (Otani et al.), 5,336,362 (Tanaka et al.), 5,837,165 (Otani et al.), and 6,027,670 (Otani et al.), all incorporated herein by reference.

Group IIA alkaline earth borides are contemplated including borides of Mg, Ca, Ba, and Sr. In one embodiment, there is used a material containing trivalent rare earths and/or trivalent metals such as La, Ti, V, Cr, Al, Ga, and so forth having crystalline structures similar to the perovskite structure, for example as disclosed in U.S. Pat. No. 3,386,919 (Forrat), incorporated herein by reference.

The Plasma-tube may also be composed of or contain carbides, borides, nitrides, silicides, sulfides, oxides and other compounds of metals and/or metalloids of Groups IV and V as disclosed and prepared in U.S. Pat. No. 3,979,500 (Sheppard et al.), incorporated herein by reference. Group IV compounds including borides of Group IVB metals such as titanium, zirconium, and hafnium and Group VB metals such as vanadium, niobium, and tantalum are contemplated.

The Plasma-tube can be made of fused particles of glass, ceramic, glass ceramic, refractory, fused silica, quartz, or like amorphous and/or crystalline materials including mixtures of such. In one embodiment, a ceramic material is selected based on its transmissivity to light after firing. This may include selecting ceramics material with various optical cut off frequencies to produce various colors. One material contemplated for this application is aluminum oxide. Aluminum oxide is transmissive from the UV range to the IR range. Because it is transmissive in the UV range, luminescent material such as phosphors excited by UV may be applied to the exterior of the Plasma-tube to produce various colors. The application of the phosphor to the exterior of the Plasma-tube may be done by any suitable means before or after the Plasma-tube is positioned in the PDP, i.e., on a flexible, semiflexible, or rigid substrate. There may be applied several layers or coatings of phosphors, each of a different composition. The external layer or coating may comprise an organic substance, an inorganic substance, or a combination of organic and inorganic substances. Up-conversion or down-conversion substances may be included.

In one specific embodiment of this invention, the Plasma-tube is made of an aluminate silicate or contains a layer of aluminate silicate. When the ionizable gas mixture contains helium, the aluminate silicate is especially beneficial in preventing the escaping of helium.

It is also contemplated that the Plasma-tube may be made of lead silicates, lead phosphates, lead oxides, borosilicates, alkali silicates, aluminum oxides, and pure vitreous silica.

For secondary electron emission, the Plasma-tube may be made in whole or in part from one or more materials such as magnesium oxide having a sufficient Townsend coefficient. These include inorganic compounds of magnesium, calcium, strontium, barium, gallium, lead, aluminum, boron, and the rare earths especially lanthanum, cerium, actinium, and thorium. The contemplated inorganic compounds include oxides, carbides, nitrides, nitrates, silicates, aluminates, phosphates, borates, and other inorganic compounds of the above and other elements.

In one embodiment, the Plasma-tube is made of a luminescent material that also may contain a luminescent material on the exterior. The application of a luminescent material to the exterior of the Plasma-tube is done by any suitable means before or after the Plasma-tube is positioned on a substrate. There may be applied several layers or coatings of luminescent materials such as phosphors, each of a different composition. The external layer or coating may comprise an organic substance, an inorganic substance, or a combination of organic and inorganic substances. Up-conversion or down-conversion substances may be included.

The Plasma-tube may contain or be partially or wholly constructed of luminescent materials such as inorganic phosphor(s) or a combination of organic and inorganic phosphors. The interior and/or exterior of the Plasma-tube may contain a continuous or discontinuous layer or coating of phosphor. Phosphor particles may also be introduced inside the Plasma-tube or embedded within the tube. Luminescent quantum dots may also be incorporated into the tube.

Secondary Electron Emission

The use of secondary electron emission (Townsend coefficient) materials in a plasma display is well known in the prior art and is disclosed in U.S. Pat. No. 3,716,742 (Nakayama et al.). The use of Group IIA compounds including magnesium oxide is disclosed in U.S. Pat. Nos. 3,836,393 and 3,846,171. The use of rare earth compounds in an AC plasma display is disclosed in U.S. Pat. Nos. 4,126,807 (Wedding et al.), 4,126,809 (Wedding et al.), and 4,494,038 (Wedding et al.), incorporated herein by reference. Lead oxide may also be used as a secondary electron material. Mixtures of secondary electron emission materials may be used.

In one embodiment, the secondary electron emission material is magnesium oxide on part or all of the internal surface of a Plasma-tube. The secondary electron emission material may also be on the external surface. The thickness of the magnesium oxide may range from about 250 Angstrom Units to about 10,000 Angstrom Units (Å).

The entire Plasma-tube may be made of a secondary electronic material such as magnesium oxide. A secondary electron material may also be dispersed or suspended as particles within the ionizable gas such as with a fluidized bed. Phosphor particles may also be dispersed or suspended in the gas such as with a fluidized bed, and may also be added to the inner or external surface of the Plasma-tube.

Magnesium oxide increases the ionization level through secondary electron emission that in turn leads to reduced gas discharge voltages. In one embodiment, the magnesium oxide is on the inner surface of the Plasma-tube and the phosphor is located on external surface of the Plasma-tube. Magnesium oxide is susceptible to contamination. To avoid contamination, gas discharge (plasma) displays are assembled in clean rooms that are expensive to construct and maintain. In traditional plasma panel production, magnesium oxide is applied to an entire open substrate surface and is vulnerable to contamination. The adding of the magnesium oxide layer to the inside of a Plasma-tube minimizes exposure of the magnesium oxide to contamination.

The magnesium oxide may be applied to the inside of the Plasma-tube during manufacture or by incorporating magnesium vapor as part of the ionizable gases introduced into the Plasma-tube while the tube is at an elevated temperature. The magnesium may be oxidized while at an elevated temperature.

In some embodiments, the magnesium oxide may be added as particles to the gas. Other secondary electron materials may be used in place of or in combination with magnesium oxide. In one embodiment, the secondary electron material such as magnesium oxide or any other selected material such as magnesium to be oxidized in situ is introduced into the gas by means of a fluidized bed. Other materials such as phosphor particles or vapor may also be introduced into the gas with a fluid bed or other means.

Ionizable Gas

The hollow Plasma-tube as used in the practice of this invention contain(s) one or more ionizable gas components. In the practice of this invention, the gas is selected to emit photons in the visible, IR, and/or UV spectrum.

The UV spectrum is divided into regions. The near UV region is a spectrum ranging from about 340 to 450 nm (nanometers). The mid or deep UV region is a spectrum ranging from about 225 to 325 nm. The vacuum UV region is a spectrum ranging from about 100 to 200 nm. The PDP prior art has used vacuum UV to excite photoluminescent phosphors. In one embodiment, there is used a gas which provides UV over the entire spectrum ranging from about 100 to about 450 nm. The PDP operates with greater efficiency at the higher range of the UV spectrum, such as in the mid UV and/or near UV spectrum. In one embodiment, there is selected a gas which emits gas discharge photons in the near UV range. In another embodiment, there is selected a gas which emits gas discharge photons in the mid UV range. In one embodiment, the selected gas emits photons from the upper part of the mid UV range through the near UV range, about 225 nm to 450 nm.

As used herein, ionizable gas or gas means one or more gas components. In the practice of this invention, the gas is typically selected from a mixture of the noble or rare gases of neon, argon, xenon, krypton, helium, and/or radon. The rare gas may be a Penning gas mixture. Other contemplated gases include nitrogen, $CO_2$, CO, mercury, halogens, excimers, oxygen, hydrogen, and mixtures thereof.

Isotopes of the above and other gases are contemplated. These include isotopes of helium such as helium-3, isotopes of hydrogen such as deuterium (heavy hydrogen), tritium ($T^3$) and DT, isotopes of the rare gases such as xenon-129, isotopes of oxygen such as oxygen-18. Other isotopes include deuterated gases such as deuterated ammonia ($ND_3$) and deuterated silane ($SiD_4$).

In one embodiment, a two-component gas mixture (or composition) is used such as a mixture of argon and xenon, argon and helium, xenon and helium, neon and argon, neon and xenon, neon and helium, neon and krypton, argon and krypton, xenon and krypton, and helium and krypton.

Specific two-component gas mixtures (compositions) include about 5% to 90% atoms of argon with the balance xenon. Another two-component gas mixture is a mother gas of neon containing 0.05% to 15% atoms of xenon, argon, or krypton. This can also be a three-component, four-component, or five-component gas by using small quantities of an additional gas or gases selected from xenon, argon, krypton, and/or helium.

In another embodiment, a three-component ionizable gas mixture is used such as a mixture of argon, xenon, and neon wherein the mixture contains at least 5% to 80% atoms of argon, up to 15% xenon, and the balance neon. The xenon is present in a minimum amount sufficient to maintain the Penning effect. Such a mixture is disclosed in U.S. Pat. No. 4,926,095 (Shinoda et al.), incorporated herein by reference. Other three-component gas mixtures include argon-helium-xenon; krypton-neon-xenon; and krypton-helium-xenon.

U.S. Pat. No. 4,081,712 (Bode et al.), incorporated by reference, discloses the addition of helium to a gaseous medium of 90% to 99.99% atoms of neon and 10% to 0.01% atoms of argon, xenon, and/or krypton. In one embodiment, there is used a high concentration of helium with the balance selected from one or more gases of neon, argon, xenon, and nitrogen as disclosed in U.S. Pat. No. 6,285,129 (Park), incorporated herein by reference. A high concentration of xenon may also be used with one or more other gases as disclosed in U.S. Pat. No. 5,770,921 (Aoki et al.), incorporated herein by reference.

Pure neon may be used and the Plasma-tubes operated without memory margin using the architecture disclosed by U.S. Pat. No. 3,958,151 (Yano) discussed above and incorporated by reference.

Excimers

Excimer gases may also be used as disclosed in U.S. Pat. Nos. 4,549,109 (Nighan et al.) and 4,703,229 (Nighan et al.), both incorporated herein by reference. Nighan et al. ('109) and ('229) disclose the use of excimer gases formed by the combination of halogens with rare gases. The halogens include fluorine, chlorine, bromine, and iodine. The rare gases include helium, xenon, argon, neon, krypton, and radon. Excimer gases may emit red, blue, green, or other color light in the visible range or light in the invisible range. The excimer gases may be used alone or in combination with phosphors. U.S. Pat. No. 6,628,088 (Kim et al.), incorporated herein by reference, also discloses excimer gases for a PDP.

Other Gases

Depending upon the application, a wide variety of gases are contemplated for the practice of this invention. Such other applications include gas-sensing devices for detecting radiation and radar transmissions. Such other gases include $C_2H_2$—$CF_4$—Ar mixtures as disclosed in U.S. Pat. Nos. 4,201,692 (Christophorou et al.) and 4,309,307 (Christophorou et al.), both incorporated herein by reference. Also contemplated are gases disclosed in U.S. Pat. No. 4,553,062 (Ballon et al.), incorporated by reference. Other gases include sulfur hexafluoride, HF, $H_2S$, $SO_2$, SO, $H_2O_2$, and so forth.

Gas Pressure

This invention allows the construction and operation of a gas discharge (plasma) display with gas pressures at or above 1 atmosphere. In the prior art, gas discharge (plasma) displays are operated with the ionizable gas at a pressure below atmospheric. Gas pressures above atmospheric are not used in the prior art because of structural problems. Higher gas pressures above atmospheric may cause the display substrates to separate, especially at elevations of 4000 feet or more above sea level. Such separation may also occur between the substrate and a viewing envelope or dome in a single substrate or monolithic plasma panel structure.

In the practice of this invention, the gas pressure inside of the hollow Plasma-tube may be equal to or less than atmospheric pressure or may be equal to or greater than atmospheric pressure. The typical sub-atmospheric pressure is about 150 to 760 Torr. However, pressures above atmospheric may be used depending upon the structural integrity of the Plasma-tube. In one embodiment, the gas pressure inside of the Plasma-tube is equal to or less than atmospheric, about 150 to 760 Torr, typically about 350 to about 650 Torr. In another embodiment, the gas pressure inside of the Plasma-tube is equal to or greater than atmospheric. Depending upon the structural strength of the Plasma-tube, the pressure above atmospheric may be about 1 to 250 atmospheres (760 to 190,000 Ton) or greater. Higher gas pressures increase the luminous efficiency of the plasma display.

Gas Processing

This invention avoids the costly prior art gas filling techniques used in the manufacture of gas discharge (plasma) display devices. The prior art introduces gas through one or more apertures into the device requiring a gas injection hole and tube. The prior art manufacture steps typically include heating and baking out the assembled device (before gas fill) at a high-elevated temperature under vacuum for 2 to 12 hours. The vacuum is obtained via external suction through a gas fill tube inserted in an aperture. The bake out is followed by back fill of the entire panel with an ionizable gas introduced through the gas fill tube and aperture. The gas fill tube is then sealed-off.

This bake out and gas fill process is a major production bottleneck and yield loss in the manufacture of gas discharge (plasma) display devices, requiring substantial capital equipment and a large amount of process time. For color AC plasma display panels of 40 to 50 inches in diameter, the bake out and vacuum cycle may be 10 to 30 hours per panel or 10 to 30 million hours per year for a manufacture facility producing over 1 million plasma display panels per year.

The gas-filled Plasma-tubes used in this invention can be produced in large economical volumes and added to the gas discharge (plasma) display device without the necessity of costly bake out and gas process capital equipment. The savings in capital equipment cost and operations costs are substantial. Also the entire PDP does not have to be gas processed with potential yield loss at the end of the PDP manufacture.

PDP Structure

In one embodiment, the Plasma-tubes are located on or in a single substrate or monolithic PDP structure. Single substrate PDP structures are disclosed in U.S. Pat. Nos. 3,646,384 (Lay), 3,652,891 (Janning), 3,666,981 (Lay), 3,811,061 (Nakayama et al.), 3,860,846 (Mayer), 3,885,195 (Amano), 3,935,494 (Dick et al.), 3,964,050 (Mayer), 4,106,009 (Dick), 4,164,678 (Biazzo et al.), and 4,638,218 (Shinoda), all incorporated herein by reference. The Plasma-tubes may be positioned on the surface of the substrate and/or positioned in the substrate such as in channels, trenches, grooves, wells, cavities, hollows, and so forth. These channels, trenches, grooves, wells, cavities, hollows, etc., may extend through the substrate so that the Plasma-tubes positioned therein may be viewed from either side of the substrate.

The Plasma-tubes may also be positioned on or in a substrate within a dual substrate plasma display structure. Each tube is placed inside of a gas discharge (plasma) display device, for example, on the substrate along the channels, trenches or grooves between the barrier walls of a plasma display barrier structure such as disclosed in U.S. Pat. Nos. 5,661,500 (Shinoda et al.), 5,674,553 (Shinoda et al.), and 5,793,158 (Wedding), cited above and incorporated herein by reference. The Plasma-tubes may also be positioned within a cavity, well, hollow, concavity, or saddle of a plasma display substrate, for example as disclosed by U.S. Pat. No. 4,827,186 (Knauer et al.), incorporated herein by reference.

In a device as disclosed by Wedding ('158) or Shinoda et al. ('500), the Plasma-tubes may be added to substrate cavities and the space between opposing electrodes before the device is sealed. An aperture and tube can be used for bake out if needed of the space between the two opposing substrates, but the costly gas fill operation is eliminated. The Plasma-tubes may be sprayed, stamped, pressed, poured, screen-printed, or otherwise applied to the substrate. The substrate surface may contain an adhesive or sticky surface to bind the Plasma-tube to the substrate.

AC plasma displays of 40 inches or larger are fragile with risk of breakage during shipment and handling. The presence of the Plasma-tubes inside of the display device adds structural support and integrity to the device.

This invention is not limited to a flat surface display. The Plasma-tube may be positioned or located on a conformal substrate surface so as to conform to a predetermined shape such as a curved or irregular surface. In one embodiment, each Plasma-tube is positioned within a cavity on a single-substrate or monolithic gas discharge structure that has a flexible or bendable substrate. In another embodiment, the substrate is rigid. The substrate may also be partially or semi-flexible.

Substrate

In accordance with various embodiments of this invention, the gas discharge device may be comprised of a single substrate or dual substrate device with flexible, semi-flexible, or rigid substrates. The substrate may be opaque, transparent, translucent, or non-light transmitting. In some embodiments, there may be used multiple substrates of three or more. Substrates may be flexible films, such as a polymeric film substrate. The flexible substrate may also be made of metallic materials alone or incorporated into a polymeric substrate. Alternatively or in addition, one or both substrates may be made of an optically-transparent thermoplastic polymeric material. Examples of suitable such materials are polycarbonate, polyvinyl chloride, polystyrene, polymethyl methacrylate, polyurethane polyimide, polyester, and cyclic polyolefin polymers. More broadly, the substrates may include a flexible plastic such as a material selected from the group consisting of polyether sulfone (PES), polyester terephihalate, polyethylene terephihalate (PET), polyethylene naphtholate, polycarbonate, polybutylene terephihalate, polyphenylene sulfide (PPS), polypropylene, polyester, aramid, polyamide-imide (PAI), polyimide, aromatic polyimides, polyetherimide, acrylonitrile butadiene styrene, and polyvinyl chloride, as disclosed in U.S. Patent Application Publication 2004/0179145 (Jacobsen et al.), incorporated herein by reference.

Alternatively, one or both of the substrates may be made of a rigid material. For example, one or both of the substrates may be a glass substrate. The glass may be a conventionally-available glass, for example having a thickness of approximately 0.2 mm-1 mm. Alternatively, other suitable transparent materials may be used, such as a rigid plastic or a plastic film. The plastic film may have a high glass transition temperature, for example above 65° C., and may have a transparency greater than 85% at 530 nm.

Further details regarding substrates and substrate materials may be found in International Publications Nos. WO 00/46854, WO 00/49421, WO 00/49658, WO 00/55915, and WO 00/55916, the entire disclosures of which are herein incorporated by reference. Apparatus, methods, and compositions for producing flexible substrates are disclosed in U.S. Pat. Nos. 5,469,020 (Herrick), 6,274,508 (Jacobsen et al.), 6,281,038 (Jacobsen et al.), 6,316,278 (Jacobsen et al.), 6,468,638 (Jacobsen et al.), 6,555,408 (Jacobsen et al.), 6,590,346 (Hadley et al.), 6,606,247 (Credelle et al.), 6,665,044 (Jacobsen et al.), and 6,683,663 (Hadley et al.), all of which are incorporated herein by reference.

Positioning of Plasma-Tube on Substrate

The Plasma-tube may be positioned or located on a substrate by any appropriate means. In one embodiment, the Plasma-tube is bonded to the surface of the substrate. The Plasma-tube is bonded to the substrate surface with a non-conductive, adhesive material which also serves as an insulating barrier to prevent electrically shorting of the conductors or electrodes connected to the Plasma-tube.

The Plasma-tube may be mounted or positioned within a substrate well, cavity, hollow, or like depression. The well, cavity, hollow or depression is of suitable dimensions with a mean or average diameter and depth for receiving and retaining the Plasma-tube. As used herein well includes cavity, hollow, depression, hole, or any similar configuration. In U.S. Pat. No. 4,827,186 (Knauer et al.), there is shown a cavity referred to as a concavity or saddle. The depression, well or cavity may extend partly through the substrate, embedded within or extend entirely through the substrate. The cavity may comprise an elongated channel, trench, or groove extending partially or completely across the substrate.

The electrodes are in direct contact with each Plasma-tube. An air gap between an electrode and the Plasma-tube will cause high operating voltages. A material such as a conductive adhesive, and/or a conductive filler may be used to bridge or connect the electrode to the Plasma-tube. Such conductive material must be carefully applied so as to not electrically short the electrode to other nearby electrodes. A dielectric material or adhesive may also be applied to fill any air gap.

Insulating Barrier

The insulating barrier may comprise any suitable non-conductive material which may also be used to bond the Plasma-tube to the substrate. In one embodiment, there is used an epoxy resin that is the reaction product of epichlorohydrin and bisphenol-A. One such epoxy resin is a liquid epoxy resin, D.E.R. 383, produced by the Dow Plastics group of the Dow Chemical Company.

Light Barriers

Light barriers of opaque, translucent, or non-transparent material may be located between Plasma-tubes to prevent optical cross-talk between Plasma-tubes, particularly between adjacent Plasma-tubes. A black material such as carbon filler is typically used.

Electrically Conductive Bonding Substance

In one embodiment, the conductors or electrodes are electrically connected to each Plasma-tube with an electrically conductive bonding substance. The electrically conductive bonding substance is any suitable inorganic or organic material including compounds, mixtures, dispersions, pastes, liquids, cements, and adhesives. In one embodiment, the electrically-conductive bonding substance is an organic substance with conductive filler material. Contemplated organic substances include adhesive monomers, dimers, trimers, polymers and copolymers of materials such as polyurethanes, polysulfides, silicones, and epoxies. A wide range of other organic or polymeric materials may be used.

Contemplated conductive filler materials include conductive metals or metalloids such as silver, gold, platinum, copper, chromium, nickel, aluminum, and carbon. The conductive filler may be of any suitable size and form such as particles, powder, agglomerates, or flakes of any suitable size and shape. The particles, powder, agglomerates, or flakes may comprise a non-metal, metal, or metalloid core with an outer layer, coating, or film of conductive metal. Some specific embodiments of conductive filler materials include silver-plated copper beads, silver-plated glass beads, silver particles, silver flakes, gold-plated copper beads, gold-plated glass beads, gold particles, gold flakes, and so forth. In one particular embodiment, there is used an epoxy filled with 60% to 80% by weight silver.

Examples of electrically conductive bonding substances are known in the art. The disclosures including the compositions of the following references are incorporated herein by reference. U.S. Pat. No. 3,412,043 (Gilliland) discloses an electrically conductive composition of silver flakes and resinous binder. U.S. Pat. No. 3,983,075 (Marshall et al.) discloses a copper filled electrically conductive epoxy. U.S. Pat. No. 4,247,594 (Shea et al.) discloses an electrically conductive resinous composition of copper flakes in a resinous binder. U.S. Pat. Nos. 4,552,607 (Frey) and 4,670,339 (Frey) disclose a method of forming an electrically conductive bond using copper microspheres in an epoxy. U.S. Pat. No. 4,880,570 (Sanborn et al.) discloses an electrically conductive epoxy-based adhesive selected from the amine curing modified epoxy family with a filler of silver flakes. U.S. Pat. No. 5,183,593 (Durand et al.) discloses an electrically conductive cement comprising a polymeric carrier such as a mixture of two epoxy resins and filler particles selected from silver agglomerates, particles, flakes, and powders. The filler may be silver-plated particles such as inorganic spheroids plated with silver. Other noble metals and non-noble metals such as nickel are disclosed. U.S. Pat. No. 5,298,194 (Carter et al.) discloses an electrically conductive adhesive composition comprising a polymer or copolymer of polyolefins or polyesters filled with silver particles. U.S. Pat. No. 5,575,956 (Hermansen et al.) discloses electrically-conductive, flexible epoxy adhesives comprising a polymeric mixture of a polyepoxide resin and an epoxy resin filled with conductive metal powder, flakes, or non-metal particles having a metal outer coating. The conductive metal is a noble metal such as gold, silver, or platinum. Silver-plated copper beads and silver-plated glass beads are also disclosed. U.S. Pat. No. 5,891,367 (Basheer et al.) discloses a conductive epoxy adhesive comprising an epoxy resin cured or reacted with selected primary amines and filled with silver flakes. The primary amines provide improved impact resistance. U.S. Pat. No. 5,918,364 (Kulesza et al.) discloses substrate bumps or pads formed of electrically conductive polymers filled with gold or silver. U.S. Pat. No. 6,184,280 (Shibuta) discloses an organic polymer containing hollow carbon microfibers and an electrically conductive metal oxide powder. In another embodiment, the electrically-conductive bonding substance is an organic substance without a conductive filler material. Examples of electrically-conductive bonding substances are known in the art. The disclosures including the compositions of the following references are incorporated herein by reference. U.S. Pat. No. 5,645,764 (Angelopoulos et al.) discloses electrically conductive pressure sensitive polymers without conductive fillers. Examples of such polymers include electrically conductive substituted and unsubstituted polyanilines, substituted and unsubstituted polyparaphenylenes, substituted and unsubstituted polyparaphenylene vinylenes, substituted and unsubstituted polythiophenes, substituted and unsubstituted polyazines, substituted and unsubstituted polyfuranes, substituted and unsubstituted polypyrroles, substituted and unsubstituted polyselenophenes, substituted and unsubstituted polyphenylene sulfides and substituted and unsubstituted polyacetylenes formed from soluble precursors. Blends of these polymers are suitable for use as are copolymers made from the monomers, dimers, or trimers, used to form these polymers. Electrically conductive polymer compositions are also disclosed in U.S. Pat. Nos. 5,917,693 (Kono et al.), 6,096,825 (Garnier), and 6,358,438 (Isozaki et al.). The electrically conductive polymers disclosed above may also be used with conductive fillers. In some embodiments, organic ionic materials such as calcium stearate may be added to increase electrical conductivity. See U.S. Pat. No. 6,599,446 (Todt et al.), incorporated by reference. In one embodiment, the electrically conductive bonding substance is luminescent, for example as disclosed in U.S. Pat. No. 6,558,576 (Brielmann et al.), incorporated herein by reference.

EMI/RFI Shielding

In some embodiments, electroductive bonding substances may be used for EMI (electromagnetic interference) and/or RFI (radio-frequency interference) shielding. Examples of such EMI/RFI shielding are disclosed in U.S. Pat. Nos. 5,087,314 (Sandborn et al.) and 5,700,398 (Angelopoulos et al.), both incorporated herein by reference.

Electrodes

One or more hollow Plasma-tubes containing the ionizable gas are located within the gas discharge device structure, each Plasma-tube being in contact with one or more electrodes. In one embodiment, the contact is made by an electrically conductive bonding substance applied to each tube so as to form an electrically conductive pad for connection to the electrodes. A dielectric substance may also be used in lieu of or in addition to the conductive substance. Each electrode pad may partially cover the outside shell surface of the Plasma-tube. The electrodes and pads may be of any geometric shape or configuration. One or more electrodes including pads may be made of a reflective material to enhance light output of a Plasma-tube or Plasma-shell. In some applications, the electrodes may also be used as antenna. In one embodiment, the electrodes are opposing arrays of electrodes, one array of electrodes being transverse or orthogonal to an opposing array of electrodes. The electrode arrays can be parallel, zig zag, serpentine, or like pattern as typically used in dot-matrix gas discharge (plasma) displays. The use of split or divided electrodes is contemplated as disclosed in U.S. Pat. Nos. 3,603,836 (Grier) and 3,701,184 (Grier), incorporated herein by reference. Apertured electrodes may be used as disclosed in U.S. Pat. Nos. 6,118,214 (Marcotte) and 5,411,035 (Marcotte) and U.S. Patent Application Publication 2004/0001034 (Marcotte), all incorporated herein by reference. The electrodes are of any suitable conductive metal or alloy including gold, silver, aluminum, or chrome-copper-chrome. If a transparent electrode is used on the viewing surface, this is typically indium tin oxide (ITO) or tin oxide with a conductive side or edge bus bar of silver. Other conductive bus bar materials may be used such as gold, aluminum, or chrome-copper-chrome. The electrodes may partially cover the external surface of the Plasma-tube.

The electrode array may be divided into two portions and driven from both sides with a so-called dual scan architecture as disclosed in U.S. Pat. Nos. 4,233,623 (Pavliscak) and 4,320,418 (Pavliscak), both incorporated herein by reference.

A flat Plasma-tube surface is particularly suitable for connecting electrodes to the Plasma-tube. If one or more electrodes connect to the bottom of Plasma-tube, a flat bottom surface is desirable. Likewise, if one or more electrodes connect to the top or sides of the Plasma-tube, it is desirable for the connecting surface of such top or sides to be flat.

The electrodes may be applied to the substrate or to the Plasma-tubes by thin film methods such as vapor phase deposition, e-beam evaporation, sputtering, conductive doping, etc. or by thick film methods such as screen printing, ink jet printing, etc.

In a matrix display, the electrodes in one array are transverse to the electrodes in an opposing array so that each electrode in each array forms a crossover with an electrode in the opposing array, thereby forming a multiplicity of crossovers. Each crossover of two opposing electrodes forms a discharge point or cell. At least one hollow Plasma-tube containing ionizable gas is positioned in the gas discharge (plasma) display device at the intersection of at least two opposing electrodes. When an appropriate voltage potential is applied to an opposing pair of electrodes, the ionizable gas inside of the Plasma-tube at the crossover is energized and a gas discharge occurs. Photons of light in the visible and/or invisible range are emitted by the gas discharge.

Shell Geometry

The shell of the Plasma-tubes may be of any suitable volumetric shape or geometric configuration to encapsulate the ionizable gas independently of the gas discharge device or substrate. The tube cross-section may be of any suitable geometric design. If a Plasma-shell is used, the volumetric and geometric shapes of the Plasma-shell include but are not limited to spherical, oblate spheroid, prolate spheroid, capsular, elliptical, ovoid, egg shape, bullet shape, pear, and/or tear drop. In an oblate spheroid, the diameter at the polar axis is flattened and is less than the diameter at the equator. In a prolate spheroid, the diameter at the equator is less than the diameter at the polar axis such that the overall shape is elongated. Likewise, the shell cross-section may be of any geometric design.

The diameter of the Plasma-tubes used in the practice of this invention may vary over a wide range. In a gas discharge display, the average diameter of a Plasma-tube is about 1 mil to 200 mils (where one mil equals 0.001 inch) or about 25 microns to 5,000 microns where 25.4 microns (micrometers) equals 1 mil or 0.001 inch. Plasma-tubes can be manufactured up to 500 mils or about 12,000 microns in diameter or greater. The thickness of the wall of each hollow Plasma-tube is sufficient to retain the gas inside, but thin enough to allow passage of photons emitted by the gas discharge. The wall thickness of the Plasma-tube is kept as thin as practical to minimize photon absorption, but thick enough to retain sufficient strength so that the Plasma-tubes can be easily handled and pressurized.

The average diameter of the Plasma-tubes may be varied for different phosphors to achieve color balance. Thus for a gas discharge display having phosphors which emit red, green, and blue light in the visible range, the Plasma-tubes for the red phosphor may have an average diameter less than the average diameter of the Plasma-tubes for the green or blue phosphor. Typically the average diameter of the red phosphor Plasma-tubes is about 80% to 95% of the average diameter of the green phosphor Plasma-tubes.

The average diameter of the blue phosphor Plasma-tubes may be greater than the average diameter of the red or green phosphor Plasma-tubes. Typically the average Plasma-tube diameter for the blue phosphor is about 105% to 125% of the average Plasma-tube diameter for the green phosphor and about 110% to 155% of the average diameter of the red phosphor.

In another embodiment using a high brightness green phosphor, the red and green Plasma-tube may be reversed such that the average diameter of the green phosphor Plasma-tube is about 80% to 95% of the average diameter of the red phosphor Plasma-tube. In this embodiment, the average diameter of the blue Plasma-tube is 105% to 125% of the average Plasma-tube diameter for the red phosphor and about 110% to 155% of the average diameter of the green phosphor.

The red, green, and blue Plasma-tubes may also have different size diameters so as to enlarge voltage margin and improve luminance uniformity as disclosed in U.S. Patent Application Publication 2002/0041157 (Heo), incorporated herein by reference. The widths of the corresponding electrodes for each RGB Plasma-tube may be of different dimensions such that an electrode is wider or more narrow for a selected phosphor as disclosed in U.S. Pat. No. 6,034,657 (Tokunaga et al.), incorporated herein by reference. There also may be used combinations of different geometric shapes for different colors. Thus there may be used a square cross section Plasma-tube for one color, a circular cross-section for another color, and another geometric cross section such as triangular for a third color. A combination of Plasma-tubes of different geometric shapes may be used.

Organic Luminescent Substance

To provide or enhance light or photon output from a Plasma-tube, a luminescent substance or material is positioned in close proximity or near each Plasma-tube. The organic luminescent substance may be located internally and/or externally on the Plasma-tube. The Plasma-tube may be made of a luminescent substance. In one embodiment, the Plasma-tube is made of a luminescent substance with a luminescent substance located on an external surface of the Plasma-tube. The external luminescent substance can be a different luminescent substance or the same luminescent substance used to make the Plasma-tube.

Organic luminescent substances may be used alone or in combination with inorganic luminescent substances. Contemplated combinations include mixtures, dispersions, suspensions, layers, and coatings of organic and inorganic luminescent substances.

In one embodiment, an organic luminescent substance is located in close proximity to the enclosed gas discharge within a Plasma-tube, so as to be excited by photons from the enclosed gas and emit visible and/or invisible light.

In another embodiment, an organic luminescent substance is positioned on at least a portion of the external surface of a Plasma-tube, so as to be excited by photons from the gas discharge within the Plasma-tube. The excited luminescent substance emits visible and/or invisible light. In this embodiment, the Plasma-tube may also be made of a luminescent substance that is excited by the gas discharge and emits light that excites the organic luminescent substance on the external surface.

The organic luminescent substance comprises one or more organic compounds, including monomers, dimers, trimers, polymers, copolymers, or like organic materials which emit visible and/or invisible light when excited by photons from the gas discharge inside of the Plasma-tube.

The organic luminescent substance may include one or more organic photoluminescent phosphors selected from organic photoluminescent compounds, organic photoluminescent monomers, dimers, trimers, polymers, copolymers, organic photoluminescent dyes, organic photoluminescent dopants, and/or any other organic photoluminescent material. All are collectively referred to herein as organic photoluminescent phosphor.

Organic photoluminescent phosphor substances contemplated herein include those organic light emitting diodes or devices (OLED) and organic electroluminescent (EL) materials which emit light when excited by photons from the gas discharge of a gas plasma discharge. OLED and organic EL substances include the small molecule organic EL and the large molecule or polymeric OLED.

Small molecule organic EL substances are disclosed in U.S. Pat. Nos. 4,720,432 (VanSlyke et al.), 4,769,292 (Tang et al.), 5,151,629 (VanSlyke), 5,409,783 (Tang et al.), 5,645,948 (Shi et al.), 5,683,823 (Shi et al.), 5,755,999 (Shi et al.), 5,908,581 (Chen et al.), 5,935,720 (Chen et al.), 6,020,078 (Chen et al.), 6,069,442 (Hung et al.), 6,348,359 (VanSlyke et al.), and 6,720,090 (Young et al.), all incorporated herein by reference. The small molecule organic light emitting devices may be called SMOLED.

Large molecule or polymeric OLED substances are disclosed in U.S. Pat. Nos. 5,247,190 (Friend et al.), 5,399,502 (Friend et al.), 5,540,999 (Yamamoto et al.), 5,900,327 (Pei et al.), 5,804,836 (Heeger et al.), 5,807,627 (Friend et al.), 6,361,885 (Chou), and 6,670,645 (Grushin et al.), all incorporated herein by reference. The polymer light emitting devices may be called PLED.

Organic luminescent substances also include OLEDs doped with phosphorescent compounds as disclosed in U.S. Pat. No. 6,303,238 (Thompson et al.), incorporated herein by reference. Organic photoluminescent substances are also disclosed in U.S. Patent Application Publication Nos. 2002/0101151 (Choi et al.), 2002/0063525 (Choi et al.), 2003/0003225 (Choi et al.), and 2003/0052596 (Yi et al.); U.S. Pat. Nos. 6,610,554 (Yi et al.) and 6,692,326 (Choi et al.); and International Publications WO 02/104077 and WO 03/046649, all incorporated herein by reference.

In another embodiment, the organic luminescent phosphorous substance is a color-conversion-media (CCM) that converts light (photons) emitted by the gas discharge to visible or invisible light. Examples of CCM substances include the fluorescent organic dye compounds.

In one embodiment, the organic luminescent substance is selected from a condensed or fused ring system such as a perylene compound, a perylene based compound, a perylene derivative, a perylene based monomer, dimer or trimer, a perylene based polymer and/or copolymer, and/or a substance doped with a perylene. Photoluminescent perylene phosphor substances are known in the prior art. U.S. Pat. No. 4,968,571 (Gruenbaum et al.), incorporated herein by reference, discloses photoconductive perylene materials which may be used as photoluminescent phosphorous substances. U.S. Pat. No. 5,693,808 (Langhals), incorporated herein by reference, discloses the preparation of luminescent perylene dyes. U.S. Patent Application Publication 2004/0009367 (Hatwar), incorporated herein by reference, discloses the preparation of luminescent materials doped with fluorescent perylene dyes. U.S. Pat. No. 6,528,188 (Suzuki et al.), incorporated herein by reference, discloses the preparation and use of luminescent perylene compounds.

Condensed or fused ring compounds are conjugated with multiple double bonds and include monomers, dimers, trimers, polymers, and copolymers. In addition, conjugated aromatic and aliphatic organic compounds are contemplated including monomers, dimers, trimers, polymers, and copolymers. Conjugation as used herein also includes extended conjugation. A material with conjugation or extended conjugation absorbs light and then transmits the light to the various conjugated bonds. Typically the number of conjugate-double bonds ranges from about 4 to about 15.

Examples of conjugate-bonded or condensed/fused benzene rings are disclosed in U.S. Pat. Nos. 6,614,175 (Aziz et al.) and 6,479,172 (Hu et al.), both incorporated herein by reference. U.S. Patent Application Publication 2004/0023010 (Bulovic et al.), incorporated herein by reference, discloses luminescent nanocrystals with organic polymers including conjugated organic polymers.

Cumulene is conjugated only with carbon and hydrogen atoms. Cumulene becomes more deeply colored as the conjugation is extended. Other condensed or fused ring luminescent compounds may be used including naphthalimides, substituted naphthalimides, naphthalimide monomers, dimers, trimers, polymers, copolymers and derivatives thereof including naphthalimide diester dyes such as disclosed in U.S. Pat. No. 6,348,890 (Likavec et al.), incorporated herein by reference.

The organic luminescent substance may be an organic lumophore, for example as disclosed in U.S. Pat. Nos. 5,354,825 (Klainer et al.), 5,480,723 (Klainer et al.), 5,700,897 (Klainer et al.), and 6,538,263 (Park et al.), all incorporated by reference. Also lumophores are disclosed in S. E. Shaheen et al., *Journal of Applied Physics*, Vol 84, Number 4, pages 2324 to 2327, Aug. 15, 1998; J. D. Anderson et al., *Journal American Chemical Society*, 1998, Vol 120, pages 9646 to 9655; and Gyu Hyun Lee et al., *Bulletin of Korean Chemical Society*, 2002, Vol 23, NO. 3, pages 528 to 530, all incorporated herein by reference.

The organic luminescent substance is applied by any suitable method to the external surface of the Plasma-tube, to the substrate or to any location in close proximity to the gas discharge within the Plasma-tube. Such methods include thin film deposition methods such as vapor phase deposition, sputtering and e-beam evaporation. Also thick film or application methods may be used such as screen-printing, ink jet printing, and/or slurry techniques. Small size molecule OLED materials are typically deposited upon the external surface of the Plasma-tube by thin film deposition methods such as vapor phase deposition or sputtering. Large size molecule or polymeric OLED materials are deposited by so called thick film or application methods such as screen-printing, ink jet, and/or slurry techniques.

If the organic luminescent substance such as a photoluminescent phosphor is applied to the external surface of the Plasma-tube, it may be applied as a continuous or discontinuous layer or coating such that the Plasma-tube is completely or partially covered with the luminescent substance.

Inorganic Luminescent Substances

Inorganic luminescent substances may be used alone or in combination with organic luminescent substances. Contemplated combinations include mixtures, dispersions, suspensions, layers, or coatings of organic and/or inorganic substances. The inorganic luminescent material may be dispersed or suspended within an organic luminescent material or vice versa. The Plasma-tube may be made of an inorganic luminescent substance including a combination or inorganic and organic substances. In one embodiment the inorganic luminescent substance is incorporated into the particles forming the shell structure. Two or more luminescent substances may be used in combination with one luminescent substance emitting photons to excite another luminescent substance. In one embodiment, the shell of the Plasma-tube or Plasma-shell is made of a luminescent substance with the shell exterior containing another luminescent substance. The luminescent shell is excited by photons from a gas discharge within a shell. The exterior luminescent substance produces photons when excited by photons from the excited luminescent shell and/or the gas discharge. Typical inorganic luminescent substances are as follows.

Green Phosphor

A green light-emitting phosphor may be used alone or in combination with other light-emitting phosphors such as blue or red. Phosphor materials which emit green light include $Zn_2SiO_4$:Mn, ZnS:Cu, ZnS:Au, ZnS:Al, ZnO:Zn, CdS:Cu, $CdS:Al_2$, $Cd_2O_2S$:Tb, and $Y_2O_2S$:Tb.

In one embodiment, there is used a green light-emitting phosphor selected from the zinc orthosilicate phosphors such as $ZnSiO_4$:$Mn^{2+}$. Green light emitting zinc orthosilicates including the method of preparation are disclosed in U.S. Pat. No. 5,985,176 (Rao), incorporated herein by reference. These phosphors have a broad emission in the green region when excited by 147 nm and 173 nm (nanometers) radiation from the discharge of a xenon gas mixture.

In another embodiment, there is used a green light-emitting phosphor which is a terbium activated yttrium gadolinium borate phosphor such as (Gd, Y) $BO_3$:$Tb^{3+}$. Green light-emitting borate phosphors including the method of preparation are disclosed in U.S. Pat. No. 6,004,481 (Rao), incorporated herein by reference. In another embodiment, there is used a manganese activated alkaline earth aluminate green phosphor as disclosed in U.S. Pat. No. 6,423,248 (Rao), incorporated herein by reference.

Terbium doped phosphors may emit in the blue region especially in lower concentrations of terbium. For some display applications such as television, it is desirable to have a single peak in the green region at 543 nm. By incorporating a blue absorption dye in a filter, any blue peak can be eliminated.

Green light-emitting terbium-activated lanthanum cerium orthophosphate phosphors are disclosed in U.S. Pat. No. 4,423,349 (Nakajima et al.), incorporated herein by reference. Green light-emitting lanthanum cerium terbium phosphate phosphors are disclosed in U.S. Pat. No. 5,651,920 (Chau et al.), incorporated herein by reference. Green light-emitting phosphors may also be selected from the trivalent rare earth ion-containing aluminate phosphors as disclosed in U.S. Pat. No. 6,290,875 (Oshio et al.), incorporated herein by reference.

Blue Phosphor

A blue light-emitting phosphor may be used alone or in combination with other light-emitting phosphors such as green or red. Phosphor materials which emit blue light include ZnS:Ag, ZnS:Cl, and CsI:Na.

In one embodiment, there is used a blue light-emitting aluminate phosphor which emits blue visible light is divalent europium ($Eu^{2+}$) activated Barium Magnesium Aluminate (BAM) represented by $BaMgAl_{10}O_{17}:Eu^{2+}$. BAM is widely used as a blue phosphor in the PDP industry. BAM and other aluminate phosphors which emit blue visible light are disclosed in U.S. Pat. Nos. 5,611,959 (Kijima et al.) and 5,998,047 (Bechtel et al.), both incorporated herein by reference. The aluminate phosphors may also be selectively coated as disclosed by Bechtel et al. ('047). The preparation of BAM phosphors for a PDP is also disclosed in U.S. Pat. No. 6,045,721 (Zachau et al.), incorporated herein by reference. Blue light-emitting phosphors may be selected from a number of divalent europium-activated aluminates such as disclosed in U.S. Pat. No. 6,096,243 (Oshio et al.), incorporated herein by reference.

In another embodiment, the blue light-emitting phosphor is thulium activated lanthanum phosphate with trace amounts of $Sr^{2+}$ and/or $Li^+$. This exhibits a narrow band emission in the blue region peaking at 453 nm when excited by 147 nm and 173 nm radiation from the discharge of a xenon gas mixture. Blue light-emitting phosphate phosphors including the method of preparation are disclosed in U.S. Pat. No. 5,989,454 (Rao), incorporated herein by reference.

In one embodiment, a mixture or blend of blue emitting phosphors is used such as a blend or complex of about 85% to 70% by weight of a lanthanum phosphate phosphor activated by trivalent thulium ($Tm^{3+}$), $Li^+$, and an optional amount of an alkaline earth element ($AE^{2+}$) as a coactivator and about 15% to 30% by weight of divalent europium-activated BAM phosphor or divalent europium-activated Barium Magnesium, Lanthanum Aluminated (BLAMA) phosphor. Such a mixture is disclosed in U.S. Pat. No. 6,187,225 (Rao), incorporated herein by reference.

Blue light-emitting phosphors also include $ZnO.Ga_2O_3$ doped with Na or Bi. The preparation of these phosphors is disclosed in U.S. Pat. Nos. 6,217,795 (Yu et al.) and 6,322,725 (Yu et al.), both incorporated herein by reference.

Other blue light-emitting phosphors include europium activated strontium chloroapatite and europium-activated strontium calcium chloroapatite.

Red Phosphor

A red light-emitting phosphor may be used alone or in combination with other light-emitting phosphors such as green or blue. Phosphor materials which emit red light include $Y_2O_2S:Eu$ and $Y_2O_3S:Eu$.

In one embodiment, there is used a red light-emitting phosphor which is an europium activated yttrium gadolinium borate phosphors such as $(Y,Gd)BO_3:Eu^{3+}$. The composition and preparation of these red-emitting borate phosphors is disclosed in U.S. Pat. Nos. 6,042,747 (Rao) and 6,284,155 (Rao), both incorporated herein by reference. These europium activated yttrium, gadolinium borate phosphors emit an orange line at 593 nm and red emission lines at 611 nm and 627 nm when excited by 147 nm and 173 nm UV radiation from the discharge of a xenon gas mixture. For television (TV) applications, it is preferred to have only the red emission lines (611 nm and 627 nm). The orange line (593 nm) may be minimized or eliminated with an external optical filter. A wide range of red light-emitting phosphors are used in the PDP industry and are contemplated in the practice of this invention including europium-activated yttrium oxide.

Other Phosphors

There also may be used phosphors other than red, blue, green such as a white light-emitting phosphor, pink light-emitting phosphor or yellow light-emitting phosphor. These may be used with an optical filter. Phosphor materials which emit white light include calcium compounds such as $3Ca_3(PO_4)_2.CaF:Sb$, $3Ca_3(PO_4)_2.CaF:Mn$, $3Ca_3(PO_4)_2.CaCl:Sb$, and $3Ca_3(PO_4)_2.CaCl:Mn$. White light-emitting phosphors are disclosed in U.S. Pat. No. 6,200,496 (Park et al.), incorporated herein by reference. Pink light-emitting phosphors are disclosed in U.S. Pat. No. 6,200,497 (Park et al.), incorporated herein by reference. Phosphor material which emits yellow light include ZnS:Au.

Organic and Inorganic Materials

Inorganic and organic luminescent materials may be used in any suitable selected combinations. In one embodiment, multiple layers of luminescent materials are applied to the Plasma-tube with at least one layer being organic and at least one layer being inorganic. An inorganic layer may serve as a protective overcoat for an organic layer.

In another embodiment, the shell of the Plasma-tube comprises or contains inorganic luminescent material. In another embodiment, organic and inorganic luminescent materials are mixed together and applied as a layer inside or outside the shell. The shell may also be made of or contain a mixture of organic and inorganic luminescent materials. In one preferred embodiment, a mixture of organic and inorganic material is applied outside the shell of the Plasma-tube which is made of an inorganic luminescent material. Inorganic luminescent material may be mixed or dispersed within an organic luminescent material. Organic luminescent material may be mixed or dispersed within an organic luminescent material.

Photon Exciting of Luminescent Substance

In one embodiment, a layer, coating, or particles of inorganic and/or organic luminescent substances such as phosphor is located on an exterior surface of the Plasma-tube. The photons of light pass through the shell or wall(s) of the Plasma-tube and excite the organic or inorganic photoluminescent phosphor located on the external surface of the Plasma-tube. The phosphor may also be located on the side wall(s) of a channel, trench, barrier, groove, cavity, well, hollow or like structure.

In one embodiment, the gas discharge within the channel, trench, barrier, groove, cavity, well or hollow produces photons that excite the inorganic and/or organic phosphor such that the phosphor emits light in a range visible to the human eye. Typically this is red, blue, or green light. However, phosphors may be used which emit other light such as white, pink, or yellow light. In some embodiments, the emitted light may not be visible to the human eye.

In prior art AC plasma display structures as disclosed in U.S. Pat. Nos. 5,793,158 (Wedding) and 5,661,500 (Shinoda), inorganic and/or organic phosphor is located on the wall(s) or side(s) of the barriers that form the channel, trench, groove, cavity, well, or hollow. Phosphor may also be located on the bottom of the channel, trench, groove, cavity, well, or hollow as disclosed by U.S. Pat. No. 4,827,186 (Knauer et al.). The Plasma-tubes are positioned within or along the walls of a channel, barrier, trench, groove, cavity, well or hollow so as to be in close proximity to the phosphor. In this embodiment, the Plasma-tubes are positioned within the channels, barriers, trenches, grooves, cavities, wells, or hollows, such that photons from the gas discharge within the Plasma-tube cause the phosphor along the wall(s), side(s) or at the bottom of the channel, barrier, trenches groove, cavity, well, or hollow, to emit light.

In another embodiment, phosphor is located on the outside surface of each Plasma-tube. In this embodiment, the outside surface is at least partially covered with phosphor that emits light in the visible or invisible range when excited by photons from the gas discharge within the Plasma-tube. The phosphor may emit light in the UV and/or IR range.

In one embodiment, phosphor is dispersed and/or suspended within the ionizable gas inside each Plasma-tube. In such embodiment, the phosphor particles may be sufficiently small such that most of the phosphor particles remain suspended within the gas and do not precipitate or otherwise substantially collect on the inside wall of the Plasma-tube. The average diameter of the dispersed and/or suspended phosphor particles is less than about 1 micron, typically less than 0.1 microns. Larger particles can be used depending on the size of the Plasma-tube. The phosphor particles may be introduced by means of a fluidized bed.

The luminescent substance such as an inorganic and/or organic photoluminescent phosphor may be located on all or part of the external surface of the Plasma-tubes and/or on all or part of the internal surface of the Plasma-tubes. The phosphor may comprise particles dispersed or floating within the gas. In one embodiment contemplated for the practice of this invention, an inorganic and/or organic luminescent phosphor is located on the external surface of a Plasma-tube made of a luminescent material.

The inorganic and/or organic luminescent substance located on the external surface is excited by photons from the gas discharge inside the Plasma-tube. The phosphor emits light in the visible range such as red, blue, or green light. Phosphors may be selected to emit light of other colors such as white, pink, or yellow. The phosphor may also be selected to emit light in non-visible ranges of the spectrum. Optical filters may be selected and matched with different phosphors.

The phosphor thickness is about 2 to 40 microns, typically about 5 to 15 microns. In one embodiment, dispersed or floating particles within the gas are typically spherical or needle shaped having an average size of about 0.01 to 5 microns.

A UV photoluminescent phosphor is excited by UV in the range of about 50 to about 400 nanometers. The phosphor may have a protective layer or coating which is transmissive to the excitation UV and the emitted visible light. Such include organic films such as perylene or parylene and inorganic films such as aluminum oxide or silica. Protective coatings are disclosed and discussed below.

Because the ionizable gas is contained within a multiplicity of Plasma-tubes, it is possible to provide a custom gas mixture or composition at a custom pressure in each Plasma-tube for each phosphor.

In the prior art, it is necessary to select an ionizable gas mixture and a gas pressure that is optimum for all phosphors used in the device such as red, blue, and green phosphors. However, this requires trade-offs because a particular gas mixture may be optimum for a particular green phosphor, but less desirable for red or blue phosphors. In addition, trade-offs are required for the gas pressure. In the practice of this invention, an optimum gas mixture and an optimum gas pressure may be provided for each of the selected phosphors. Thus the gas mixture and gas pressure inside the Plasma-tubes may be optimized with a custom gas mixture and a custom gas pressure, each or both optimized for each phosphor emitting red, blue, green, white, pink, or yellow light in the visible range or light in the invisible range. The diameter and the wall thickness of the Plasma-tube can also be adjusted and optimized for each phosphor. Depending upon the Paschen Curve (pd v. voltage) for the particular ionizable gas mixture, the operating voltage may be decreased by optimized changes in the gas mixture, gas pressure, and the diameter of the Plasma-tube.

Up-Conversion

In one embodiment, there is used an inorganic and/or organic luminescent substance such as a Stokes phosphor for up-conversion, for example to convert infrared radiation to visible light. Up-conversion or Stokes materials include phosphors as disclosed in U.S. Pat. Nos. 3,623,907 (Watts), 3,634,614 (Geusic), 5,541,012 (Ohwaki et al.), 6,265,825 (Asano), and 6,624,414 (Glesener), all incorporated herein by reference. Up-conversion may also be obtained with shell compositions such as thulium doped silicate glass containing oxides of Si, Al, and La, as disclosed in U.S. Patent Application Publication 2004/0037538 (Schardt et al.), incorporated herein by reference. The glasses of Schardt et al. emit visible or UV light when excited by IR. Glasses for up-conversion are also disclosed in Japanese Patents 9054562 (Akira et al.) and 9086958 (Akira et al.), both incorporated herein by reference.

U.S. Pat. No. 5,166,948 (Gavrilovic) discloses an up-conversion crystalline structure. U.S. Pat. No. 6,726,992 (Yadav et al.) discloses nano-engineered luminescent materials including both Stokes and Anti-Stokes down-conversion phosphors. It is contemplated that the Plasma-tube may be constructed wholly or in part from an up-conversion material, down-conversion material or a combination of both. An external portion of the Plasma-tube may also contain an up-conversion material.

Down-Conversion

The luminescent material may also include down-conversion (Anti-Stokes) materials such as phosphors as disclosed in U.S. Pat. No. 3,838,307 (Masi), incorporated herein by reference. Down-conversion luminescent materials are also disclosed in U.S. Pat. Nos. 6,013,538 (Burrows et al.), 6,091, 195 (Forrest et al.), 6,208,791 (Bischel et al.), 6,566,156 (Sturm et al.), and 6,650,045 (Forrest et al.). Down-conversion luminescent materials are also disclosed in U.S. Patent Application Publication Nos. 2004/0159903 (Burgener, II et al.), 2004/0196538 (Burgener, II et al.), 2005/0093001 (Liu et al.), and 2005/0094109 (Sun et al.). Anti-Stokes phosphors are also disclosed in European Patent 0143034 (Maestro et al.), incorporated herein by reference. As noted above, the Plasma-tube may be constructed wholly or in part from a down-conversion material, up-conversion material or a combination of both. An external portion of the Plasma-tube may also contain a down-conversion material.

Quantum Dots

In one embodiment, the luminescent substance is a quantum dot material. Examples of luminescent quantum dots are disclosed in International Publication Numbers WO 03/038011, WO 00/029617, WO 03/038011, WO 03/100833, and WO 03/037788, all incorporated herein by reference. Luminescent quantum dots are also disclosed in U.S. Pat. Nos. 6,468,808 (Nie et al.), 6,501,091 (Bawendi et al.), 6,698,313 (Park et al.), and published U.S. Patent Application Publication 2003/0042850 (Bertram et al.), all incorporated herein by reference. The quantum dots may be added or incorporated into the Plasma-tube shell during shell formation or after the shell is formed.

Protective Overcoat

In a preferred embodiment, the luminescent substance is located on an external surface of the Plasma-tube. Organic luminescent phosphors are particularly suitable for placing on the exterior shell surface, but may require a protective overcoat. The protective overcoat may be inorganic, organic, or a combination of inorganic and organic. This protective overcoat may be an inorganic and/or organic luminescent material.

The luminescent substance may have a protective overcoat such as a clear or transparent acrylic compound including acrylic solvents, monomers, dimers, trimers, polymers, copolymers, and derivatives thereof to protect the luminescent substance from direct or indirect contact or exposure with environmental conditions such as air, moisture, sunlight, handling, or abuse. The selected acrylic compound is of a viscosity such that it can be conveniently applied by spraying, screen print, ink jet, or other convenient methods so as to form a clear film or coating of the acrylic compound over the luminescent substance.

Other organic compounds may also be suitable as protective overcoats including silanes such as glass resins. Also the polyesters such as Mylar® may be applied as a spray or a sheet fused under vacuum to make it wrinkle free. Polycarbonates may be used but may be subject to UV absorption and detachment.

In one embodiment, the luminescent substance is coated with a film or layer of a perylene compound including monomers, dimers, trimers, polymers, copolymers, and derivatives thereof. The perylene compounds are widely used as protective films. Parylene compounds may be used. Specific compounds include poly-monochloro-para-xylyene (Parylene C) and poly-para-xylylene (Parylene N). Parylene polymer films are disclosed in U.S. Pat. Nos. 5,879,808 (Wary et al.) and 6,586,048 (Welch et al.), both incorporated herein by reference. Parylene conformal coatings are covered by Mil-I-46058C and ISO 9002. The perylene and parylene compounds may be applied by ink jet printing, screen printing, spraying, and so forth as disclosed in U.S. Patent Application Publication 2004/0032466 (Deguchi et al.), incorporated herein by reference. Parylene films may also be induced into fluorescence by an active plasma as disclosed in U.S. Pat. No. 5,139,813 (Yira et al.), incorporated herein by reference.

Phosphor overcoats are also disclosed in U.S. Pat. Nos. 4,048,533 (Hinson et al.), 4,315,192 (Skwirut et al.), 5,592,052 (Maya et al.), 5,604,396 (Watanabe et al.), 5,793,158 (Wedding), and 6,099,753 (Yoshimura et al.), all incorporated herein by reference.

In some embodiments, the luminescent substance is selected from materials that do not degrade when exposed to oxygen, moisture, sunlight, etc. and do not require a protective overcoat. Such include various organic luminescent substances such as the perylene and parylene compounds disclosed above. These may be used alone or as protective overcoats and do not require a protective overcoat.

Selected Specific Organic Phosphor Embodiments and Applications

Plasma-tubes of any gas encapsulating geometric shape may be used as the pixel elements of a gas plasma display. A full color display is achieved using red, green, and blue pixels. The following are some specific embodiments using an organic luminescent substance such as a luminescent phosphor.

Color Plasma Displays Using UV 300 nm to 380 nm Excitation with Organic Phosphors The organic luminescent substance such as an organic phosphor may be excited by UV ranging from about 300 nm to about 380 nm to produce red, blue, or green emission in the visible range. The encapsulated gas is chosen to excite in this range.

To improve life, the organic phosphor is separated from the plasma discharge. This may be done by applying the organic phosphor to the exterior of the shell. In this case, it is important that the shell material be selected such that it is transmissive to UV in the range of about 300 nm to about 380 nm. Suitable materials include aluminum oxides, silicon oxides, and other such materials. In the case where helium is used in the gas mixture, aluminum oxide is a desirable shell material as it does not allow the helium to permeate.

Color Plasma Displays Using UV Excitation Below 300 nm with Organic Phosphors

Organic phosphors may be excited by UV below 300 nm. In this case, a xenon neon mixture of gases may produce excitation at 147 nm and 172 nm. The Plasma-tube material must be transmissive below 300 nm. Shell materials that are transmissive below 300 nm include silicon oxide. The thickness of the shell material must be minimized in order to maximize transmissivity.

Color Plasma Displays Using Visible Blue above 380 nm with Organic Phosphors

Organic phosphors may be excited by excitation above 380 nm. The Plasma-tube material is composed completely or partially of an inorganic blue phosphor such as BAM. This phosphor fluoresces blue and may be up-converted to red or green with organic phosphors on the outside of the shell.

Infrared Plasma Displays

In some applications it may be desirable to have gas discharge devices with Plasma-tubes that produce emission in the infrared range. This may be done with up-conversion or down-conversion phosphors as described above.

Filters

Optical and/or electromagnetic (EMI) filter, screen, and/or shield may be used. In one embodiment, a filter, screen, and/or shield is positioned on or over the Plasma-tubes, for example on a viewing surface. The Plasma-tubes may also be tinted. Examples of optical filters, screens, and/or shields are disclosed in U.S. Pat. Nos. 3,960,754 (Woodcock), 4,106,857 (Snitzer), 4,303,298, (Yamashita), 5,036,025 (Lin), 5,804,102 (Oi), and 6,333,592 (Sasa et al.), all incorporated herein by reference. Examples of EMI filters, screens, and/or shields are disclosed in U.S. Pat. Nos. 6,188,174 (Marutsuka) and 6,316,110 (Anzaki et al.), all incorporated herein by reference. Color filters may also be used. Examples are disclosed in U.S. Pat. Nos. 3,923,527 (Matsuura et al.), 4,105,577 (Yamashita), 4,110,245 (Yamashita), and 4,615,989 (Ritze), all incorporated herein by reference.

IR Filters

The Plasma-tube structure may contain an infrared (IR) filter. An IR filter may be selectively used with one or more Plasma-tubes to absorb or emit IR emissions from the display. Such IR emissions may come from the gas discharge inside a Plasma-tube and/or from a luminescent substance located inside and/or outside of a Plasma-tube. An IR filter is necessary if the display is used in a night vision application such as with night vision goggles. With night vision goggles, it is typically necessary to filter near IR from about 650 nm (nanometers) or higher, generally about 650 nm to about 900 nm. In some embodiments, the Plasma-tube may be made of or coated with an IR filter material.

Examples of IR filter materials include cyanine compounds such as phthalocyanine and naphthalocyanine compounds as disclosed in U.S. Pat. Nos. 5,804,102 (Oi et al.), 5,811,923 (Zieba et al.), and 6,297,582 (Hirota et al.), all incorporated herein by reference. The IR compound may also be an organic dye compound such as anthraquinone as disclosed in Hirota et al. ('582) and tetrahedrally coordinated transition metal ions of cobalt and nickel as disclosed in U.S. Pat. No. 7,081,991 (Jones et al.), both incorporated herein by reference.

Optical Interference Filter

The filter may comprise an optical interference filter comprising a layer of low refractive index material and a layer of high refractive index material, as disclosed in U.S. Pat. Nos. 4,647,812 (Vriens et al.) and 4,940,636 (Brock et al.), both incorporated herein by reference. In one embodiment, each Plasma-tube is composed of a low refraction index material and a high refraction index material. Examples of low refractive index materials include magnesium fluoride and silicon dioxide such as amorphous $SiO_2$. Examples of high refractive index materials include tantalum oxide and titanium oxide. In one embodiment, the high refractive index material is titanium oxide and at least one metal oxide selected from zirconium oxide, hafnium oxide, tantalum oxide, magnesium oxide, and calcium oxide.

Application of Organic Phosphors

Organic phosphors may be added to a UV curable medium and applied to the Plasma-tube with a variety of methods including jetting, spraying, sheet transfer methods, or screen printing. This may be done before or after the Plasma-tube is added to a substrate.

Application of phosphor before Plasma-tubes are added to substrate

If organic phosphors are applied to the Plasma-tubes before such are applied to the substrate, additional steps may be necessary to place each Plasma-tube in the correct position on the substrate.

Application of phosphor after Plasma-tubes are added to substrate

If the organic phosphor is applied to the Plasma-tubes after such are placed on a substrate, care must be take to align the appropriate phosphor color with the appropriate Plasma-tube.

Application of phosphor after Plasma-tubes are added to substrate self-aligning

In one embodiment, the Plasma-tubes may be used to cure the phosphor. A single color organic phosphor is completely applied to the entire substrate containing the Plasma-tubes. Next the Plasma-tubes are selectively activated to produce UV to cure the organic phosphor. The phosphor will cure on the Plasma-tubes that are activated and may be rinsed away from the Plasma-tubes that were not activated. Additional applications of phosphor of different colors may be applied using this method to coat the remaining shells. In this way the process is completely self-aligning.

Tinted Plasma-tubes

In the practice of this invention, the Plasma-tube shell may be color tinted or constructed of materials that are color tinted with red, blue, green, yellow, or like pigments. This is disclosed in U.S. Pat. No. 4,035,690 (Roeber) cited above and incorporated herein by reference. The gas discharge may also emit color light of different wavelengths as disclosed in Roeber ('690).

The use of tinted materials and/or gas discharges emitting light of different wavelengths may be used in combination with the above described phosphors and the light emitted from such phosphors. Optical filters may also be used.

Mixtures of Luminescent Materials

It is contemplated that mixtures of luminescent materials may be used including inorganic and inorganic, organic and organic, and inorganic and organic. The brightness of the luminescent material may be increased by dispersing inorganic materials into organic luminescent materials or vice versa.

Layers of Luminescent Materials

Two or more layers of the same or different luminescent materials may be selectively applied to the Plasma-tubes. Such layers may comprise combinations of organic and organic, inorganic and inorganic, and/or inorganic and organic.

Stacking

In a multi-color display such as RGB PDP, Plasma-tubes with flat sides may be stacked on top of each other or arranged in parallel side-by-side positions on the substrate. This configuration requires less area of the display surface compared to conventional RGB displays that require red, green, and blue pixels adjacent to each other on the substrate. This stacking embodiment is especially suitable with flat Plasma-tubes.

Also flat Plasma-shells such as Plasma-discs may be utilized. Each tube or shell may contain different color emitting gases such as the excimer gases. Phosphor coated Plasma-tubes in combination with excimers may also be used. Each Plasma-tube or Plasma-shell may also be of a different color material such as tinted glass.

Plasma-Tubes and Plasma-Shells

The gas discharge device structure may comprise a combination of Plasma-tubes and Plasma-shells. Plasma-tubes comprise elongated tubes for example as disclosed in U.S. Pat. Nos. 3,602,754 (Pfaender et al.), 3,654,680 (Bode et al.), 3,927,342 (Bode et al.), 4,038,577 (Bode et al.), 3,969,718 (Strom), 3,990,068 (Mayer et al.), 4,027,188 (Bergman), 5,984,747 (Bhagavatula et al.), 6,255,777 (Kim et al.), 6,633,117 (Shinoda et al.), 6,650,055 (Ishimoto et al.), 6,677,704 (Ishimoto et al.), 7,122,961 (Wedding), 7,157,854 (Wedding), and 7,176,628 (Wedding), all incorporated herein by reference.

As used herein, the elongated Plasma-tube is intended to include capillary, filament, filamentary, illuminator, hollow rod, or other such terms. It includes an elongated enclosed gas-filled structure having a length dimension that is greater than its cross-sectional width dimension. The width of the Plasma-tube is generally the viewing width from the top or bottom (front or rear) of the display.

The length of each Plasma-tube may vary depending upon the gas discharge device structure. In one embodiment hereof, an elongated tube is selectively divided into a multiplicity of lengths. In another embodiment, there is used a continuous tube that winds or weaves back and forth from one end to the other end of the gas discharge device. The length of the Plasma-tube is typically about 1400 microns to several feet or more.

The gas discharge device may comprise any suitable combination of Plasma-tubes and Plasma-shells. The Plasma-tubes may be arranged in any configuration. In one embodiment, there are alternative rows of Plasma-tubes and Plasma-shells. The Plasma-shells may be used for any desired function or purpose including the priming or conditioning of the Plasma-tubes. In one embodiment, the Plasma-shells are arranged around the perimeter of the display to provide priming or conditioning.

The Plasma-tubes and Plasma-shells may be of any geometric cross-section including circular, elliptical, square, rectangular, triangular, polygonal, trapezoidal, pentagonal, or hexagonal. In one embodiment, the viewing surface of the Plasma-tube and Plasma-shell is flat. In another embodiment, each electrode-connecting surface such as top, bottom, and/or side(s) is flat.

Each Plasma-tube and Plasma-shell may contain secondary electron emission materials, luminescent materials, and reflective materials. The Plasma-tubes and Plasma-shells may also utilize positive column discharge.

SUMMARY

Aspects of this invention may be practiced with a coplanar or opposing substrate PDP as disclosed in the U.S. Pat. Nos. 5,793,158 (Wedding) and 5,661,500 (Shinoda et al.) or with a single-substrate or monolithic PDP as disclosed in the U.S. Pat. Nos. 3,646,384 (Lay), 3,860,846 (Mayer), 3,935,484 (Dick et al.) and other single substrate patents, discussed above and incorporated herein by reference.

In the practice of this invention, the Plasma-tubes may be positioned and spaced in an AC gas discharge plasma display structure so as to utilize and take advantage of the positive column of the gas discharge as described above. In a positive column gas discharge application, the Plasma-tubes must be sufficient in length along the discharge axis to accommodate the positive column gas discharge.

Although this invention has been disclosed and described above with reference to dot matrix gas discharge displays, it may also be used in an alphanumeric gas discharge display using segmented electrodes. This invention may also be practiced in AC or DC gas discharge displays including hybrid structures of both AC and DC gas discharge.

The Plasma-tubes or Plasma-shells may contain a gaseous mixture for a gas discharge display or may contain other substances such as an electroluminescent (EL) or liquid crystal materials for use with other display technologies including electroluminescent displays (ELD), liquid crystal displays (LCD), field emission displays (FED), electrophoretic displays, and Organic EL or Organic LED (OLED).

The use of gas encapsulating Plasma-tubes or Plasma-shells alone or a combination of Plasma-tubes or Plasma-shells allows the gas discharge device to be utilized in a number of applications.

In one application, the device is used as a plasma shield to absorb or deflect radiation such as electromagnetic (EM) radiation so as to make the shielded object invisible to enemy radar. In this embodiment, a multiplicity of Plasma-tubes or Plasma-shells, alone or in combination, are provided as a shield or blanket over the object. The Plasma-tubes or Plasma-shells alone or in combination may also be used as an antenna. In these applications and others, the Plasma-tubes and/or Plasma-shells may be mounted on a single substrate that is rigid, flexible, or semi-flexible.

In another embodiment, the gas discharge device is used to detect radiation such as nuclear radiation from a nuclear device. This is particularly suitable for detecting hidden nuclear devices in vehicles, airplanes, and ships at airports, loading docks, bridges, and other such locations. The radiation detection device may comprise Plasma-tubes or Plasma-shells, alone or in combination. These may be mounted on a single substrate that is rigid, flexible, or semi-flexible.

Gas energized to a plasma state is known to interact with RF (radio frequency) energy. Depending on the electron density of the plasma and the depth of the plasma, it is capable of absorbing, reflecting, or passing RF energy. Incident RF energy can also excite un-energized gas into a plasma. This interaction of plasma and RF can be used beneficially to form RF shields, antenna, stealth skins, and detectors.

Further, a gas that has been energized into a plasma can interact with high energy particles such as encountered in space or in the presence of nuclear materials. Gas can be energized into plasma by such particles. Energized plasma can slow or absorb the particles. Interaction of plasma with energized particles is useful in nuclear detection and/or nuclear shielding.

Hollow Plasma-shells and/or Plasma-tubes containing encapsulated gas are useful in the above applications because such can encapsulate the gas at a specific pressure. The gas encapsulated Plasma-shells and/or Plasma-tubes are rugged and can easily be incorporated into conformable skins for use in space craft, aircraft, and other demanding applications. Plasma-shells and Plasma-tubes with diameters ranging from about 400 microns to about 4 mm are particularly useful for the above applications.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims to be interpreted in accordance with the breadth to which they are fairly, legally, and equitably entitled.

The invention claimed is:

1. A single substrate gas discharge device comprising a single substrate and a multiplicity of hollow gas-filled Plasma-tubes located on the surface of the single substrate, each Plasma-tube being made wholly or partially of a first luminescent material, an exterior portion of each Plasma-tube containing a second luminescent material, said first luminescent material being excited by photons from a gas discharge within the Plasma-tube, said second luminescent material being excited by photons emitted by the first luminescent material.

2. The gas discharge device of claim 1 wherein the first luminescent material is an inorganic material.

3. The gas discharge device of claim 1 wherein the first luminescent material comprises a combination of inorganic and organic materials.

4. The gas discharge device of claim 1 wherein the first luminescent material comprises a mixture of organic and inorganic materials.

5. The gas discharge device of claim 1 wherein the second luminescent material comprises an organic material.

6. The gas discharge device of claim 1 wherein the second luminescent material comprises a combination of inorganic and organic materials.

7. The gas discharge device of claim 1 wherein the second luminescent material comprises a mixture of organic and inorganic materials.

8. The gas discharge device of claim 1 wherein the first luminescent material is an up-conversion or a down-conversion material.

9. The gas discharge device of claim 1 wherein the second luminescent material is an up-conversion or a down-conversion material.

10. A single substrate gas discharge device comprising a hollow, elongated, gas-filled Plasma-tube made wholly or partially of a first luminescent material, said Plasma-tube having an exterior portion that contains a second luminescent material, said Plasma-tube being positioned on the surface of the single substrate.

11. The Plasma-tube of claim 10 wherein the first luminescent material is an inorganic material.

12. The Plasma-tube of claim 10 wherein the first luminescent material comprises a combination of inorganic and organic materials.

13. The Plasma-tube of claim 10 wherein the second luminescent material comprises an organic material.

14. As an article of manufacture, a single substrate and an elongated, hollow, gas-filled Plasma-tube connected to one or more electrodes, said Plasma-tube being made of a first luminescent substance comprising organic and inorganic materials, an external portion of the Plasma-tube containing a second luminescent substance, said Plasma-tube being located in the surface of the single substrate.

15. The invention of claim 14 wherein the Plasma-tube is made of a luminescent substance comprising an up-conversion or down-conversion substance.

16. The invention of claim 14 wherein an external portion of the Plasma-tube contains an up-conversion or down-conversion substance.

17. The invention of claim 14 wherein an external portion of the Plasma-tube contains an organic luminescent substance.

18. The invention of claim 15 wherein an external portion of the Plasma-tube contains a mixture of organic and inorganic luminescent substances.

* * * * *